United States Patent
Bouzid et al.

(10) Patent No.: US 10,003,690 B2
(45) Date of Patent: Jun. 19, 2018

(54) DYNAMIC SPEECH RESOURCE ALLOCATION

(71) Applicant: Angel.com Incorporated, Vienna, VA (US)

(72) Inventors: Ahmed Tewfik Bouzid, McLean, VA (US); Michael T. Mateer, South Riding, VA (US); Dmitry Sityaev, Centreville, VA (US)

(73) Assignee: GENESYS, TELECOMMUNICATIONS LABORATORIES, INC., Daly City, CA (US)

( * ) Notice: Subject to any disclaimer, the term of this patent is extended or adjusted under 35 U.S.C. 154(b) by 0 days. days.

(21) Appl. No.: 14/221,387

(22) Filed: Mar. 21, 2014

(65) Prior Publication Data

US 2014/0247927 A1    Sep. 4, 2014

Related U.S. Application Data

(63) Continuation of application No. 13/919,136, filed on Jun. 17, 2013, now Pat. No. 8,699,674, and a
(Continued)

(51) Int. Cl.
*H04M 1/64* (2006.01)
*H04M 3/493* (2006.01)
(Continued)

(52) U.S. Cl.
CPC .............. *H04M 3/493* (2013.01); *G06F 8/38* (2013.01); *G06Q 10/105* (2013.01); *G10L 15/32* (2013.01); *G10L 25/51* (2013.01)

(58) Field of Classification Search
CPC ........................... H04M 3/493; H04M 2201/40
(Continued)

(56) References Cited

U.S. PATENT DOCUMENTS 5,915,001 A   6/1999   Uppaluru
6,067,357 A   5/2000   Kishinsky et al.
(Continued)

FOREIGN PATENT DOCUMENTS

| EP | 3047638 A1 | 2/2017 |
| WO | 2011133824 A1 | 10/2011 |
| WO | 2015042345 A1 | 3/2015 |

OTHER PUBLICATIONS

International Search Report dated Aug. 2, 2011 in International Application No. PCT/US2011/033505, 2 pages.
(Continued)

*Primary Examiner* — Van D Huynh
(74) *Attorney, Agent, or Firm* — Lewis Roca Rothgerber Christie LLP

(57) ABSTRACT

A call is received at an interactive voice response (IVR) system. A voice communications session is established between the IVR system and the telephonic device. A request from the IVR system to allocate a speech resource for processing voice data of the voice communications session is received by a dynamic speech allocation (DSA) engine. Configuration data associated with a current state of the voice communications session is accessed by the DSA engine. Dynamic characteristics associated with the caller are accessed by the DSA engine. A speech resource from among multiple speech resources is selected by the DSA engine based on the current state and the dynamic characteristics. The selected speech resource is allocated to the voice communications session by enabling the IVR system to use the selected speech resource to process voice data received from the caller during the current state of the voice communications session.

21 Claims, 39 Drawing Sheets

Related U.S. Application Data continuation-in-part of application No. 13/092,090, filed on Apr. 21, 2011, now Pat. No. 8,654,934.

(60) Provisional application No. 61/778,880, filed on Mar. 13, 2013, provisional application No. 61/326,636, filed on Apr. 21, 2010, provisional application No. 61/326,616, filed on Apr. 21, 2010.

(51) Int. Cl.
*G06F 9/44* (2018.01)
*G06Q 10/10* (2012.01)
*G10L 25/51* (2013.01)
*G10L 15/32* (2013.01)

(58) Field of Classification Search
USPC .......................................... 379/88.01, 88.16
See application file for complete search history.

(56) References Cited

U.S. PATENT DOCUMENTS

| | | |
|---|---|---|
| 6,078,652 A | 6/2000 | Barak |
| 6,263,051 B1 | 7/2001 | Saylor |
| 6,553,113 B1 | 4/2003 | Dhir |
| 6,587,547 B1 | 7/2003 | Zirngibl |
| 6,606,596 B1 | 8/2003 | Zirngibl |
| 6,658,093 B1 | 12/2003 | Langseth et al. |
| 6,763,104 B1 | 7/2004 | Judkins et al. |
| 6,765,997 B1 | 7/2004 | Zirngibl |
| 6,768,788 B1 | 7/2004 | Langseth |
| 6,788,768 B1 | 9/2004 | Saylor |
| 6,788,779 B2 | 9/2004 | Ostapchuck |
| 6,798,867 B1 | 9/2004 | Zirngibl |
| 6,829,334 B1 | 12/2004 | Zirngibl |
| 6,836,537 B1 | 12/2004 | Zirngibl |
| 6,850,603 B1 | 2/2005 | Eberle |
| 6,854,154 B2 | 2/2005 | Masuda |
| 6,873,693 B1 | 3/2005 | Langseth |
| 6,885,734 B1 | 4/2005 | Eberle |
| 6,895,084 B1 | 5/2005 | Saylor |
| 6,920,425 B1 * | 7/2005 | Will ...................... H04M 3/493 379/88.13 |
| 6,940,953 B1 | 9/2005 | Eberle |
| 6,964,012 B1 | 11/2005 | Zirngibl |
| 6,977,992 B2 | 12/2005 | Zirngibl |
| 7,020,251 B2 | 3/2006 | Zirngibl |
| 7,062,020 B1 | 6/2006 | Pirasteh |
| 7,082,422 B1 | 7/2006 | Zirngibl |
| 7,197,461 B1 | 3/2007 | Eberle |
| 7,266,181 B1 | 9/2007 | Zirngibl |
| 7,272,212 B2 | 9/2007 | Eberle |
| 7,296,226 B2 | 11/2007 | Junkermann |
| 7,340,040 B1 | 3/2008 | Saylor |
| 7,428,302 B2 | 9/2008 | Zirngibl |
| 7,440,898 B1 | 10/2008 | Eberle |
| 7,457,397 B1 | 11/2008 | Saylor |
| 7,486,780 B2 | 2/2009 | Zirngibl |
| 7,487,094 B1 | 2/2009 | Konig et al. |
| 7,831,693 B2 | 11/2010 | Lai |
| 8,018,921 B2 | 9/2011 | Pogossiants et al. |
| 8,041,575 B2 | 10/2011 | Agarwal |
| 8,117,538 B2 | 2/2012 | Anisimov et al. |
| 8,200,527 B1 | 6/2012 | Thompson et al. |
| 8,238,533 B2 | 8/2012 | Blackwell |
| 8,300,798 B1 | 10/2012 | Wu |
| 8,369,509 B2 | 2/2013 | Jennings |
| 8,571,195 B2 | 10/2013 | Pasi et al. |
| 8,582,727 B2 | 11/2013 | Saylor et al. |
| 8,654,934 B2 | 2/2014 | Saylor et al. |
| 8,699,674 B2 | 4/2014 | Bouzid et al. |
| 8,917,828 B2 | 12/2014 | Bouzid et al. |
| 9,083,795 B1 | 7/2015 | Saylor et al. |
| 9,245,525 B2 * | 1/2016 | Yeracaris ................ G10L 15/22 |
| 9,285,974 B2 | 3/2016 | Kumar et al. |
| 9,468,040 B2 | 10/2016 | Bouzid et al. |
| 9,479,640 B1 | 10/2016 | Saylor et al. |
| 9,571,636 B2 | 2/2017 | Kumar et al. |
| 2002/0035474 A1 | 3/2002 | Alpdemir |
| 2002/0175943 A1 | 11/2002 | Hunt et al. |
| 2003/0125958 A1 | 7/2003 | Alpdemir et al. |
| 2003/0144843 A1 | 7/2003 | Belrose |
| 2003/0182622 A1 | 9/2003 | Sibal et al. |
| 2003/0231758 A1 | 12/2003 | Bock et al. |
| 2004/0042592 A1 * | 3/2004 | Knott ...................... G06F 8/20 379/88.16 |
| 2004/0066416 A1 * | 4/2004 | Knott ...................... G06Q 10/06 715/797 |
| 2004/0104938 A1 | 6/2004 | Saraswat et al. |
| 2004/0117804 A1 | 6/2004 | Scahill |
| 2004/0205731 A1 | 10/2004 | Junkermann |
| 2005/0065837 A1 | 3/2005 | Kosiba et al. |
| 2005/0141679 A1 | 6/2005 | Zirngibl |
| 2005/0207545 A1 | 9/2005 | Gao et al. |
| 2005/0273759 A1 | 12/2005 | Lucassen et al. |
| 2006/0018440 A1 * | 1/2006 | Watkins .................. G10L 15/22 379/88.01 |
| 2006/0109975 A1 | 5/2006 | Judkins et al. |
| 2007/0250841 A1 | 10/2007 | Scahill |
| 2007/0286162 A1 | 12/2007 | Fabbrizio |
| 2008/0065390 A1 | 3/2008 | Ativanichayaphong |
| 2009/0138269 A1 | 5/2009 | Agarwal |
| 2009/0204603 A1 | 8/2009 | Martino et al. |
| 2010/0162101 A1 | 6/2010 | Anisimov et al. |
| 2011/0196979 A1 | 8/2011 | Maes |
| 2011/0286586 A1 | 11/2011 | Saylor |
| 2011/0293078 A1 | 12/2011 | Saylor |
| 2012/0084751 A1 | 4/2012 | Makagon et al. |
| 2012/0173386 A1 | 7/2012 | Moon et al. |
| 2012/0300921 A1 | 11/2012 | Jennings |
| 2013/0028396 A1 | 1/2013 | Pasi et al. |
| 2013/0204626 A1 * | 8/2013 | Marcus ................. G10L 15/22 704/270.1 |
| 2014/0024350 A1 | 1/2014 | Bouzid et al. |
| 2014/0177821 A1 | 6/2014 | Ristock et al. |
| 2014/0188475 A1 | 7/2014 | Lev-Tov et al. |
| 2014/0348319 A1 | 11/2014 | Bouzid et al. |
| 2015/0248226 A1 | 9/2015 | Kumar et al. |
| 2015/0281436 A1 | 10/2015 | Kumar et al. |
| 2015/0281445 A1 | 10/2015 | Kumar et al. |
| 2015/0319303 A1 | 11/2015 | Saylor et al. |
| 2015/0350429 A1 | 12/2015 | Kumar et al. |
| 2016/0034260 A1 | 2/2016 | Ristock et al. |
| 2016/0191705 A1 | 6/2016 | Kumar et al. |
| 2016/0196053 A1 | 7/2016 | Kumar et al. |
| 2017/0118338 A1 | 4/2017 | Bouzid et al. |
| 2017/0118349 A1 | 4/2017 | Saylor et al. |
| 2017/0155766 A1 | 6/2017 | Kumar et al. |

OTHER PUBLICATIONS

Written Opinion of the International Searching Authority dated Aug. 2, 2011 in International Application No. PCT/US2011/033505, 9 pages.

U.S. Notice of Allowance for U.S. Appl. No. 13/919,136 dated Nov. 22, 2013, 13 pages.

Bellman, Dynamic programming, Princeton University Press, 1957, pp. 169-199.

Brown et al., Class-based n-gram models of natural language, J Computational Linguistics, 1992, 18(4): 467-479.

PCT Notification Concerning Transmittal of International Preliminary Report on Patentability for Application No. PCT/US2011/033505, dated Oct. 23, 2012, 11 pages.

U.S. Non-Final Office Action for U.S. Appl. No. 13/092,090, dated May 9, 2013, 12 pages.

U.S. Non-Final Office Action for U.S. Appl. No. 13/092,101, dated Mar. 11, 2013, 12 pages.

U.S. Notice of Allowance for U.S. Appl. No. 13/092,090, dated Oct. 9, 2013, 13 pages.

U.S. Notice of Allowance for U.S. Appl. No. 13/092,101, dated Jul. 12, 2013, 11 pages.

(56) References Cited

OTHER PUBLICATIONS

Australian Government Patent Examination Report No. 1 for Application No. 2014323444, dated Nov. 18, 2016, 3 pages.
Extended European Search Report for Application No. 14846310.2, dated Jan. 17, 2017, 12 pages.
Cisco Unified Contact Center Express Editor Step Reference Guide, Release 9.0(1), Retrieved from the Internet: http://www.cisco.com/c/dam/en/us/td/docs/voice_ip_comm/cust_contact/contact_center/crs/express_9_0/programming/guide/SeriesVol2.pdf, Jul. 6, 2012, 248 pages.
Cisco Unified Contact Center Express Solution Reference Network Design Release 9.0(1), Retrieved from the Internet: http://www.cisco.com/c/en/us/td/docs/voice_ip_comm/cust_contact/contact_center/crs/express_9_0/design/UCCX_BK_UD5B347F_00_uccx-solution-reference-network-design, Jul. 6, 2016, 156 pages.
International Preliminary Report on Patentability for PCT/US2011/033505, dated Oct. 23, 2012, 10 pages.
International Search Report and Written Opinion for International Application No. PCT/US2014/056452, dated Dec. 29, 2014, 14 pages.
Supplementary European Search Report for Application No. 14846310.2, dated Sep. 23, 2016, 8 pages.
U.S. Non-Final Office Action for U.S. Appl. No. 13/092,090 dated May 9, 2013, 12 pages.
U.S. Non-Final Office Action for U.S. Appl. No. 13/092,101 dated Mar. 11, 2013, 12 pages.
U.S. Non-Final Office Action for U.S. Appl. No. 14/058,661 dated Sep. 4, 2014, 7 pages.
U.S. Notice of Allowance for U.S. Appl. No. 13/092,090 dated Oct. 9, 2013, 13 pages.
U.S. Notice of Allowance for U.S. Appl. No. 13/092,101 dated Jul. 12, 2013, 11 pages.
U.S. Notice of Allowance for U.S. Appl. No. 14/032,443 dated Jul. 22, 2014, 13 pages.
U.S. Notice of Allowance for U.S. Appl. No. 14/170,722 dated Oct. 27, 2014, 19 pages.
Canadian Office Action for Application No. 2,928,357, dated Mar. 2, 2017, 3 pages.
Korean Office action with English Translation for Application No. 10-2016-7010439, dated Mar. 17, 2017, 19 pages.
Korean Decision of Rejection and English Translation for Application No. 10-2016-7010439, dated Jan. 26, 2018, 12 pages.

* cited by examiner

FIG. 5N

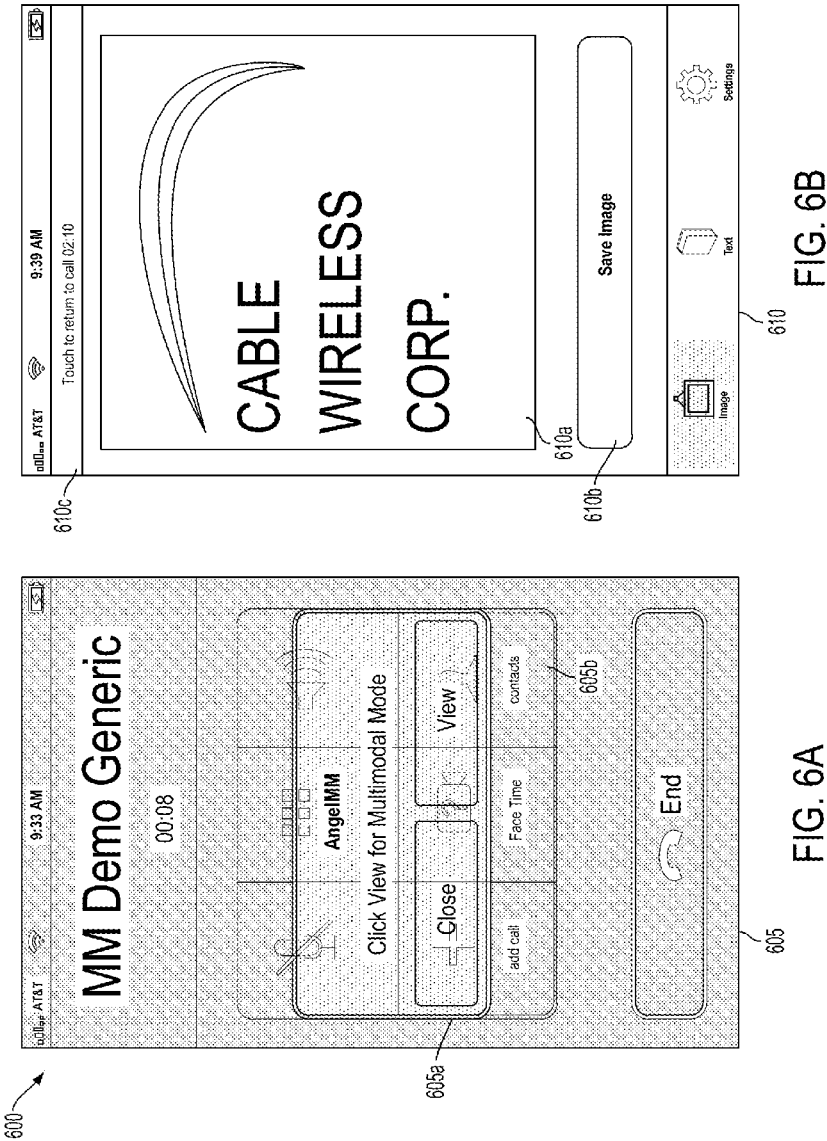

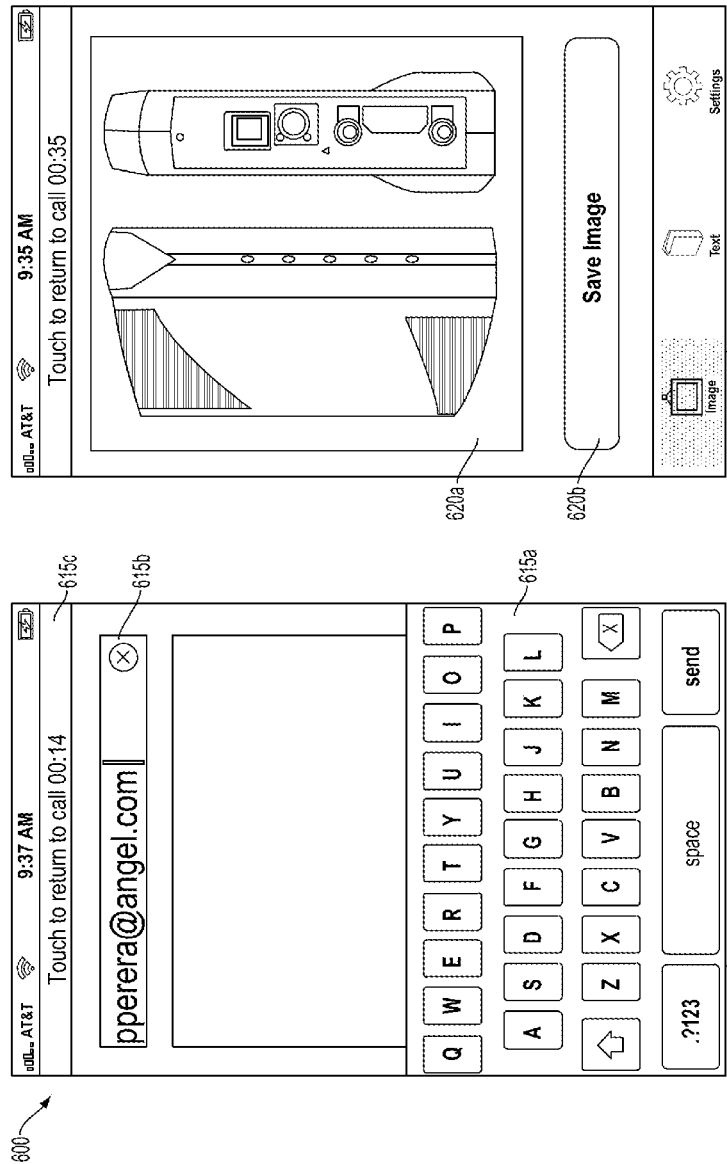

FIG. 12A

Angel

Logged in as Angel Mobility. Logout

[?] Get Support

| Home | Voicemail | Site Builder | Reporting | Account |

- Site Overview
- Site Multimodal Setup
- Site Properties
- Site Variables
- Site Commands
- System Commands
- Call Recording
- Outbound
- Tasks
- ASR Settings
- Diagnostics Phone Number(s)
832-460-2024

Site Builder> Voice Sites > Cable Wireless Inc Modem Troubleshooting IVR # 200000114924

Cable Wireless Inc Modem Troubleshooting IVR

Your phone number has been successfully updated.
Add, modify, copy or delete Voice Pages.

Home Page    1000 - Say Greeting    Switch Home Page | What's This?

Run Caller First Diagnostics

| Delete | Copy | Add Voice Page ▼ |

| | Type | Page Name | Page # ▼ |
|---|---|---|---|
| ☐ | | Say Greeting | 1000 |
| ☐ | 🎤 | Obtain Personal Information | 1600 |   ← 1203
| ☐ | ⚙ | Show Keyboard | 1700 |
| ☐ | | Ask for Email Address | 2000 |
| ☐ | ⚙ | Retrieve Email Address From Phone | 2100 |
| ☐ | | Obtain Cable Modem Type | 2500 |
| ☐ | 🎤 | Select Which Cable Modem To Show | 3000 |
| ☐ | ⚙ | Push Image of D_Link_DSL_Modem To Phone | 4000 |
| ☐ | ⚙ | Push Image of D_Link_DCM Modem To Phone | 5000 |
| ☐ | | Instruction | 8000 |
| ☐ | | Goodbye | 10000 |

| Delete | Copy | Add Voice Page ▼ |

1200 →
1210

DYNAMIC SPEECH RESOURCE ALLOCATION

CROSS-REFERENCE TO RELATED APPLICATIONS

This application is a continuation of U.S. patent application Ser. No. 13/919,136, titled "DYNAMIC SPEECH RESOURCE ALLOCATION," and filed on Jun. 17, 2013, now U.S. Pat. No. 8,699,674, which claims the benefit of U.S. Provisional Application No. 61/778,880, titled "DYNAMIC SPEECH RESOURCE ALLOCATION" and filed on Mar. 13, 2013, and is a continuation-in-part of U.S. patent application Ser. No. 13/092,090, titled "MULTI-MODAL INTERACTIVE VOICE RESPONSE SYSTEM" and filed on Apr. 21, 2011, which claims the benefit of U.S. Provisional Application No. 61/326,636, titled "MULTI-MODAL APPLICATION DEVELOPMENT PLATFORM FOR VOICE SOLUTIONS" and filed on Apr. 21, 2010, and U.S. Provisional Application No. 61/326,616, titled "COMMUNICATION OF INFORMATION DURING A CALL" and filed on Apr. 21, 2010, all of which are incorporated herein by reference in their entirety.

TECHNICAL FIELD

The following disclosure relates generally to speech resource allocation in an interactive voice response system.

SUMMARY

In a general aspect, a call is received at an interactive voice response (IVR) system, the call being received from a telephonic device of a caller. A voice communications session is established between the IVR system and the telephonic device in response to the call. A request from the IVR system to allocate a speech resource for processing voice data of the voice communications session is received by a dynamic speech allocation (DSA) engine. Configuration data associated with a current state of the voice communications session is accessed by the DSA engine. One or more dynamic characteristics associated with the caller is accessed by the DSA engine. A speech resource from among multiple speech resources is selected by the DSA engine based on the current state of the voice communications session and the one or more dynamic characteristics. The selected speech resource is allocated to the voice communications session by enabling the IVR system to use the selected speech resource to process voice data received from the caller during the current state of the voice communications session.

The details of one or more implementations are set forth in the accompanying drawings and the description below. Other potential features and advantages will become apparent from the description, the drawings, and the claims.

BACKGROUND

A user may use a telephonic device to call a number that connects the user to an interactive voice response system. At a particular state of the voice interaction, the interactive voice response system may provide pre-recorded audio information to the user and process voice information received from the user. The complexity and cost to process the received voice information as required by the interactive voice response system may vary at different states of the voice interaction, and the calling characteristics associated with the user may dynamically change during the voice interaction. It may be useful if the interactive voice response system can determine and allocate optimized resources for processing the received voice information at a particular state of the voice interaction based on the static and dynamic characteristics of the voice interaction.

BRIEF DESCRIPTION OF THE FIGURES

FIGS. 6A-6D illustrate a GUI for another example of a multimodal application on a smart phone.

FIGS. 12A-12B illustrate an example GUI for an application development tool that is used by a content provider to configure speech resource parameters for processing voice information from a user

DETAILED DESCRIPTION

Figure 1:
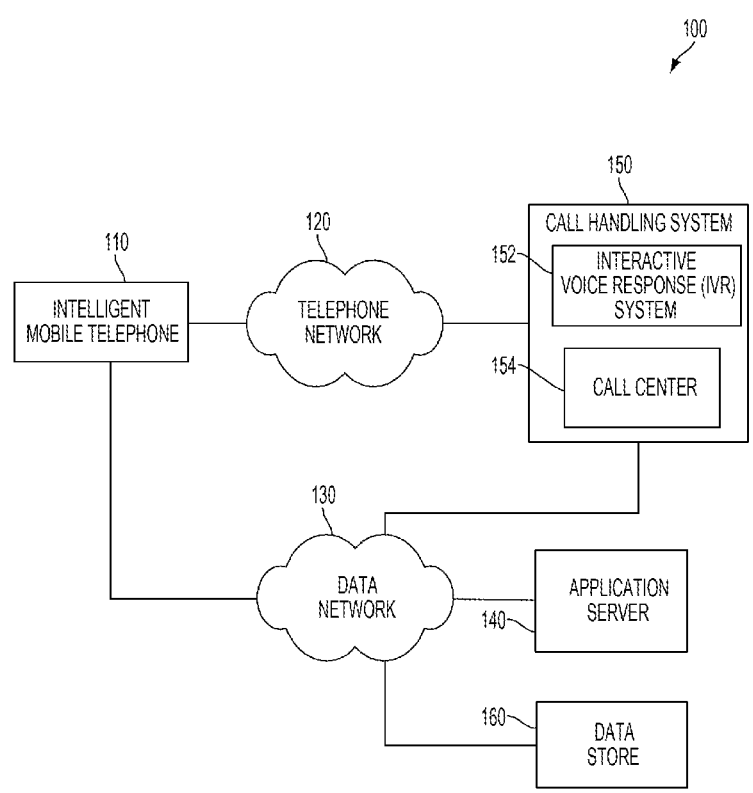
FIG. 1 is a block diagram of a communications system that provides a multimodal application development platform for voice solutions.

A user of a particular product or service may need to contact customer service for the product or service for various reasons, for example to troubleshoot a problem the user is experiencing in using the product or service. In order to contact the customer service and obtain a solution to the problem, the user may call a known customer service number for the product or service using a telephonic device accessible to the user. By calling the customer service number, the user may get connected to a call handling system that enables the user to interact with a voice site associated with the product or service.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. An enhanced voice site includes scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). Notably, a call may be said to be directed to a voice site if it is directed to a telephone number that has been defined as corresponding to the voice site.

The voice site called by the user may be an automated interactive voice site that is configured to process, using pre-programmed scripts, information received from the user that is input through the telephonic device being used by the user, and in response provide information to the user that is conveyed to the user through the telephonic device. For standard voice sites and/or standard telephonic devices, the interaction between the user and the voice site may be done using an interactive voice response system (IVR) provided by a service provider that is hosting the voice site. A standard telephonic device in this context is understood to be a telephonic device that is not configured to handle interaction with a voice site that involves video, images or rich textual information. The IVR is configured to support voice commands and voice information using text-to-speech processing and natural language processing by using scripts that are pre-programmed for the voice site, for example, voice-extensible markup language (VoiceXML) scripts. The IVR interacts with the user, by prompting with audible commands, enabling the user to input information by speaking into the telephonic device or by pressing buttons on the telephonic device if the telephonic device supports dual-tone multi-frequency (DTMF) signaling (e.g., a touch-one phone). The information input by the user is conveyed to the IVR over a voice communications session that is established between the telephonic device and the IVR when the call is connected. Upon receiving the information, the IVR processes the information using the pre-programmed scripts. The IVR may be configured to send audible responses back to the user via the telephonic device.

In some implementations, the voice site may be an enhanced voice site that is configured to support multimedia information including audio, video, images and text. The telephonic device also may be an advanced telephonic device (e.g., a smart phone) provided with a display for conveying visual information to the user, and a processor capable of performing complex tasks such as logic processing wherein the associated instructions may be stored in memory included in the telephonic device. In such circumstances, the advanced telephonic device (hereinafter interchangeably referred to as "smart phone") and the enhanced voice site can interact using one or more of voice, video, images or text information and commands.

A multimodal IVR (MM-IVR) may be provided by the call handling service hosting the voice site to enable the smart phone and the voice site to communicate using one or more media (e.g., voice, text or images) as needed for comprehensive, easily-understood communications. In this context, "multimodal" refers to the ability to handle communications involving more than one mode, for example, audio communications and video communications. In one implementation, the MM-IVR may be configured to support calls to multiple different voice sites. In another implementation, the MM-IVR may be dedicated to one voice site and there may be a different MM-IVR for each voice site.

The smart phone may be configured to run a multimodal (MM) application that interacts with the MM-IVR that is supporting the voice site. In addition to placing a call to the voice site using a voice communications channel, the smart phone may interact with the voice site via the multimodal application using a data communications channel that runs in parallel to the voice communications channel. The audio (e.g., voice) capture and audio playing is done in the smart phone, but more complex and processing-intensive tasks such as speech or image recognition and dialog management are executed using the MM-IVR at the call handling service. For example, the MM-IVR may communicate with the user using voice over a voice communications session to get basic instructions and quick feedback; the MM-IVR also may communicate with the user using text over a parallel data communications session to get an e-mail address associated with the user and using images over the data communications session for providing a visual sense to the user of what needs to be done.

Using a multimodal application to interact with an enhanced voice site may be useful in several situations. For example, the multimodal application may be used, in conjunction with the display of the smart phone, to show pictures to the user during troubleshooting a product or service. The multimodal application also may be used in sending long terms and conditions related to the product or service being used by the user. In another usage, the multimodal application may be used to capture data that is not easy to capture via speech, e.g., the user may take a picture of the product using a camera provided with the smart phone and use the multimodal application to send the picture to the voice site. In yet another usage, the multimodal application may be used to show to the user the latest bill associated with the product or service being used by the user.

As mentioned previously, the voice site may be hosted by a third party service provider that facilitates the creation and hosting of voice sites on servers owned and operated by the service provider. The service provider provides a service/method that enables the design, development, and hosting of voice applications that run a thin client on the smart phone that interacts with a fully hosted, on-demand voice solution platform/call handling system maintained and managed by the service provider. The service/method provides a way to develop a voice site that is supported by an MM-IVR system (the server side) and push an installation of an application (the client) that would run on the smart phone, as well as a protocol for the client and the server to interact with each other. The service/method requires the installation of a thin client engine (e.g., an application) on the smart phone that mediates between the objects and devices in the smart phone and the MM-IVR system supporting the voice site hosted on the server.

In the above scenario, the role of the entity providing customer service through the voice site is that of a content provider. The customer service department of the entity/ company (hereinafter referred to interchangeably as the "content provider") configures the voice site that is to be used for the particular product or service and provides the logic for the voice site that is to be executed by the MM-IVR system, along with the voice, video, image or textual information that may be exchanged with the user calling the voice site. The content provider may do so by using a graphical user interface provided by the third party service provider for configuring the voice site. The service provider handles the interpretation and compilation of the information provided by the content provider, and the creation and hosting of the voice site based on the information.

The service/method thus enables the deployment of voice-enabled solutions on smart phones without requiring the content provider to engage in complex programming. Applications may be designed by the content provider using a web-based interface and served on demand to smart phone clients. Such clients can be add-ons that smart phone applications can plug into. In addition, the service/method enables users to interact with an application in a multimodal manner. The application is referred to as multimodal in that it enables users to interact with the voice solution platform using multiple different communications modes. For example, the user may provide information to the voice solution platform by writing or speaking and may receive information from the voice solution platform by hearing or reading. Accordingly, in this example, four different types of interaction combinations are possible between the user and the voice solution platform: (1) speak/hear, (2) speak/read, (3) write/read, and (4) write/hear. The same client/server engine/UI can run all four types of interaction combinations and the same application development tool can be used to build all four types of interaction combinations.

Depending on the voice application, each voice site (or enhanced voice site) may have different data processing requirements that require the voice site to leverage different speech resources, such as, for example, different Automatic Speech Recognition (ASR) engines, different Text-to-Speech (TTS) engines, and, in some instances, a noise reduction engine. For instance, the data processing requirements for a pizza ordering application may be more complex than the data processing requirements for a customer satisfaction survey application and, therefore, may require speech resources able to handle a more sophisticated interaction with users. In this example, the pizza ordering application may, for instance, require a more sophisticated ASR engine that is better able to process natural language inputs to properly identify a long order of different pizzas with different toppings spoken by a user. In contrast, the customer satisfaction survey application may require a much less sophisticated ASR engine because the application only asks users multiple-choice questions that the users respond to by speaking single alphanumeric character answers. Since each ASR engine has an associated cost that generally increases with the sophistication of the engine, a content provider having a voice site for a customer satisfaction survey may be ill-served by paying the greater costs associated with using a more sophisticated ASR engine when a much less sophisticated and, hence, less costly engine would have sufficed. In contrast, a content provider having a voice site for ordering pizza would not want to try to save costs by using a less sophisticated ASR engine because of its negative impact on the customer's experience when interacting with the voice site (e.g., orders would be incorrectly captured by the engine, resulting in the customers having to repeat themselves and/or incorrect orders being delivered to customers).

As such, from a content provider's perspective, the determination of a particular speech resource for a particular voice interaction is preferably based on a balance between minimizing the transaction cost to the content provider of using the speech resource and optimizing the user's experience when interacting with the voice site by ensuring that the speech resource is up to the task of supporting a smooth interaction with the user. From a service provider's perspective, the selection of particular speech resources is preferably transparent to the content provider to allow the service provider to have the flexibility of upgrading, removing, or replacing certain speech resources without affecting the design or operation of existing voice sites.

A dynamic speech resource allocation system, like that described in more detail below, may determine the data processing needs for a given voice application and may automatically select the best speech resource able to satisfy those needs (e.g., the lowest cost speech resource able to handle those data processing needs without compromising the user experience). In doing so, the system may be able to increase the quality of a user's experience with a voice site by selecting the specific speech resources that are best able to improve the user's experience in view of the context of a particular voice interaction with the user. Moreover, the system may be able to decrease the speech resource costs associated with a voice site without decreasing the quality of the user interactions with the voice sites by avoiding wasteful use of sophisticated and, hence, expensive speech resources for voice interactions that can be similarly handled by using less sophisticated and, hence, less expensive speech resources.

Figure 2:
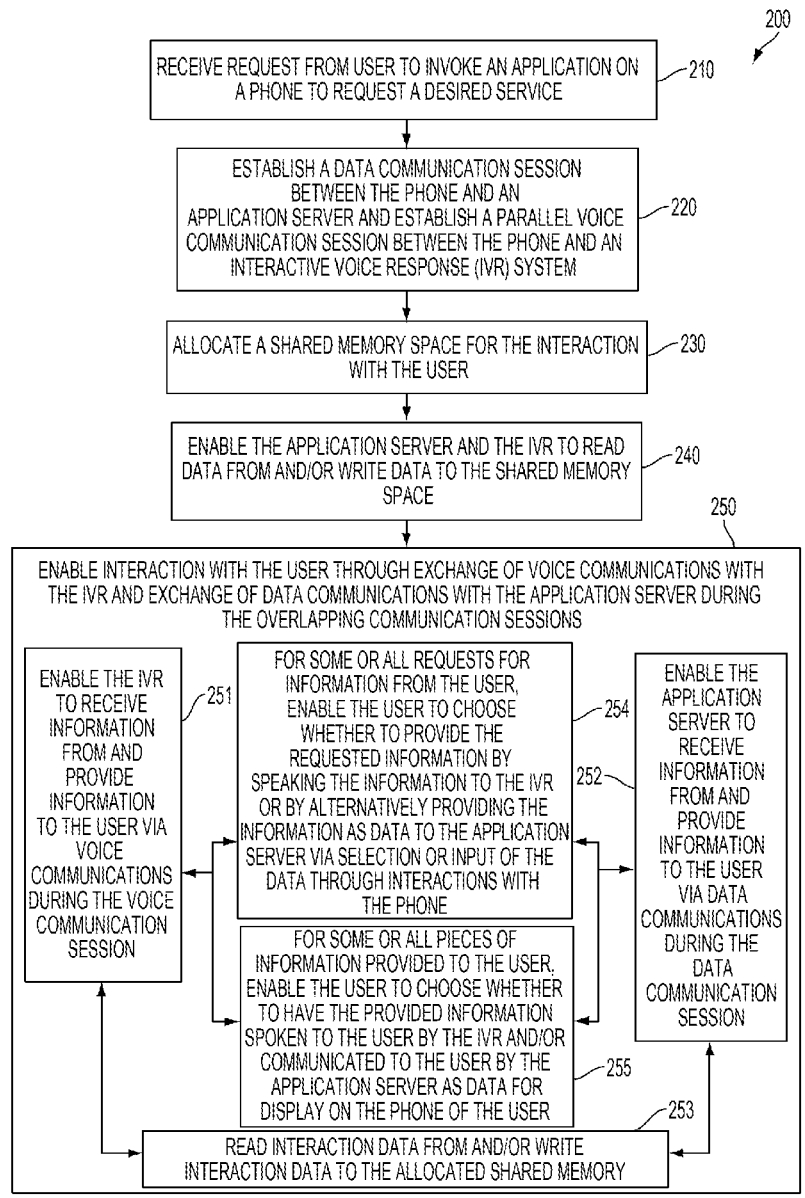
FIG. 2 is an illustration of a process for enabling a user to interact with an application server and an IVR via overlapping communications sessions.

Referring to FIGS. 1 and 2, a user of an intelligent mobile telephone (i.e., a smart phone) 110 is able to interact with the smart phone to invoke a multimodal application on the phone to request a service from a voice site that is provided, for example, by a customer service department (210). The service may be, for example, a request to purchase a particular product or service offered by or made available by the customer service department through the voice site. For example, the user may indicate a desire to request a service from the voice site by selecting a graphically displayed icon on a graphical user interface (GUI) of the intelligent mobile telephone 110 to thereby invoke a multimodal application stored in the intelligent mobile telephone 110 with which the user can interact to initiate a service request. Additionally or alternatively, the user may indicate a desire to request a service by simply inputting, via manual selection or otherwise, a telephone number associated with the customer service department into the intelligent mobile telephone 110 and initiating a call directed to the inputted telephone number. The call handling system receives the call and then interacts with the smart phone to launch the multimodal application. In some implementations, the intelligent mobile telephone 110 may include a data store that stores data indicating which inputted telephone numbers correspond to conventional phone calls (e.g., via VoIP or via TDM) and which inputted telephone numbers correspond to multimodal smart phone applications that will be launched by the smart phone upon entry of the corresponding number. In some implementations, each of the multimodal telephone numbers has its own multimodal application associated with it. In other implementations, all multimodal telephone numbers are associated with the same multimodal application such that the same multimodal application is launched upon entry of any of the multimodal telephone numbers.

The multimodal application(s) stored on the intelligent mobile telephone 110 may be a thin client capable of interacting with a full hosted, on demand voice solution platform. The voice solution platform may include a call handling system 150, an application server 140 and a data store 160 communicatively coupled to each other, as shown in FIG. 1. The call handling system 150 may include an IVR system 152 configured to receive a call from the intelligent mobile telephone 110 when the intelligent mobile telephone 110 is operating under the control of the thin client. In some implementations, the call handling system 150 may additionally include a call center 154.

In some implementations, the thin client may be a conventional smart phone application that includes an add-on or plug-in that provides multimodal functionality to a conventional smart-phone application. The thin client and/or the add-on or plug-in may be downloaded from a host server by the intelligent mobile telephone 110.

Upon the user invoking the multimodal application or subsequent to the user invoking the multimodal application and then requesting submission of the service request through interactions with the multimodal application, a data communications session is setup between the intelligent mobile telephone 110 and the application server 140 in response to the service request (220). The data communications session may be setup, for example, by the intelligent mobile telephone 110, under the direction of the multimodal application, constructing or accessing a URL for the application server 140 and using an application programming interface (API) and the URL to communicate with the application server 140 over the data network 130.

The intelligent mobile telephone 110 also may setup a parallel voice communications session with the IVR 152 or, more generally, with the call handling system 150 (220). The voice communications session may be setup, for example, by the intelligent mobile telephone 110, under the direction of the multimodal application, accessing a telephone number corresponding to the IVR 152 and placing a call (via, for example, TDM or VoIP) over the telephone network 120 using the accessed telephone number. The accessed telephone number may be a number inputted by the user when invoking the application, or alternatively, may be a telephone number previously stored in connection with the multimodal application (e.g., a pre-stored 1-800 number associated with the particular service requested by the user). The voice communications session also may be setup with the IVR 152 by the intelligent mobile telephone 110 simply calling the IVR 152 using the native telephony service of the intelligent mobile telephone 110 and then the multimodal application being launched through subsequent interactions with the IVR 152. The data communications session and the voice communications session overlap in time, such that the smart phone is able to communicate with the IVR 152 and the application server 140 in parallel.

The application server 140 may allocate a shared memory space in a data store 160 to store state data reflecting the interaction with the user during the two parallel communications sessions (230). In some implementations, the IVR 152, rather than the application server 140 allocates the shared memory space in the data store 160. The application server 140 and the IVR 152 are able to read data from and/or write data to the shared memory space (240). For example, the application server 140 may inform the IVR 152 of the location of the shared memory space and may setup access rights with the data store 160 to ensure that the application server 140 and the IVR 152 are each able to read data from and/or write data to the shared memory space in real-time during the communications sessions.

The user is able to interact with the voice solution platform by exchanging voice communications with the IVR 152 and exchanging data communications with the application server 140 in real-time during the overlapping communications sessions (250). In particular, the user is able to receive information from the IVR 152 by hearing information spoken by the IVR 152 to the user and is able to provide information to the IVR 152 by speaking information into the phone (251).

The traditional processing functions of the IVR 152 may be distributed between the IVR 152 and the multimodal application to decrease the complexity of the multimodal aspect of the application. Specifically, the audio capture and audio playing may be performed by the multimodal application on the intelligent mobile telephone 110. However, expensive and complex tasks, such as, for example, speech recognition and dialog management, may be performed by the IVR 152. This separation of functions allows the multimodal aspect of the application to be relatively thin (i.e., require minimal processing and/or memory resources when stored and executed) and not involve complex programming by the developer of the application. Instead, the complex IVR-related programming tasks are pushed to the IVR 152. In some implementations, a content provider/application developer can design a multimodal add-on for an existing conventional (i.e., non-multimodal) smart phone application and the voice application programming for the IVR 152 using a single web-based voice solution application development interface. The add-on can then be downloaded by the intelligent mobile telephone 110 from a data store across the data network 130 and plugged into the conventional smart phone application to convert the conventional smart phone application into a multimodal application.

The user is also able to provide data (e.g., text data, video data, and/or audio data) to the application server 140 and receive data (e.g., text data, video data, and/or audio data) from the application server 140 over the data network 130 during the data communications session by interacting with the intelligent mobile telephone 110 (252). While the IVR 152 and the application server 140 interact with the user, the IVR 152 and the application server 140 may read and write data in real-time into the allocated shared memory such that, for example, the IVR 152 and the application server 140 may be concurrently aware of the state of the interaction with the user of the intelligent mobile telephone 110 (253). In some implementations, the IVR 152 and/or the application server 140 may directly access the shared memory to monitor the information stored in the shared memory for the current interaction with the user such that changes in state variables and/or addition of new state variables are automatically detected by the IVR 152 or the application server 140. In other implementations, the IVR 152 may send a signal to the application server 140 over the data network 130 informing the application server 140 when a state variable has been changed in or new data has been added to the shared memory by the IVR 152. Similarly, the application server 140 may send a signal to the IVR 152 over the data network 130 informing the IVR 152 when a state variable has been changed in or new data has been added to the shared memory over the data network 130.

Use of the shared memory may allow the voice solution platform to intelligently select which communications mode is preferable for receiving or providing information to a user of the intelligent mobile telephone 110 during the interaction with the user (i.e., during the overlapping communications sessions with the user via the intelligent mobile telephone 110). For example, an IVR is effective in delivering data serially and relatively quickly as audio. The IVR is also effective in gathering data from the user that is amenable to being structured as a multiple choice question (e.g., a yes/no question) to which the user may provide a short response by depressing buttons corresponding to the choices on the phone or by speaking short phrases that do not require too much natural language processing or interpretation. The IVR, however, may not be effective in receiving data that involves longer and/or more elaborate responses that are difficult to decipher such as, for example, full name and physical address capture, and e-mail address capture.

In contrast, the application server 140 is effective in delivering different pieces complex data to the user that require more time for the user to digest than that provided by serial audio presentation of the data or that are simply not amenable to translation into audio. Such data may be, for example, a detailed multi-field form or a page having multiple distinct textual, video, and/or image data items (e.g., a voice page or a web page). The application server 140 is effective in capturing complex data from the user such as, for example, free-form writing or writing corresponding to a full name, a physical address, and/or an e-mail address of the user.

Figure 5A:
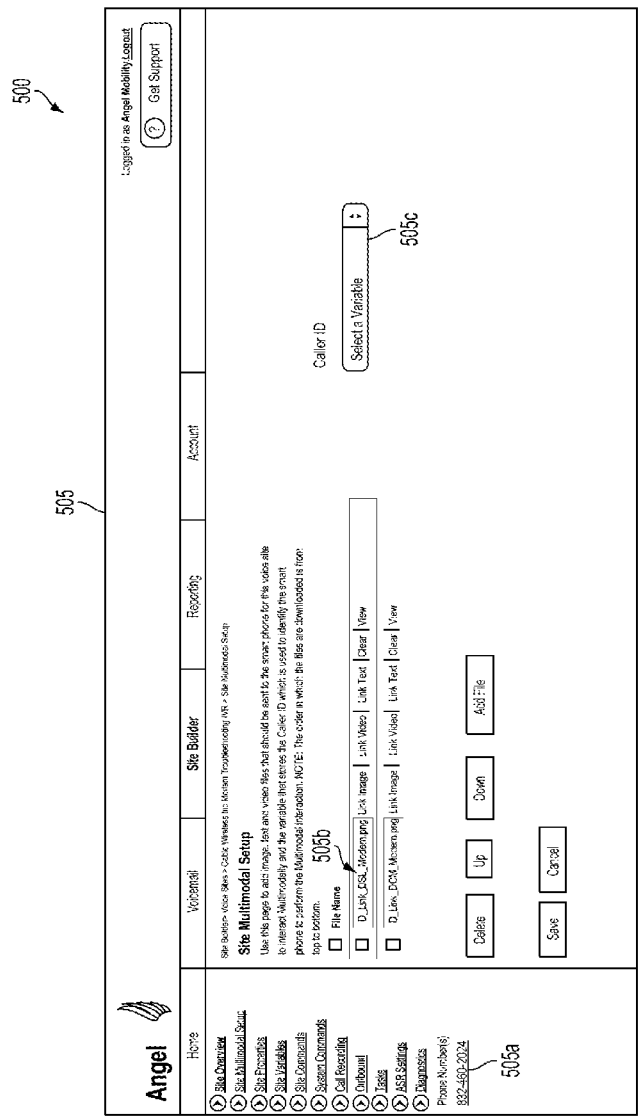
FIGS. 5A-5N illustrate a GUI for an application development tool that is used by a content provider to create a multimodal voice site.

In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by an IVR and/or an application server to execute the discrete programming routine to thereby perform the discrete function of the page. A "voice page" is a particular type of page that is configured to perform the function of delivering and/or receiving audible content to a user. The user is typically a caller to an IVR and the audible content is typically speech. FIGS. 5A-5N illustrate examples of one or more pages provided by a GUI of an application development tool.

Accordingly, in some implementations, the multimodal application (i.e., the client application) on the smart phone and the corresponding applications executed by the IVR 152 and the application server 140 (i.e., the server applications) may be designed to intelligently choose among different communications modes when working together to gather data from or provide data to the user of the intelligent mobile telephone 110. For example, if the data to be gathered can be obtained through the answer of a yes/no question, then the applications may request the data from the user via prompting the user to speak a yes/no answer into the smart phone that is received and interpreted by the IVR 152. In contrast, if the data to be gathered is more complex, such as an e-mail address of the user, the applications may request that the user input the data as, for example, text that is received and interpreted by the application server 140. As stated previously, in some implementations, applications can be developed that communicate data between the user and the voice solution platform using any of the four different types of interaction combinations noted previously. Some or all of the data that is gathered from the user and, in some implementations, some or all of the data that is communicated to the user during the communications sessions may be stored in the shared memory in real-time such that both the application server 140 and the IVR 152 may access the data in real-time during the sessions. This data, along with other state variable data, may be used to ensure, for example, that the processing of the application server 140 and the processing of the IVR 152 are synchronized to provide a cohesive multimodal interaction with the user of the intelligent mobile telephone 110.

In some implementations, for some or all requests for information from the user made by the voice solution platform during the communications sessions, the user may be prompted by the IVR 152 (e.g., through a voice prompt) and/or by the application server 140 (e.g., through a textual prompt displayed on a display of the intelligent mobile telephone 110) to choose a mode for providing the requested information to the voice solution platform (254). For example, the user may be prompted to choose whether to provide the requested information to the voice solution platform by speaking the information into the intelligent mobile telephone 110 to be received and interpreted by the IVR 152 or, alternatively, by providing the information as data (e.g., text data) to the application server 140 via selection or input of the data through interactions with the intelligent mobile telephone 110. Depending on the selection made by the user, the information may either be collected by the IVR 152 or by the application server 140. Some or all of the information that is collected may be stored in the shared memory to allow both the IVR 152 and the application server 140 to access or otherwise be aware of the collected data for subsequent processing during or subsequent to the communications sessions. In one implementation example, the user may be prompted by the IVR 152 through execution of scripts corresponding to a question page to select a communication mode for providing the requested data. Depending on the user's selection, the processing may subsequently branch to scripts corresponding to one or more multimodal action pages to enable the user to provide the requested data as text data, video data or image data. Question voice pages and multimodal action pages are described later in reference to FIGS. 5A-5N. A multimodal action page, as mentioned in this discussion, is a page configured to perform an action that enables multimodal communications with a user.

In some implementations, for some or all pieces of information provided to the user by the voice solution platform, the user may be prompted by the IVR 152 (e.g., through a voice prompt) and/or by the application server 140 (e.g., through a textual prompt displayed on a display of the intelligent mobile telephone 110) to choose a mode for receiving the information from the voice solution platform (255). For example, the user may be prompted to choose whether to receive the information from the voice solution platform through the IVR 152 speaking the information to the user or, alternatively, through the application server 140 communicating the information as, for example, text to be displayed on a display of the intelligent mobile telephone 110 to the user. Depending on the selection made by the user, the information may either be provided by the IVR 152 or by the application server 140. Some or all of the information that is provided may be stored in the shared memory to allow both the IVR 152 and the application server 140 to access or otherwise be aware of the collected data for subsequent processing during or subsequent to the communications sessions. In one implementation example, the user may be prompted by the IVR 152 through execution of scripts corresponding to a question page to select a communication mode for receiving data. Depending on the user's selection, the processing may subsequently branch to scripts corresponding to one or more multimodal action pages to provide data to the user as text data, video data or image data. Question voice pages and multimodal action pages are described later in reference to FIGS. 5A-5N.

Typically, the division of processing functions between the intelligent mobile telephone 110 and the voice solution platform results in the multimodal application directing the intelligent mobile telephone 110 to communicate with the application server 140 and the IVR 152 to mediate between objects and devices on or accessible to the intelligent mobile telephone 110 and the corresponding voice application executed by the IVR 152. The objects may be internal objects stored within the intelligent mobile telephone 110 (e.g., songs, contact, and applications) or may be external objects (e.g., information about shipments, order status, etc.) accessed by the intelligent mobile telephone 110 from external sources (e.g., from the application server or elsewhere across the data network 130). The above-described techniques may provide a way to develop applications on a server-side of the offering (i.e., on the voice solution platform side) and then push an install of a thin client to be run on the intelligent mobile telephone 110 that includes, among other things, a protocol for the intelligent mobile telephone 110 and the voice solution platform to interact with each other.

The intelligent mobile telephone 110 is configured to place and receive calls across the telephone network 115 and to establish data communications sessions with servers, such as the application server 140, across the data network 130 for transmitting and receiving data. The intelligent mobile telephone 110 may be a cellular phone or a mobile personal digital assistant (PDA) with embedded cellular phone technology. The intelligent mobile telephone 110 may be a computer that includes one or more software or hardware applications for performing communications between the intelligent mobile telephone 110 and servers across the data network 130. The intelligent mobile telephone 110 may have various input/output devices with which a user may interact to provide and receive audio, text, video, and other forms of data. For example, the intelligent mobile telephone 110 may include a screen on which may be displayed form data and with which the user may interact using a pointer mechanism to provide input to single-field or multi-field forms.

The telephone network 120 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The data network 130 is configured to enable direct or indirect communications between the intelligent mobile telephone 110, the application server 140, and the call handling system 150 (or the IVR 152). Examples of the network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the data network 130 and the telephone network 120 are implemented by a single or otherwise integrated communications network configured to enable voice communications between the intelligent mobile telephone 110 and the call handling system 150 (or the IVR 152), and to enable communications between the intelligent mobile telephone 110, the application server 140, and the call handling system 150.

The application server 140 is configured to establish a data communications session with the intelligent mobile telephone 110 and to receive and send data to the intelligent mobile telephone 110 across the data network 130. The application server 140 also is configured to communicate with the call handling system 150 to send data received from the intelligent mobile telephone 110 to the IVR 152. The application server 140 also may send other application-related data that did not originate from the intelligent mobile telephone 110 to the IVR 152 or, more generally, to the call handling system 150. The application server 140 also is configured to communicate with the data store 160 to read and/or write user interaction data (e.g., state variables for a data communications session) in a shared memory space as described previously. The application server 140 may be one or more computer systems that operate separately or in concert under the direction of one or more software programs to perform the above-noted functions. In some implementations, the application server 140 and the call handling system 150 are a single integrated computer system.

The IVR 152 may include a voice gateway coupled to a voice application system via a data network. Alternatively, the voice gateway may be local to the voice application system and connected directly to the voice application system. The voice gateway is a gateway that receives user calls from or places calls to voice communications devices, such as the intelligent mobile telephone 110, and responds to the calls in accordance with a voice program. The voice program may be accessed from local memory within the voice gateway or from the application system. In some implementations, the voice gateway processes voice programs that are script-based voice applications. The voice program, therefore, may be a script written in a scripting language such as, for example, voice extensible markup language (VoiceXML) or speech application language tags (SALT). The voice application system includes a voice application server and all computer systems that interface and provide data to the voice application server. The voice application system sends voice application programs or scripts to the voice gateway for processing and receives, in return, user responses. The user responses are analyzed by the voice application system and new programs or scripts that correspond to the user responses may then be sent to the voice gateway for processing. The voice application system may determine which programs or scripts to provide to the voice gateway based on some or all of the information received from the intelligent mobile telephone 110 via the application server 140. The IVR 152 also is configured to communicate with the data store 160 to read and/or write user interaction data (e.g., state variables for a data communications session) in a shared memory space as described previously.

The call center 154 of the call handling system may include, among other components, an inbound call queue, an outbound call request queue, a call router, an automatic call distributor ("ACD") administrator, and a plurality of call center agents. The call center 154 may receive one or more calls from one or more voice communication devices, such as the intelligent mobile telephone 110, via the telephone network 120 and may make one or more outbound calls to voice communication devices via the telephone network 120. The call center 154 may determine an appropriate call center agent to route the call to or to assign an outbound call to. The determination of an appropriate agent may be based on agent performance metrics and information known about the inbound or outbound call. The determination of the appropriate agent may, for example, be based on some or all of the form information and/or other optional information received from the intelligent mobile telephone 110.

Figure 3A:
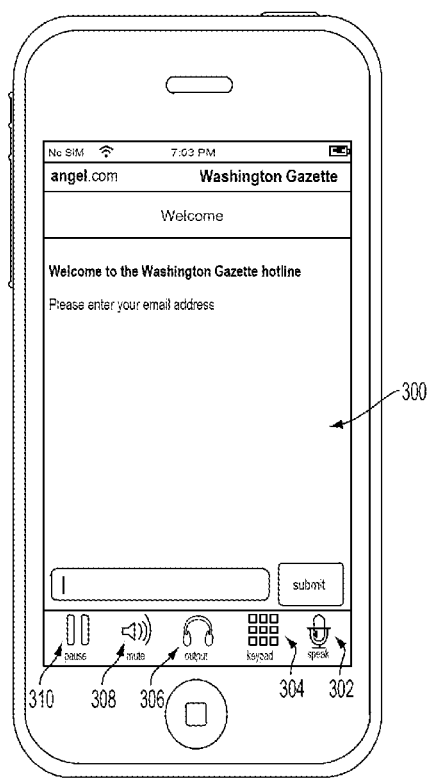
FIGS. 3A-3F are illustrations of a smart phone graphical user interface (GUI) for a multimodal application.

FIGS. 3A to 3F are illustrations of a smart phone GUI for a multimodal application. As shown in FIG. 3A, the smart phone display 300 may be a display that includes graphical buttons or icons that the user can select to interact with the multimodal application stored on the intelligent mobile telephone 110. The user can select the graphical buttons or icons by, for example, depressing them with a finger or stylus (when the display is touch sensitive) or otherwise using some other pointer mechanism to select them (e.g., by using a mouse pointer that moves across the screen via a touch sensitive pad or a trackball).

FIG. 3A shows an example of an initial display 300 presented to the user upon the user selecting to invoke a multimodal application corresponding to the Washington Gazette. The initial display 300 is a welcome page that prompts the user to enter his or her e-mail address. The user may select a speak graphical button 302 to provide the e-mail address by speaking the e-mail address into the intelligent mobile telephone 110 such that the spoken e-mail address is then provided to the voice solution platform via the IVR 152. Alternatively, the user may select a keypad graphical button 304 to provide the e-mail address by typing the e-mail address into the intelligent mobile telephone 110 such that the typed e-mail address is then provided to the voice solution platform via the application server 140. Selection of the buttons 302 and 304 may, for example, result in the smart phone communicating corresponding signals to the application server 140 that, in turn, communicates with the IVR 152 to cause the IVR 152 to branch to multimodal action pages or to question pages as needed to receive the e-mail address via the keyboard input or through speech, respectively. Question voice pages and multimodal action pages are described later in reference to FIGS. 5A-5N.

Additionally, the user also may select to have some or all of the information outputted to the user by the voice solution platform spoken to the user, rather than displayed graphically on the interface of the intelligent mobile telephone 110, by selecting the headphones output graphical button 306. The user may select to mute the sound played by the intelligent mobile telephone 110 by selecting the mute graphical button 308 and may select to pause any sound or speech provided by the intelligent mobile telephone 110 by selecting the pause button 310. Selection of the buttons 306 and 308 may, for example, result in the smart phone communicating corresponding signals to the application server 140 that, in turn, communicates with the IVR 152 to cause the IVR 152 to branch to multimodal action pages or to message pages as needed to provide information to the user via speech or via text (or image or video), respectively. Message voice pages and multimodal action pages are described later in reference to FIGS. 5A-5N.

Figure 3B:
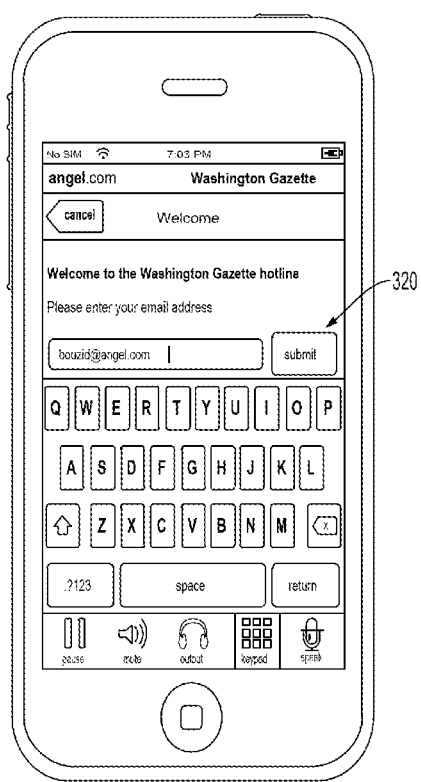

FIG. 3B shows an example of the keypad display 320 that may be presented to the user for entry of the e-mail address upon the user selecting the keypad graphical button 302. As shown in display 320, the keypad graphical button 304 is highlighted, indicating that the user has selected to type in the e-mail address rather than speak the e-mail address. Since e-mail addresses are almost impossible to accurately capture using an IVR, the multimodal application, in some implementations, may disable the "speak" graphical button 302 or otherwise not allow the user to speak the e-mail address. In these implementations, the user may automatically be presented with the keypad upon selecting to enter the e-mail address or, alternatively, may only be able to respond to the request by selecting the keypad graphical button 304 and then entering the address via the keypad display 320.

Figure 3C:
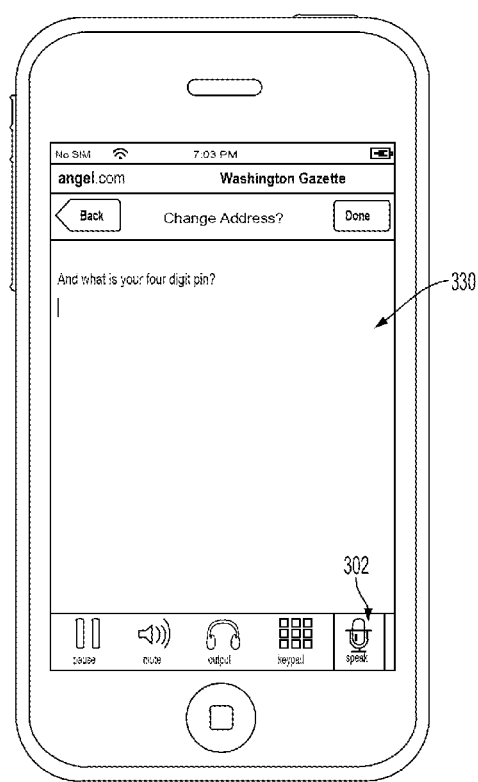

FIG. 3C shows an example of a display 330 presented to the user on the intelligent mobile telephone 110 after the user has selected to change his or her address and is prompted to enter a four digit pin number for security purposes. As shown in the display 330, the speak graphical button 302 has been highlighted, indicating that the user has selected to speak the 4 digit pin into the phone, rather than type the 4 digit pin into the phone using the keypad.

Figure 3D:
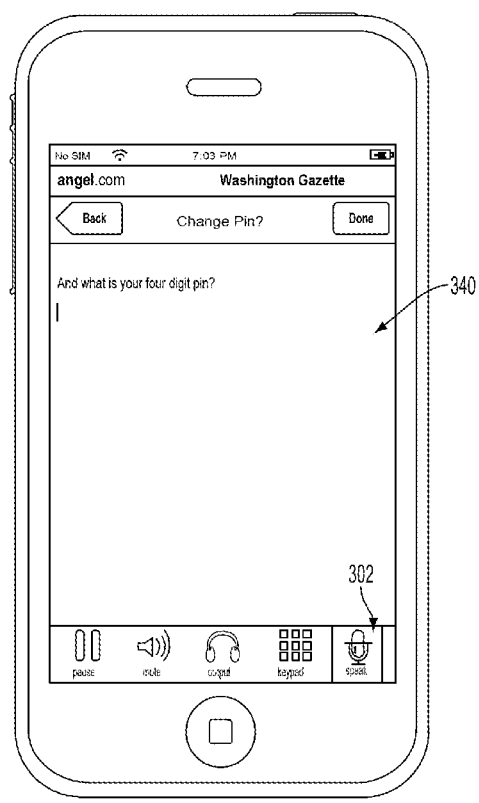

FIG. 3D shows an example of a display 4640 presented to the user on the intelligent mobile telephone 110 after the user has selected to change his or her pin and is prompted to enter a four digit pin number for security purposes. As shown in the display 4640, the speak graphical button 302 has been highlighted, indicating that the user has selected to speak the 4 digit pin into the phone, rather than type the 4 digit pin into the phone using the keypad.

Figure 3E:
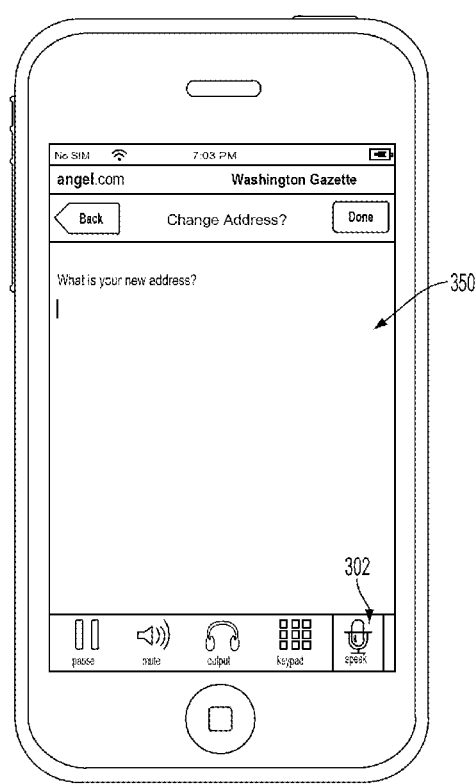

FIG. 3E shows an example of a display 350 presented to the user on the intelligent mobile telephone 110 after the user has selected to change his or her address and has successfully provided a pin through interacting with the voice solution platform. As shown in the display 350, the speak graphical button 302 has been highlighted, indicating that the user has selected to speak his or her new address into the phone, rather than type his or her new address into the phone using the keypad.

Figure 3F:
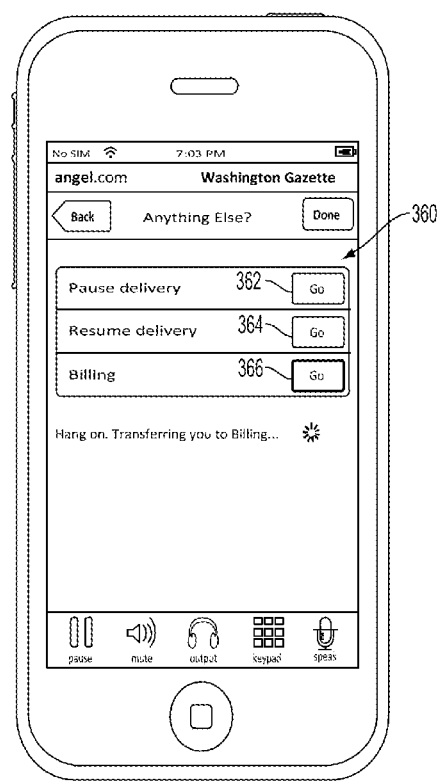

FIG. 3F shows an example of a display 360 presented to the user on the intelligent mobile telephone 110 that allows the user to pause or resume delivery of the Washington Gazette and select to be transferred to a billing department for the Washington Gazette. In particular, the display 360 includes a graphical button 362 selectable to pause delivery of the Washington Gazette, a graphical button 364 selectable to resume delivery of the Washington Gazette, and a graphical button 366 selectable to connect the intelligent mobile telephone 110 to the billing department of the Washington Gazette. As shown in the display 360, the user has selected the graphical button 366, which is shown highlighted in the display 360, and the voice solution platform is now connecting the intelligent mobile telephone 110 to the billing department of the Washington Gazette. For example, the voice solution platform may connect the intelligent mobile telephone 110 to the billing department of the Washington Gazette by ending the voice communications session between the IVR 152 and the intelligent mobile telephone 110 and establishing a new voice communications session between the IVR 152 and a call center having one or more agents that handle billing. The call center may be part of the call handling system 150. The new voice communications with the call center may be established in parallel with the existing data communications session with the application server 140 such that the communications sessions overlap and allow sharing information between the call center and the application server 140 via the shared memory space in a manner analogous to that described previously with respect to the IVR 152 and the application server 140.

Figure 4:
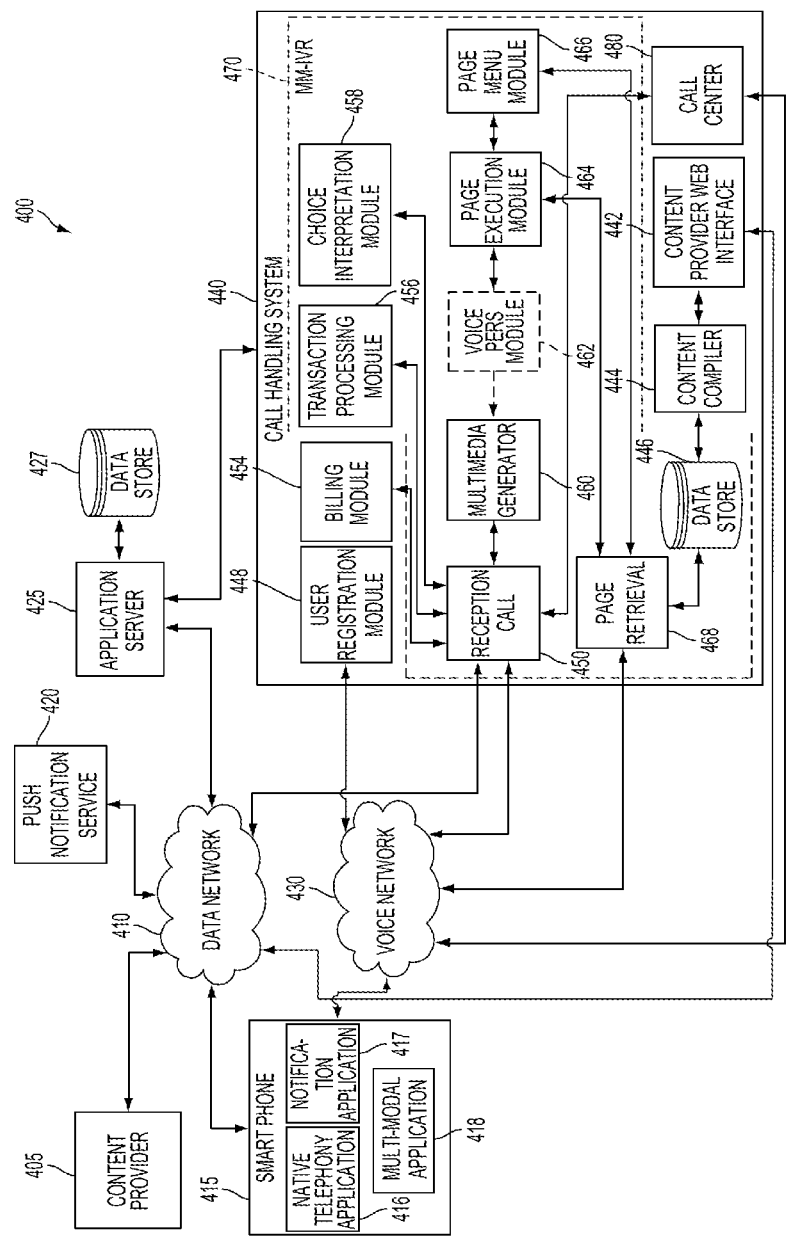
FIG. 4 illustrates an example of a system that enables multimodal interaction between a smart phone user and a multimodal interactive voice response system (MM-IVR).

FIG. 4 illustrates an example of a communications system 400 that enables multimodal interaction between a smart phone user and a multimodal interactive voice response (MM-IVR) system. The communications system 400 is a particular implementation example of the communications system 100 described above with reference to FIG. 1.

The communications system 400 includes a content provider 405 that accesses a call handling system 440 through a data network 410 to create/update a voice site belonging to the content provider 405 that is hosted by the call handling system 440. The call handling system 440 is capable of hosting multiple voice sites that are created by multiple different content providers. In an alternative implementation, the call handling system 440 may host only a single voice site for one content provider. The data network 410 is analogous to and is a particular example of the data network 130 of communications system 100, while the call handling system 440 is similar to and is a particular example of the call handling system 150 of communications system 100.

The communications system 400 includes a smartphone 415 that is used by a user to interact with the voice site of the content provider 405 using an MM-IVR 470 that is included in the call handling system 440. The call handling system 440 communicates with an application server 425 component that is used for processing graphical and textual information with the smart phone 415. The MM-IVR 470 interacts with the applications server 425 to support multimodal interaction between a smartphone and a voice site. The MM-IVR 470 or the application server 425, or a combination of the two, may be configured to support multimodal interactions in multiple parallel communications sessions from multiple different users who call multiple different voice sites hosted by the call handling system 440.

The communications between the smart phone 415 and the call handling system is over the voice network 430, while the communications between the smart phone and the application server 425 is over the data network 410. The smart phone 415 is analogous to and is a particular example of the intelligent mobile telephone 110 of communications system 100. The MM-IVR 470 is analogous to and is a particular example of the IVR system 152 of communications system 100. The voice network 430 is analogous to and is a particular example of the telephone network 120 of communications system 100. The communications system 400 also includes a push notification service 420 for interfacing between the smart phone 415 and the application server 425.

The content provider 405 may be a company that is interested in providing a call-based customer service to users of its product or service. For example, the content provider 405 may be an Internet service provider (ISP) interested in providing technical support to its customers using a voice site. Alternatively, the content provider 405 may be a cable company or a satellite company that is interested in providing technical support for its modems to its customers using a voice site.

The content provider 405 may utilize the services of a voice site hosting service that provides the call handling system 440, to create and configure a voice site that is hosted on servers belonging to the voice site hosting service. The voice site hosting service may provide a content provider web interface 442 as part of the call handling system 440 to enable the content provider to easily create and configure a voice site that will be accessed by customers for technical support.

The content provider web interface 442 is a web-based GUI front-end for an application development tool that can be used to build an enhanced voice site that is capable of multimodal interaction with a caller. The content provider 405 may access the content provider web interface 442 over the data network 410 e.g., using a web browser that runs on a computer with Internet connectivity used by the content provider. The data network 410 may be a publicly available network that is capable of multimedia data communications including images, text, video and voice, e.g. the Internet. In an alternative implementation, the data network 410 may be a public network different from the Internet, or a private network, or a combination of public and private networks.

By accessing the application development tool using the content provider web interface 442, the content provider 405 may create different types of pages that will be used by the MM-IVR system 470 when processing a call to the voice site being created by the content provider 405. The types of pages that may be created by the content provider 405 using the application development tool may include, for example: (1) a message page; (2) a question page; (3) a logic page; (4) a transaction page; and (5) a multimodal action page. In addition, the types of pages that may be created by the content provider 405 using the application development tool may include, for example: an address capture page, a call queue page, a call transfer page, a data page, a name capture page, a reverse phone lookup page, a schedule page and a voicemail page. FIGS. 5A-5N illustrate an example of an application development tool having a content provider web interface 442, and a voice site that is created using the application development tool, with the voice site including different types of pages.

The pages created by the content provider 405 using the content provider web interface 442 are interpreted and/or compiled by a content compiler 444 included in the call handling system 440 to generate scripts that are executed by the MM-IVR 470 as the MM-IVR 470 interacts with a caller calling the voice site created by the content provider 405. For example, the content compiler 444 may generate VoiceXML scripts for message pages, question pages and logic pages that are created for the voice site by the content provider 405. The VoiceXML scripts may be executed by the MM-IVR 470 as the MM-IVR 470 interacts over the voice network 430 with a caller to the voice site.

The VoiceXML scripts generated by the content compiler 444 are stored in a data store 446 in the call handling system 440. The MM-IVR 470 may access the scripts from the data store 446 and process them when the MM-IVR 470 interacts using voice interactions with a caller to the voice site created by the content provider 405.

In addition to the VoiceXML scripts, the content compiler 444 may also generate other types of scripts (e.g. Java scripts) and other types of executable code using other programming languages based on transaction pages and multimodal action pages that may be created for the voice site by the content provider 405. The other types of scripts may be used by the application server 425 to interact over the data network 410 with the caller to the voice site. In response to or based on instructions received from the MM-IVR 470, the application server 425 may execute the other types of scripts (e.g. Java scripts) and generate appropriate multimodal instructions that are communicated to the smart phone 415 over the data network 410 (for multimodal action pages). Additionally or alternatively, the application server 425 may execute the other types of scripts (e.g. Java scripts) and generate a transaction that processes data, which may then be stored in a variable for subsequent access by the MM-IVR 470 (for transaction pages). Execution of a part of the scripts (e.g., Java scripts) by the application server 425 may result in information being communicated back to the MM-IVR 470 indicating that the processing corresponding to the page (i.e., the multimodal action page or the transaction page) is completed. The application server 425 also is configured to communicate with the call handling system 440 (i.e., the MM-IVR 470 and/or the call center 480) to send form data and other data received from the smart phone 415 to the call handling system 440.

The scripts used by the application server 425 are stored in a data store 427 that is accessible by the application server. For example, the data store 427 may be a high-capacity hard drive that is resident on the same device hosting the application server 425, or the data store 427 may be an array of high-capacity storage drives that are closely coupled to the application server 425. In an alternative implementation, the scripts used by the MM-IVR 470 and the scripts used by the application server 425 are stored in a single data store, e.g., the data store 446 that is located within the call handling system 440.

The smart phone 415 may be an intelligent telephonic device including a display or screen for providing visual information to the user of the smart phone 415, a processor with sufficient processing power to execute instructions sent by the application server 425 and sufficient memory to store data including text, images, video and audio files. For example, the smart phone 415 may be an iPhone™ or an Android™ —enabled smart phone. The display or screen of the smart phone 415 may be used to displayed text, images, video or form data and the user of the smart phone 415 may interact with the display using a pointer mechanism to provide input to single-field or multi-field forms. The smart phone 415 includes one or more software programs called applications (also referred to as clients) that are used to perform various functions. The smart phone 415 includes a native telephony application 416 that is used by the user of the smart phone 415 to place a call by dialing a number of the called party. For example, when the user of the smart phone 415 wants to call the voice site created by the content provider 405, the user may launch the native telephony application 416 by, for example, clicking on an icon on the display of the smartphone that represents the native telephony application 416. The native telephony application 416, when launched, may provide the user with an alphanumeric keypad to enable the user to dial the number corresponding to the voice site. The call placed from the native telephony application 416 to the voice site is communicated to the call handling system 440 over the voice network 430. The voice network 430 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The smart phone 415 may also include a notification application or service 417 that is used for generating pop-up notifications on the smart phone display based on instructions and/or data received from servers communicating with applications on the smart phone 415. For example, when the application server 425 communicates instructions and/or data to the smart phone 415 as part of the multimodal interaction between the user and the voice site, the instructions and/or data may trigger the notification application 417 to generate a pop-up on the smart phone display asking the user permission to launch the multimodal application 418 that is configured to handle the instructions and/or data communicated by the application server 425. In an alternative implementation, the notification application 417 may be used to interface all instructions and data from servers communicating with applications on the smart phone 415. All data communications to the smart phone 415 may be received by the notification application 417 and then transferred to the corresponding applications to which the data communications are directed.

The smart phone 415 also includes a multimodal application 418 that is used by the user to interact with the voice site in a multimodal manner. As described with respect to FIG. 1, the application is referred to as multimodal in that it enables users to interact with the voice site using multiple different communications modes. For example, the user may provide information to the voice site by writing or speaking and may receive information from the voice site by hearing or reading.

The multimodal application 418 is a thin client capable of interacting with the MM-IVR 470. In some implementations, the thin client is a conventional smart phone application that includes an add-on or plug-in that provides multimodal functionality to a conventional smart-phone application. The thin client and/or the add-on or plug-in may be generated by the call handling system 440 when the content provider 405 creates the voice site using the content provider web interface 442 and the content compiler 444. The thin client and/or the add-on or plug-in may be downloaded by the smart phone 415 from a server hosted by the call handling system 440.

In one implementation, each voice site may have a dedicated multimodal application that is used exclusively to allow a user to interact with the voice site. Therefore the smartphone 415 may have more than one multimodal application installed on the smart phone 415, one for each enhanced voice site that is accessed by the user of the smart phone 415. In another implementation, a single multimodal application may be configured to allow a user to interact with multiple voice sites. In this case, the smartphone 415 may have one multimodal application installed on the smart phone 415, and the content that is provided to the user using the multimodal application may be different for different voice sites accessed by the user.

The user of the smart phone 415 may invoke the multimodal application 418 stored in the smart phone 415 by selecting a graphically displayed icon on the display of the smart phone 415. When the multimodal application 418 is launched on the smart phone 415, a data communications session is established between the multimodal application 418 and the application server 425. The interaction between the user and the voice site occurs simultaneously using the data communications session for exchange of text, images and/or video between the multimodal application 418 and the application server 425, and using a voice communications session that is established between the native telephony application 416 and the MM-IVR 470 for exchange of voice information. As described previously, FIGS. 3A-3F illustrate an example of a GUI for a multimodal application running on a smart phone that may be used for interaction between the smart phone and an enhanced voice site. FIGS. 6A-6D illustrate another example of a GUI for a multimodal application running on a smart phone that may be used for interaction between the smart phone and another enhanced voice site.

The system 400 includes a push notification service 420 that interfaces between applications running on the smart phone 415 and application servers that interact with the applications running on the smart phone 415. The push notification service may be provided by an entity that is independent of either the content provider 405 or the voice site hosting service that provides the call handling system 440. The push notification service 420 may be provided by the manufacturer of the smart phone 415 e.g., the Orange push notification service where Orange is the name of the manufacturer of the smart phone 415. All communications from the application server 425 to the multimodal application 418 is sent to the push notification service 420 over the data network 410. The push notification service 420 then "pushes" the communications to the smart phone 415, where the communications is received by the notification application 417 and/or the multimodal application 418. If a communication is received by the notification application 417 and the multimodal application 418 is not running, the notification application 417 may generate a pop-up notification that is displayed to the user on the display of the smart phone 415. The pop-up notification may ask the user for permission to launch the multimodal application 418. If the user agrees, the user may select an affirmative button icon provided on the pop-up notification. This will send a trigger to the smart phone 415 logic to launch the multimodal application 418, without requiring the user to select a GUI icon for the multimodal application 418 on the display of the smart phone 415.

In an alternative implementation, the push notification service 420 may not be present and all communications from the application server 425 to the multimodal application 418 is sent directly to the smart phone 415 over the data network.

The application server 425 may be a server computer with high processing capabilities that is owned and operated by the voice site hosting service providing the call handling system 440. Alternatively, the application server 425 may represent a host of server devices having lower processing capabilities that are placed on racks that are tightly integrated with one another with various tasks being distributed between the different servers depending on the load on the servers at the time of the task distribution. The application server 425 may be co-located with the call handling system 440 such that the MM-IVR 470 and the application server 425 are able to share the same resources, e.g., memory and/or processor capacity. Alternatively, the application server 425 may be located in a location that is different from the location of the call handling system 440, with a dedicated high-speed and high-bandwidth network connection coupling the application server 425 to the call handling system 440.

In an alternative implementation, the application server 425 may represent a server farm that is owned and operated by an independent provider different from the content provider 405 or the voice site hosting service providing the call handling system 440. For example, the application server 425 may be Amazon.com's Elastic Compute Cloud (Amazon EC2™) service that provides resizable compute capacity in the "cloud" (i.e., the Internet). The voice site hosting service providing the call handling system 440 may lease computing capacity and/or storage on the application server 425 cloud for executing and storing scripts that enable the multimodal interaction between the smart phone 415 and the enhanced voice site created by the content provider 405.

The call handling system 440 facilitates the creation and hosting of voice sites. The voice sites are both standard voice sites without multimodal features and enhanced voice sites incorporating multimodal features. The call handling system 440 utilizes various components to enable the creation and hosting of voice sites. The various components of the call handling system 440 may be co-located in a single physical location, or they may be geographically distributed, with dedicated high capacity links interconnecting the various components.

The call handling system 440 includes a registration module 448 that handles the registration of content provider 405 of different voice sites. The registration module 448 enables the content provider 405 to contact the call handling system 440 and establish an account for billing and personalization purposes. To pre-register, the content provider 405 may input name, address, contact information, payment mechanism information, preferences, demographic information, language, etc. Other types of information requested during registration may be input and stored as well. The call handling system 440 may assign the content provider 405 with a registration number that may be used to access pages for the voice site using the content provider web interface 442. Further, the content provider 405 may personalize how services are to be billed, may input payment information for use in transaction processing, and may select personalization features for delivery of voice content, including specification of information for use by voice personalization module 462. In one implementation, the registration module 448 may provide a web subscription interface to enable potential subscribers to connect over the World Wide Web in order to sign up for the voice site hosting services.

The call handling system 440 includes a call reception module 450 for receiving calls from users who are calling various voice sites hosted by the call handling system 440. For example, when the user of the smart phone 415 calls the voice site created by the content provider 405, the call is received at the call reception module 450. The call reception module 450 also delivers voice content to the smart phone 415. The call handling system 440 may be configured such that a call to a voice site hosted by the call handling system 440 is received at the call reception 450, i.e., the call reception 450 may act as a proxy for the calling numbers of all the voice sites hosted by the call handling system 440.

The call handling system 440 includes a page execution module 464 for executing the contents of pages corresponding to the voice site that is called. Execution of the content may include playing the content, scanning the page for certain tags or markers to include other page information, generate call menus and other tasks. Page execution module 464 may coordinate with a page menu module 466 that is provided within the call handling system 440. Page menu module 466 presents, receives and interprets menu options presented in a page. Page menu module 466 may comprise a VoiceXML interpretation module that utilizes VoiceXML or other voice-based XML file formats as the pages to understand the menus that are to be presented to the user to enable the user to maneuver within the MM-IVR 470. Page menu module 466 may also comprise a VoiceXML interpretation module, a Nuance Grammar or Speech Works specification language module or a Java Speech grammar format module. Page menu module 466 may interpret predefined menu options and determine which of the options to execute based on choices selected by the user from a choice interpretation module 458, as described below.

The call handling system 440 also includes a multimedia generator module 460 for outputting voice signals to the smart phone 415 over the voice communications session, and for outputting text, images and video to the smart phone 415 over the data communications session using the application server 425. The multimedia generator module 460 may play voice files, may comprise a text-to-voice conversion module for "reading" text files as voice output or any other type of module for taking a data file and generating voice output to be directed by the call reception 450 to the user of the smart phone 415.

A voice personalization module 462 may be provided optionally that enables the user of the smart phone 415 to select personalized features for the voice content of the voice site created by the content provider 405. Personalization features may include tone, pitch, language, speed, gender, volume, accent, and other voice options that a user may desire to make the information more understandable or desirable. Voice personalization module 462 modifies how multimedia generator module 460 generates voice content to correspond to the smart phone 415 user's desired choices. The voice personalization features may be set by the user of the smart phone 415 upon subscribing and automatically applied when that user logs into the system. Personalization module 462 retrieves information from subscriber database once the user is connected to the voice site and has provided his registration/subscription. In doing so, the user does not need to specify additional information at any point during the session. If the user is filling out a form or running a transaction, his pre-fetched information is placed where necessary. Personalization module 462 also may present the user with a portal page, allowing the user quick access to the content they frequently access. If the pages store user specific information, then personalization module 462 may retrieve that information. Personalization module 462 may also allow users to modify speech output settings as described above.

Some of the multimedia (e.g., text, images to video to display to the user of the smart phone 415) that is used by the voice site is generated by the application server 425. The page execution module 464 executes a VoiceXML script that is retrieved from the data store 446 using the page retrieval module 468 and based on the execution of the VoiceXML script, the page execution module 464 sends a communication to the application server 425 to instruct the application server 425 to (1) execute its own script (e.g., Java script) to generate an appropriate multimodal instruction and communicate the multimodal instruction to the smart phone 415 over the data network 410 (for a multimodal action page); or (2) execute its own script (e.g., Java script) to execute a transaction that processes data, which may then be stored in a variable for subsequent access by the MM-IVR 470 (for a transaction page). Execution of part of the scripts (e.g., Java scripts) by the application server 425 may result in communication of a signal back to the page execution module 464 indicating that the processing corresponding to the page (i.e., the multimodal action page or the transaction page) is done. The page execution module 464 may then commence the processing of the next page. In another implementation, the page execution module 464 immediately or at a predetermined time later automatically begins processing the next page without waiting to receive a communication from the application server 425 that the execution of the multimodal action page or the transaction page is completed.

The call handling system 440 also may include a choice interpretation module 458 that may be used to interpret responses from the user of the smart phone 415, such as those based on menu options. Choice interpretation module 458 cooperates with page menu module 466 and call reception 450 to enable call handling system 440 to respond to user requests based on menu options presented within a page. For example, if the menu provided by the page includes five options, choice interpretation module 458 may determine which of the five options to execute based on the input received through call reception 450 from the user. If the user presses the number 1 on the smart phone 415, then choice interpretation module 458 generates a signal that indicates to page menu module 466 to execute choice 1. Choice interpretation module 458 may comprise a more complicated system as well. Various call menu technologies generally are known and can be used. The user may also be able to respond with voice-based choices. Choice interpretation module 458 then uses voice-to-text conversion, natural language interpretation and/or artificial intelligence to determine which of the available menu options the user desires. Other systems for interpreting and executing user menu choices may also be used for choice interpretation module 458.

The call handling system 440 additionally may include a transaction processing module 456 for processing transactions presented in a page. Transactions may include purchase of goods, request for services, making or changing reservations, requesting information, and any other type of transaction that may be performed by the smart phone 415 or other information exchange system. The transaction processing module 456 may be used to process transactions that occur based on voice information received by the call reception 450 from the user of smart phone 415. Other types of transactions that include text, images or video information, are processed using the application server 425, as described previously.

The call handling system 440 also may include a billing module 454 for monitoring the smart phone 415 user's access to various pages and enabling the call handling system 440 to allocate fees received from the user to content providers, transaction processors, and others. Billing module 454 may be used to record the time the user logs into the voice site, to record times when users access new pages, to record when users perform transactions, and other types of information that may be used for determining how to allocate fees received from the user for accessing the voice site.

Billing module 454 may compute time spent and pages accessed on the voice site for each page. In one implementation, the billing module 454 receives a credit value for the page as specified by the content provider and calculates the charges on a minute-basis throughout the call session. This information may be stored in a user statistics database and/or the data store 446 and/or the data store 427. For each call, billing module 454 may track time of day/day of week, call duration, call origin, pages visited, etc. For each page, it may track "hit" frequency, revenue generated, demographics, etc. It may also track the advertisements presented, transactions performed, and other information.

In some implementations, the call handling system 440 may optionally include a call center 480. The call center 480 is analogous to and is a particular example of the call center 154 of communications system 100. The call center 480 of the call handling system 440 may include, among other components, an inbound call queue, an outbound call request queue, a call router, an automatic call distributor ("ACD") administrator, and a plurality of call center agents. The call center 480 may receive one or more calls from one or more telephonic devices, such as the smart phone 415, that are routed to the call center by the MM-IVR 470, for example, through the execution of scripts corresponding to a call transfer page. In addition, the call center 480 may make one or more outbound calls to telephonic devices via the voice network 430. The call center 480 may determine an appropriate call center agent to route the call to or to assign an outbound call to. The determination of an appropriate agent may be based on agent performance metrics and information known about the inbound or outbound call. The determination of the appropriate agent may, for example, be based on some or all of the form information and/or other optional information received from the smart phone 415.

FIGS. 5A-5N illustrate a GUI 500 for an application development tool that is used by a content provider to create a multimodal voice site. The GUI 500 may be implemented by the content provider web interface 442 and presented to the content provider 405 when the content provider 405 accesses the call handling system 440 using a web browser over the data network 410 to create/manage the voice site. The following describes the different components of the GUI 500 with respect to the system 400 that is described with reference to FIG. 4. Specifically, the components of the GUI 500 are described as used by the content provider 405 to create a voice site for providing technical support to users of a product (e.g., a wireless cable modem) associated with the content provider 405. However, the GUI 500 and the associated application development tool may be used by other systems, content providers or application developers, among others.

FIG. 5A illustrates a multimodal setup page 505 that is presented to the content provider 405 when the content provider 405 logs into the call handling system 440 to create the voice site. The phone number associated with the voice site that will be called by the user is specified by the phone number 505a. In one implementation, the voice site may have multiple phone numbers 505a associated with the voice site. The multimodal setup page 505 may be used to identify the images, text files, and video files that are required for the multimodal interaction defined by the voice site. The images, text files, and video files are specified by the content provider 405 using the file names 505b. To select an image file, the content provider 405 clicks on the "Link Image" link that opens a pop-up window displaying a list of images that are uploaded by the content provider 405. To select a video file, the content provider 405 clicks on the "Link Video" link that opens a pop-up window displaying a list of video files that are uploaded by the content provider 405. To select a text file, the content provider 405 clicks on the "Link Text" link that opens a pop-up window displaying a list of text files that are uploaded by the content provider 405. The content provider 405 can clear the file selection that it has previously made by clicking on the "Clear" link. The content provider 405 can view the file selection that it has made by clicking on the "View" link. A previously selected file can be deleted by checking the radio button to the left of the file, and then clicking the "Delete" button icon. A new file can be added by clicking the "Add File" button icon. An added file can be rearranged by checking the radio button to the left of the file and then clicking the "Up" button icon to move the file up in the order, or the "Down" button icon to move the file down in the order.

When the user of smart phone 415 calls the voice site and launches the multimodal application 418 on the smart phone 415 to interact with the voice site, the MM-IVR 470 executes a script based on the information included in the multimodal setup page 505 and instructs the application server 425 to send a signal to the smart phone 415 that provides an indication of all the files that are necessary for the multimodal application 418 to interact with the voice site. The files that are necessary may be, for example, the files that are specified by the content provider 405 on the multimodal setup page 505. Upon receiving the signal from the MM-IVR 470/application server 425, the multimodal application 418 checks in the local memory of the smart phone 415 to see whether the necessary files as indicated by the signal from the MM-IVR 470, are present on the smart phone 470. If the multimodal application 418 determines that one or more of the necessary files are not present, then the multimodal application 418 sends a message to the application server 425 including information on the necessary files that are not locally present on the smart phone 415. Upon receiving the message from the multimodal application 418 with the information on the files that are not present locally on the smart phone 415, the application server 425 pushes the missing files to the smart phone 415. The order in which the files are downloaded may be, for example, from top to bottom as specified on the site multimodal setup page 505. Therefore, the top to bottom order may match the order in which the files will be used by the voice site during the multimodal interaction.

The variable 505c that is used to store the caller id that is required to identify the smart phone 415 from which the call is made also may be stored on the site multimodal setup page 505. The variable 505c may be selected from a list of variables previously specified by the content provider by clicking on the "Select a Variable" drop-down menu button.

Figure 5B:
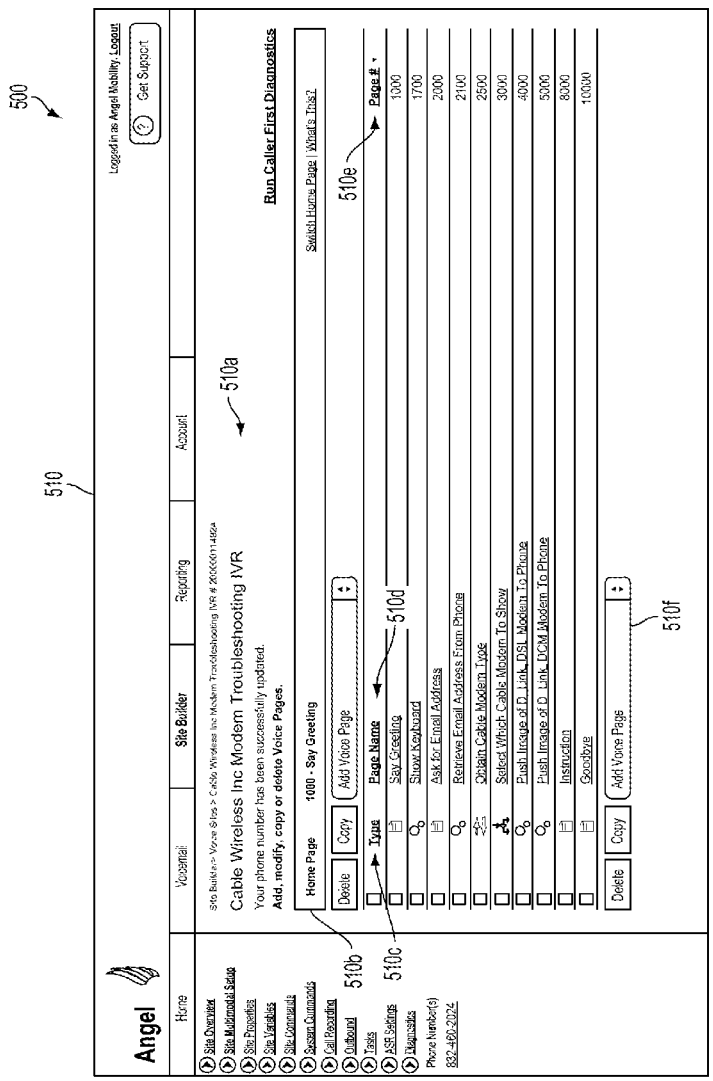

FIG. 5B illustrates a Site Overview page 510 that provides a listing of the different pages created by the content provider 405 to define the voice site. The Site Overview page 510 lists all the pages that are included in the voice site. The name of the voice site is specified in the heading 510a of the Site Overview page 510, e.g., "Cable Wireless Inc. Modem Troubleshooting IVR." When the user of smart phone 415 interacts with the voice site, the first page that is processed is determined by the 'Home Page' field 510b. The content provider 405 may specify any page that the content provider wants to be processed first as the Home Page 510b. In some implementations, the first page in the listing of pages is the same page that is listed as the 'Home Page' 510b. However, in other implementations, the page that is as the 'Home Page' 510b is not the first page in the listing of the pages in the Site Overview page 510. The order in which the various pages are processed is determined by the links in the respective pages. Each page usually contains a link to the next page that is to be processed. As described previously, each page created by the content provider 405 has a type that may be one of the following: (1) message page; (2) question page; (3) logic page; (4) transaction page; and (5) multimodal action page. The type of each page is specified by an icon associated with that particular type in the Type field 510c in the ordered listing of the pages. A voice site may have multiple pages of the same type. For example, the voice site illustrated in the Site Overview page 510 has four pages of type message page, including the pages "Say Greeting", "Ask for Email Address", "Instruction" and "Goodbye." Each of the pages may be identified by a page name that is shown in the Page Name field 510d. In addition or as an alternative to the page name, each page also may be identified by a page number that is shown in the Page # filed 510e. The page name and page number of a page are specified by the content provider 405 when creating the pages for the voice site. A page may have a unique page name, or it may have a page name that is similar to the page name of another page. In case two or more pages share the same page name, they may be differentiated based on the page numbers. The combination of page name and page number uniquely identifies a page. The content provider 405 may create a new page by clicking the "Add Voice Page" drop-down menu button icon 510f When the "Add Voice Page" drop-down menu button icon 510f is selected, a drop-down menu listing the available types of pages are displayed to enable the content provider to select the type of page it wants to add. Alternatively, a new page may be created by copying a previously created page. The content provider 405 may select the page to be copied by checking the radio button to the left of the page to be copied and then selecting the "Copy" button. An existing page can be deleted by checking the radio button to the left of the page, and then clicking the "Delete" button icon.

Figure 5C:
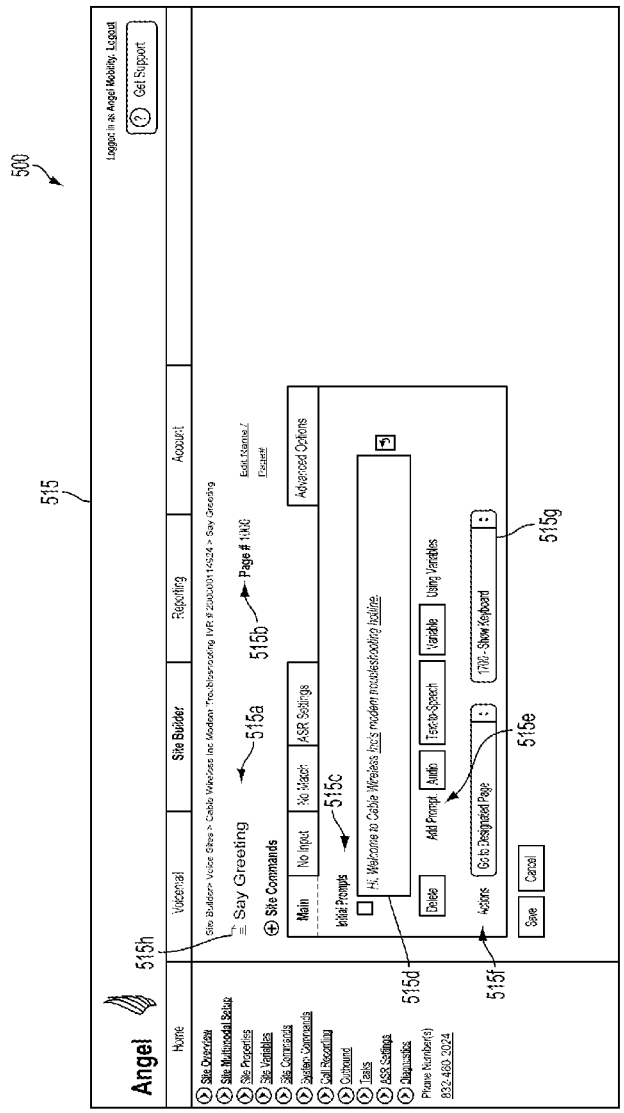

FIG. 5C illustrates a message page 515 that is the first page that is processed for the voice site illustrated by the Site Overview page 510. The voice page 515 is identified by its page name 515a and/or page number 515b. The page name 515a and the page number 515b corresponds to the name of the page shown in the Page Name field 510d and the number of the page shown in the Page # field 510e respectively, shown in the Site Overview page 510. The type of the page is represented by the icon 515h, which indicates that page 515 is a message page. The type of the page 515 corresponds to the type of the page shown in the Type field 510c in the Site Overview page 510, which is indicated by a similar icon.

The commands that are to be processed by the MM-IVR system 470 when the page 515 is executed are shown in the body of the page 515 under the heading "Site Commands." "Site Commands" refer to actions that the user may perform (e.g., by saying the command on the phone or pressing a button on the dial pad of the native telephony application 416, or by pressing a button displayed by the multimodal application 418 on the display of the smart phone 415) to come to that particular page in the voice site. The site commands may be available on all the pages, or on a subset of the pages included in the voice site.

Since page 515 is a message page, when the page 515 is executed, the MM-IVR system 470 prompts the user with a voice message that is specified using the "Initial Prompts" field 515c. The content provider 405 may define the voice message by typing in text in the text input field 515d. When the page 515 is executed, the MM-IVR system 470 prompts the user with a voice message corresponding to the text that is entered by the content provider 405. For example, the user of the smart phone 415 may hear the voice site say, "Hi. Welcome to Cable Wireless Inc.'s modem troubleshooting hotline."

The above example is a text-to-speech type of prompt. A text-to-speech type of prompt with a text input field is presented by default when a message page is created. The content provider 405 may delete the default text-to-speech type prompt and create a different type of prompt. The default text-to-speech type prompt may be deleted by checking the radio button next to the text input field and then selecting the "Delete" button. Alternatively, the content provider 405 may specify one or more other prompts in the message page 515. Prompts may be added by the content provider 405 by selecting a button icon corresponding to the type of prompt to be added, specified to the right of the Add Prompt 515e. The two other types of prompts are audio and variable. When the content provider 405 selects to add an audio prompt, the content provider 405 is able to specify a pre-recorded audio file that is stored in the call handling system 440, for example in the data store 446. When the page 515 is executed, the MM-IVR system 470 locates and plays the audio file specified by the audio prompt using its in-built audio player such that the user of the smart phone 415 hears the recording associated with the audio file. When the content provider 405 selects to add a variable prompt, the content provider 405 is able to specify a pre-determined variable that is specified by the content provider 405 for the voice site. When the page 515 is executed, the MM-IVR system 470 locates the variable specified by the variable prompt and plays the data associated with the variable to the user of the smart phone 415 using text-to-speech conversion. For example, if the content provider selects a variable that has the number 5 associated with it, the MM-IVR 470 will play audio information to the user using the native telephony application 416 that the user will hear as saying "Five."

In addition to the prompts, the content provider 405 may specify action commands 515f on the message page 515. The actions that are possible are specified by the drop-down menu list corresponding to the actions 515f. For example, the content provider may select the action "Go to Designated Page" and specify the page 515g that is executed in the sequence after the current page. Once the message page 515 is created and/or updated, the content provider 405 saves the message page 515 by selecting the "Save" button. The message page 515 is subsequently stored by the call handling system 440, for example, in the data store 446. Alternatively, the content provider 405 may elect to discard the additions/changes that have been made by selecting the "Cancel" button, in which case the additions/changes are not saved by the call handling system 440.

Figure 5D:
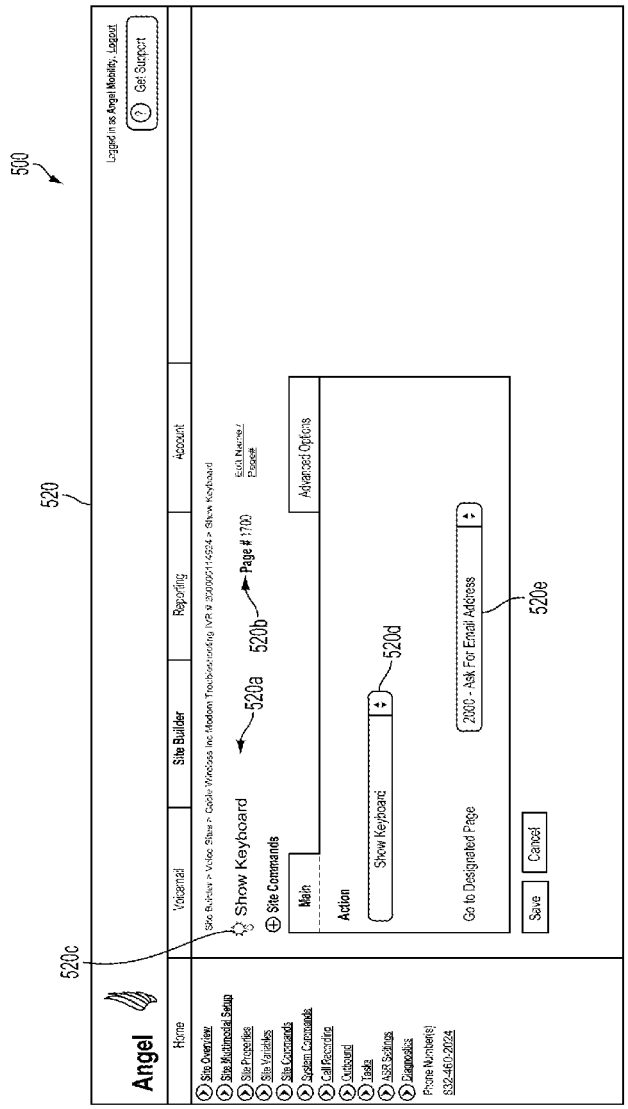

FIG. 5D illustrates a multimodal action page 520 that is processed by the MM-IVR 470 for the voice site based on the action 515f specified by the preceding page (i.e., message page 515). Similar to the voice page 515, the multimodal action page 520 is identified by its Page Name 520a and/or Page #520b. The Page Name 520a and the Page #520b corresponds to the name of the page shown in the Page Name field 510d and the number of the page shown in the Page # field 510e respectively, shown in the Site Overview page 510. The type of the page is represented by the icon 520c, which indicates that page 520 is a multimodal action page. The type of the page 520 corresponds to the type of the page shown in the Type field 510c in the Site Overview page 510, which is indicated by a similar icon.

The multimodal action page is a page type that enables multimodal interaction when included in a voice site. The type of multimodal interaction is controlled by the Action dropdown menu 520d. In one example implementation, three broad categories of multimodal interaction are offered through selection of corresponding options in the dropdown menu 520d:

1. pushing content to the phone (action parameter in the action instruction sent to the smart phone is one of 'PushImage', 'PushVideo', 'PushText');
2. show the keyboard of the phone (action parameter is 'ShowKeyboard'); and
3. getting content from phone (action parameter in the action instruction sent to the smart phone is one of 'GetImage', 'GetVideo', 'GetText').

As described previously, the multimodal action page 520 is executed by the application server 425. When the MM-IVR 470 processes the multimodal action page 520, it sends an instruction to the application server 425 to execute the multimodal action page 520. The commands that are processed by the application server 425 when the page 520 is executed are shown in the body of the page 520 under the heading "Site Commands." Based on the action 520d defined in the page 520 by the content provider 405, when the application server 425 executes a script corresponding to page 520, it generates an appropriate multimodal instruction that includes an action parameter and, optionally, a value parameter and communicates the multimodal instruction to the smart phone 415 over the data communications session. The action 520d specified on the multimodal action page 520 is "Show Keyboard" and corresponds, for example, to the action parameter "ShowKeyboard." Therefore the multimodal instruction communicated to the smart phone 415 instructs the multimodal application 418 to show the keyboard. Accordingly, the multimodal application 418 displays a keyboard to the user on the display of the smart phone 415 along with a text input field to enter text using the displayed keyboard.

After sending the instruction to the application server 425, the MM-IVR 470 processes the next action 520e specified in the multimodal action page 520, which instructs the MM-IVR 470 to go to the page numbered 2000 and with page name "Ask for Email Address." Once the multimodal action page 520 is created and/or updated, the content provider 405 saves the multimodal action page 520 by selecting the "Save" button. The multimodal action page 520 is subsequently stored by the call handling system 440, for example, in the data store 446 and/or the data store 427. Alternatively, the content provider 405 may elect to discard the additions/changes that have been made by selecting the "Cancel" button, in which case the additions/changes are not saved by the call handling system 440.

Figure 5E:
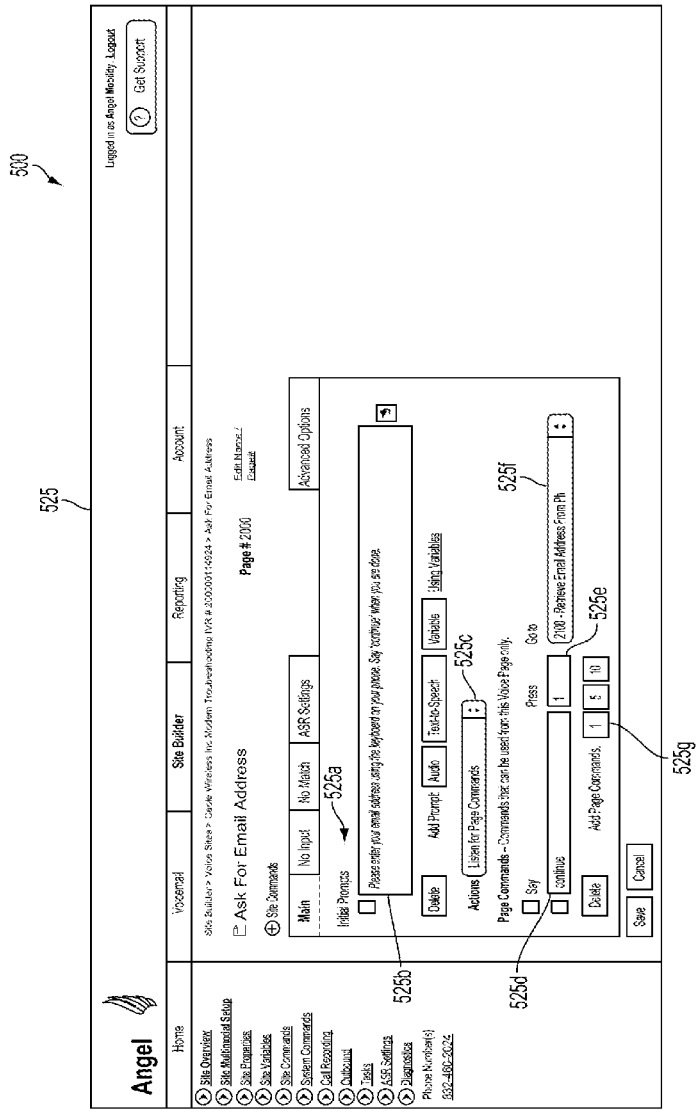

FIG. 5E illustrates a message page 525 that is executed by the MM-IVR 470 for the voice site based on the action 520e specified by the preceding page (i.e., the multimodal action page 520). The page name, page number and prompts fields of the message page 525 are similar to the message page 515, but the content are different. In the example shown, the message page 525 is used by the content provider 405 to ask the user accessing the voice site to provide the user's email address. Therefore the text that is entered by the content provider 405 in the text input field 525b corresponding to the prompt 525a, when audibly presented to the user using text-to-speech conversion by the MM-IVR 470, asks the user, "Please enter your email address using the keyboard on your phone. Say 'continue' when you are done." The message is played to the user using the native telephony application 416 on the smart phone 415, while the multimodal application 418 displays a keyboard and text input field on the display of the smart phone 415. In an alternative implementation, the message is played to the user using the multimodal application 418, while the multimodal application 418 simultaneously displays a keyboard and text input field on the display of the smart phone 415.

In addition to the prompt, the content provider 405 specifies a "Listen for Page Commands" action command 525c on the message page 525. The "Listen for Page Commands" action command instructs the MM-IVR 470 to receive page commands from the user of the smart phone 415 and process the received page command based on the definition of the page commands that are specified on the voice page 525. The content provider 405 may specify one, five or ten page commands by selecting one of the three buttons associated with the "Add Page Commands" 525g. The page command specified by the content provider 405 on the message page 525 instructs the MM-IVR 470 to wait for the user to either say "continue" 525d on the speaker of the smart phone 415 or press "1" 525e on the dial pad of the smart phone 415, and then process the page numbered 2100 and with page name "Retrieve Email Address From Phone" 525f. When the MM-IVR 470 receives a transmission from the smart phone 415 that is processed as indicating that the user has said "continue" 525d on the speaker of the smart phone 415 and/or pressed "1" 525e on the dial pad of the smart phone 415, the MM-IVR 470 retrieves and processes the page 2100, which is shown in FIG. 5F.

Figure 5F:
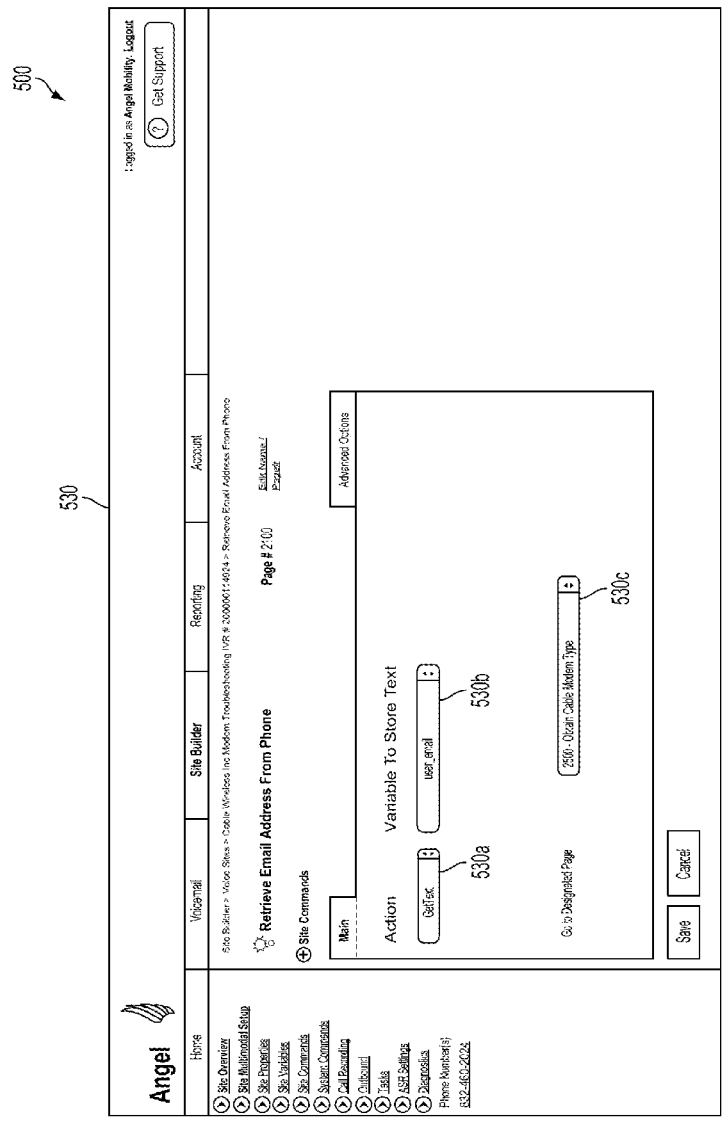

FIG. 5F illustrates a multimodal action page 530 that is processed by the MM-IVR 470 for the voice site based on the action 525f specified by the preceding page (i.e., message page 525). Similar to the previously described pages 505-525, the multimodal action page 530 is identified by its page name and/or Page #. The type of the page is represented by the action icon that is similar to the icon 520c of multimodal action page 520.

The multimodal action page 530 is executed by the application server 425. When the MM-IVR 470 processes the multimodal action page 530, it sends an instruction to the application server 425 to execute the multimodal action page 530. The action 530a specified on the multimodal action page 530 is "GetText". Therefore the multimodal instruction generated by the application server 425 and communicated to the smart phone 415 over the data communications session may include, for example, the action parameter "GetText" and may instruct the multimodal application 418 to send to the application server a text string that is entered by the user of the smart phone 415. The text string is entered by the user of the smart phone by typing using the keyboard in the text input field that are displayed to the user by the multimodal application 418 on the display of the smart phone 415 based on the instructions associated with the multimodal action page 520. The multimodal application 418 captures the text string entered by the user and communicates the text string to the application server over the data communications session. The text string is saved by the application server in the variable identified by "Variable To Store Text" 530b. For example, the text string may be saved in the variable "user_email" that was previously defined by the content provider 405. In the example shown in FIG. 5F, the text string saved in the variable "user_email" corresponds to an email address of the user of the smart phone 415. The email address may be used by the call handling system to identify and locate a subscription account for associated with the user for the voice site created by content provider 405.

After sending the instruction to the application server 425, the MM-IVR 470 processes the next action 530c specified in the multimodal action page 530, which instructs the MM-IVR 470 to process the page numbered 2500 and with page name "Obtain Cable Modem Type."

Figure 5G:
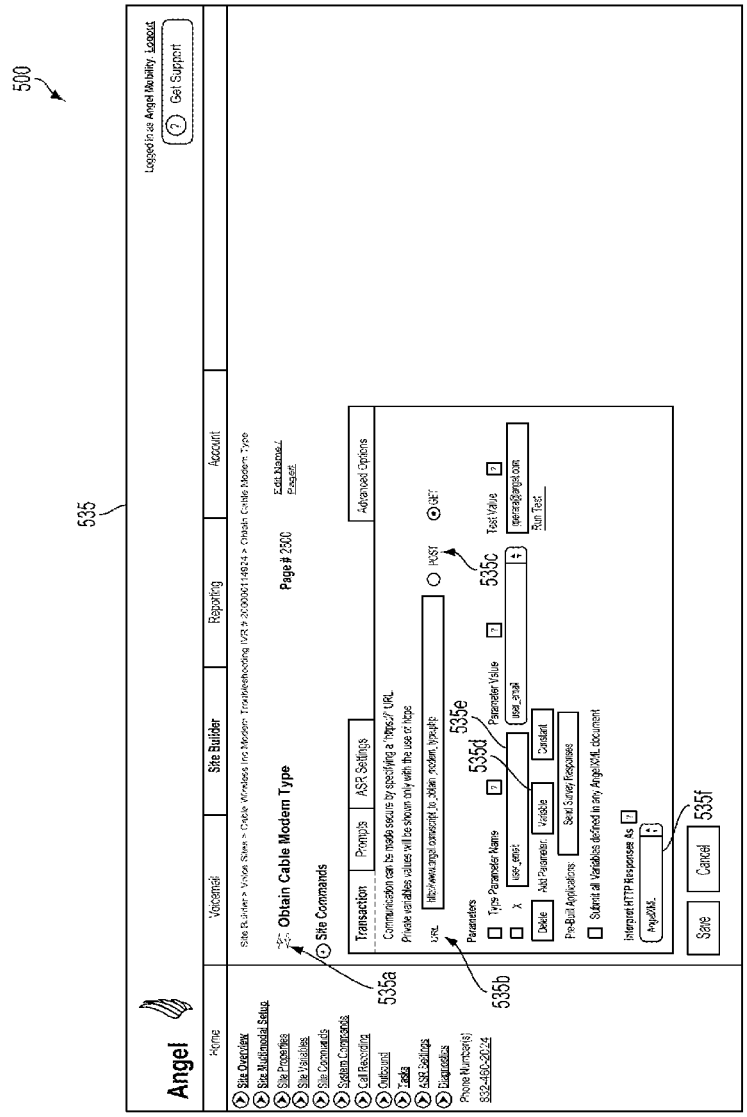

FIG. 5G illustrates a transaction page 535 that is processed by the MM-IVR 470 for the voice site based on the action 530c specified by the preceding page (i.e., multimodal action page 530). The type of the page 535 is identified by the icon 535a, which indicates that page 535 is a transaction type page. As described previously, transaction pages may be executed by the application server 425. In some implementations, transaction pages are additionally or alternatively executed by the transaction processing module 456. When the MM-IVR 470 processes the transaction page 535 and the transaction page is processed by the application server 425, the MM-IVR 470 sends an instruction to the application server 425 to execute the transaction page 535.

Based on the information contained in the transaction page 535, the application server 425 invokes a script to perform certain actions that are defined in the script. The name and location of the script are specified by the URL 535b. The URL 535b may specify a World Wide Web (WWW) address indicating that the script is accessible over the Internet. Alternatively, the URL 535b may be the address of a local file. The hypertext transfer protocol (HTTP) commands POST or GET 535c are selected by the content provider 405 to indicate whether the script specified by the URL 535b will return a value to the application server 425.

When the application server 425 invokes the script specified by the URL 535b, the application server 425 may pass one or more parameters to the script as input parameters that are needed for execution of the script. The input parameters are specified by the content provider 405 under the "Parameters" heading in the page 535. The content provider 405 may specify a variable or a constant parameter by selecting the "Add Parameter" 535d. In the example shown in FIG. 5G, the parameter specified by the content provider 405 is a variable with the name "user_email" 535e specified under "Parameter Name", with the value of the variable being represented by the string "user_email" specified under "Parameter Value." The variable "user_email" corresponds to the variable that was obtained by the application server 425 from the multimodal application 418 by executing a script corresponding to multimodal action page 530.

Figure 5H:
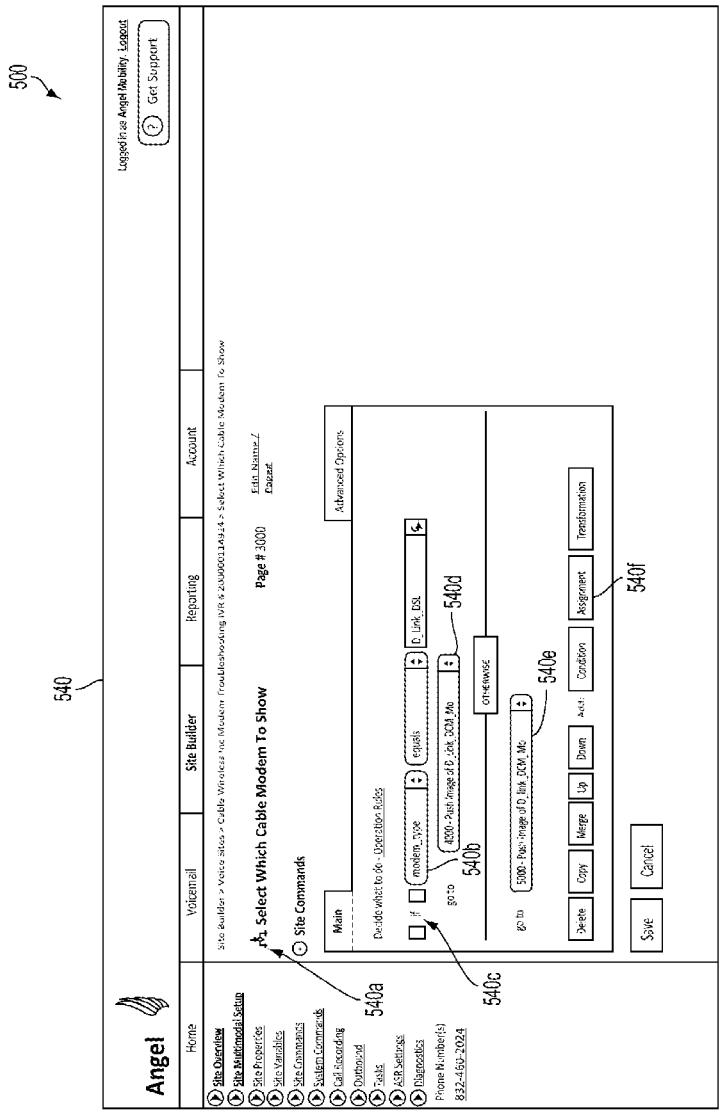

The script specified by the URL 535b performs certain actions using the variable "user_email" and returns a value to the application server 425. The response received from the script specified by the URL 535b is interpreted by the application server based on the instructions specified by the content provider in 535f. The response may be interpreted as a VoiceXML script (e.g., "AngelXML" script, which is a version of a VoiceXML script). The VoiceXML script also may specify the next page (e.g., Page #3000 as illustrated by FIG. 5H) that is to be executed in the execution order of the pages of the voice site. In an alternative implementation, the response may be interpreted, for example, as text-to-speech.

In the example illustrated by FIG. 5G, the script specified by the URL 535b identifies the subscriber account corresponding to the user of the smart phone 415 for the product/service that is provided by the voice site, which is a wireless cable modem product. The script uses the email address provided by the user, which is stored in the "user_email" variable, to identify the subscriber account. Based on identifying the subscriber account, the script retrieves information related to the particular model of cable modem that is used by the user of the smart phone 415, and returns a value to the application server 425 indicating the particular model of the cable modem. The returned value is used by the application server 425 to populate a variable "modem_type", as shown with respect to FIG. 5H.

FIG. 5H illustrates a logic page 540 that is processed by the MM-IVR 470 for the voice site based on the response 535f that is received from the script executed by the application server 425 based on instructions specified by transaction page 535. The type of the page 540 is identified by the icon 540a, which indicates that page 540 is a logic page. The logic page 540 is executed by the MM-IVR 470.

The MM-IVR 470 executes a script corresponding to the operation rules that are specified in the logic page 540. The logic page 540 specifies a logic statement that is based on the value of the variable "modem_type" 540b. The variable modem_type is populated by the value that is returned by the script executed by the application server 425 that is specified by the URL 535b in the transaction page 535. The "If" statement 530c is a condition logic block that tests the value of the variable "modem_type" and if the value equals "D_Link_DSL", then the MM-IVR 470 executes the block 540d and branches to the page numbered 4000 with page name "Push Image of D_Link_DSL_Modem." On the other hand, if the value of the variable "modem_type" does not equal "D_Link_DSL", then the MM-IVR 470 executes the block 540e and branches to the page numbered 5000 with page name "Push Image of D_Link_DCM_Modem."

The content provider 405 may specify one or more operation rules or logic commands in the logic page 540 by selecting one of the three buttons "Condition", "Assignment" and "Transformation" 540f. The "If" statement 540c described above is an example of a "Condition" logic operation. An "Assignment" logic operation is one in which a value gets assigned to a variable. A "Transformation" logic operation is one in which a variable gets transformed from one value to another, e.g., when the value of a variable is updated based on the value of another variable.

Figure 5I:
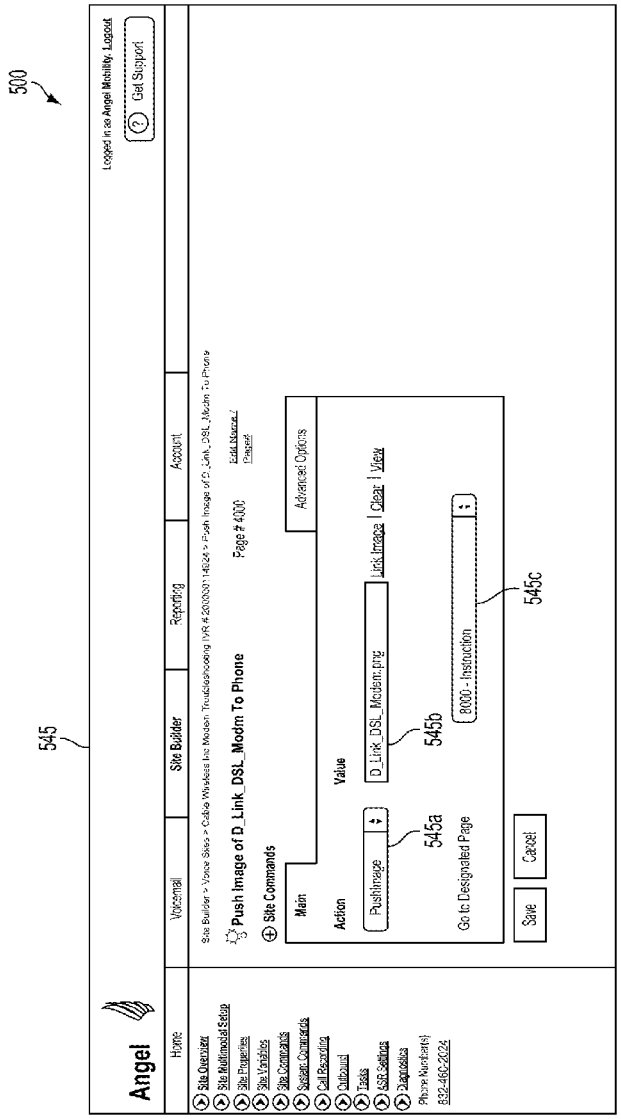

FIG. 5I illustrates a multimodal action page 545 that is processed by the MM-IVR 470 for the voice site based on the execution of the "If" logic condition 540c specified in the logic page 540. The MM-IVR 470 processes the multimodal action page 545 if the test of the "If" condition 540c results in the execution of the conditional block 540d. Similar to other multimodal action pages, the multimodal action page 545 is executed by the application server 425. When the MM-IVR 470 processes the multimodal action page 545, it sends an instruction to the application server 425 to execute the multimodal action page 545. The action 545a specified on the multimodal action page 545 is "PushImage." The image that is to be pushed is specified by the "Value" field 545b. Therefore the multimodal instruction generated by the application server 425 and communicated to the smart phone 415 over the data communications session may include the action parameter "PushImage" and the value parameter "D_Link_DSL_Modem.png," which identifies the image to be displayed (i.e., pushed) to the user. The multimodal instruction instructs the multimodal application 418 to display the image specified by 545b to the user on the display of the smart phone 415. Using the example of page 545, the multimodal application 418 would display the image "D_Link_DSL_Modem.png" on the display of the smart phone 415. To associate an image to the "Value" field 545b, the content provider 405 would click on the "Link Image" link that brings up the 'Image Link Panel' pop-up window that is described with respect to FIG. 5L below. 'PushText' and 'PushVideo' actions work in a manner similar to the 'PushImage' action to display text files and video files respectively on the display of the smart phone 415 using the multimodal application 418. They also have associated 'Text Link Panel' and 'Video Link Panel' pages respectively.

After sending the instruction to the application server 425, the MM-IVR 470 processes the next action 545c specified in the multimodal action page 545, which instructs the MM-IVR 470 to process the page numbered 8000 and with page name "Instruction."

Figure 5J:
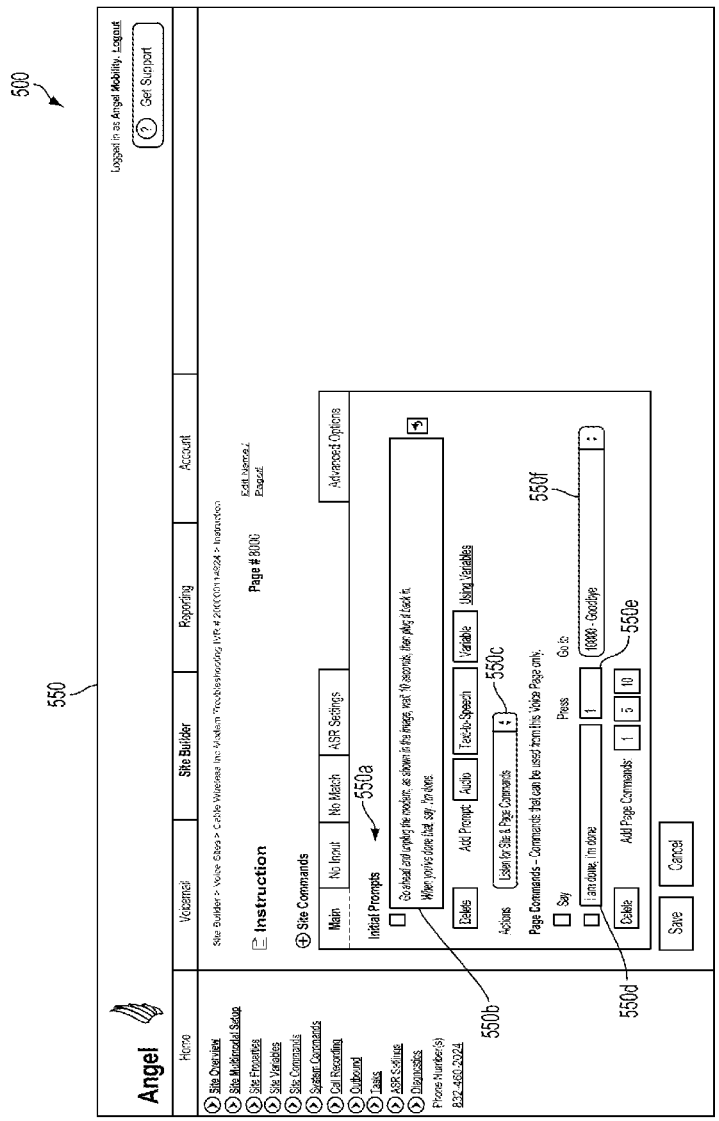

FIG. 5J illustrates a message page 550 that is executed by the MM-IVR 470 for the voice site based on the action 545c specified by the preceding page (i.e., the multimodal action page 545). The page name, page number and prompts fields of the message page 550 are similar to the message page 525, but the content are different. In the example shown, the message page 550 is used by the content provider 405 to instruct the user unplug the cable modem as shown by the image specified in the image file "D_Link_DSL_Modem.png" that is pushed to the user by the application server 425 based on instructions specified in the multimodal action page 545. Therefore the text that is entered by the content provider 405 in the text input field 550b corresponding to the prompt 550a, when audibly presented to the user using text-to-speech conversion by the MM-IVR 470, asks the user, "Go ahead and unplug the modem, as shown in the image, wait 10 seconds, then plug it back in. When you've done that, say, I'm done." The message is played to the user using the native telephony application 416 on the smart phone 415, while the multimodal application 418 displays the image specified in the image file "D_Link_DSL_Modem.png" on the display of the smart phone 415. In an alternative implementation, the message is played to the user using the multimodal application 418, while the multimodal application 418 simultaneously displays the image specified in the image file "D_Link_DSL_Modem.png" on the display of the smart phone 415.

In addition to the prompt, the content provider 405 specifies a "Listen for Site & Page Commands" action command 550c on the message page 550. The "Listen for Site & Page Commands" action command instructs the MM-IVR 470 to receive page commands from the user of the smart phone 415 and process the received page commands based on the definition of the page commands that are specified on the voice page 550. The page command specified by the content provider 405 on the message page 550 instructs the MM-IVR 470 to wait for the user to either say "I am done" or "I'm done" 550d on the speaker of the smart phone 415 or press "1" 550e on the dial pad of the smart phone 415, and then process the page numbered 10000 and with page name "Goodbye" 550f. When the MM-IVR 470 receives a transmission from the smart phone 415 that is processed as indicating that the user has said either say "I am done" or "I'm done" 550d on the speaker of the smart phone 415 and/or pressed "1" 550e on the dial pad of the smart phone 415, the MM-IVR 470 retrieves and processes the page 10000, which is shown in FIG. 5K.

Figure 5K:
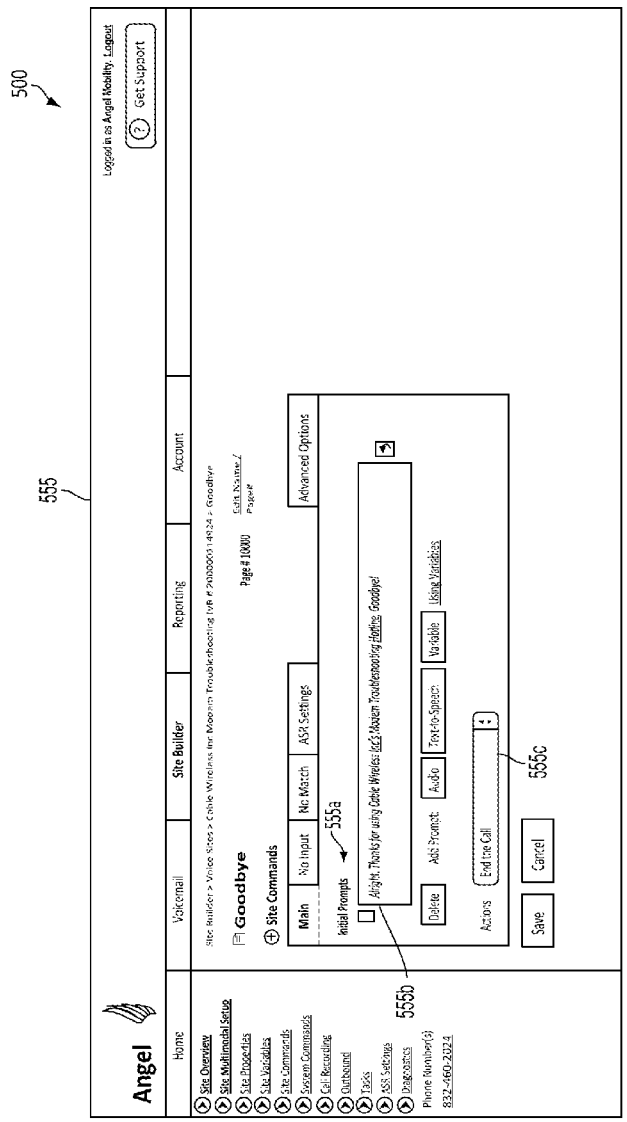

FIG. 5K illustrates a message page 555 that is the last page that is processed for the voice site illustrated by the Site Overview page 510. The message page 550 is executed by the MM-IVR 470 for the voice site based on the action 550f specified by the preceding page (i.e., the message page 550). The user arrives at the page 555 after the user has navigated through the entire voice site created by the content provider 405 and that is illustrated by the FIGS. 5A-5K. The content provider 405 may define the voice message by typing in text in the text input field 555d. When the page 555 is executed, the MM-IVR system 470 prompts the user with a voice message corresponding to the text 555b that is entered by the content provider 405. For example, the user of the smart phone 415 may hear the voice site say, "Alright. Thanks for using Cable Wireless Inc.'s Modem Troubleshooting Hotline. Goodbye!"

In addition to the prompt 555a, the content provider 405 specifies the action 555c on the message page 555. The content provider may select the action "End the Call." Therefore when the MM-IVR 470 executes a script corresponding to the page 555, the MM-IVR 470 terminates the call that is placed by the user of the smart phone 415 when the action 555c is executed. When the call is terminated, the MM-IVR 470 terminates the voice communications session that was established with the smart phone 415. In addition, the MM-IVR 470 sends an instruction to the application server 425 based on which the application server 425 terminates the data communications session that was established with the multimodal application 418.

Figure 5L:
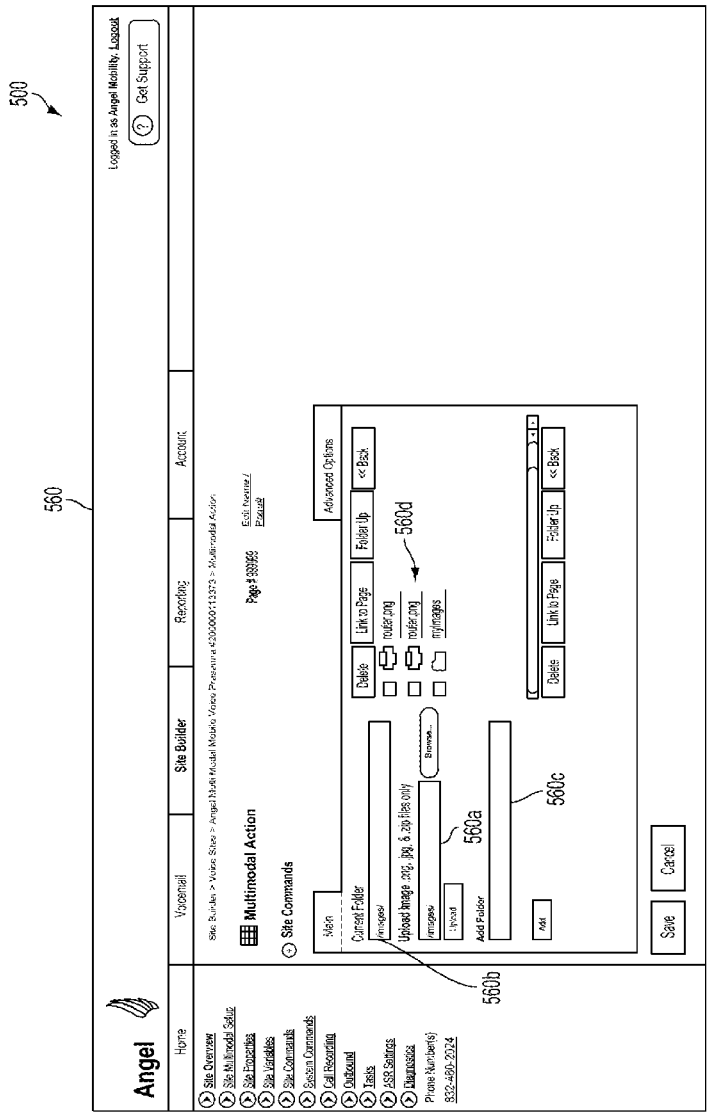

FIG. 5L illustrates an Image Link Panel page 560 that may be used by the content provider 405 during the creation of the voice site. The Image Link Panel page 560 is used when the content provider creates the multimodal action page 545 with the action "PushImage." The content provider 405 invokes the Image Link Panel page 560 by clicking on the "Link Image" link in page 545 that launches the Image Link Panel page 560 in an overlay window that is displayed on top of page 545. Using the Image Link Panel page 560 the content provider 405 is able to link an image to the multimodal action page 545. This Image Link Panel page 560 can also be used to upload images or a collection of images as a compressed archive file (e.g., a ZIP file) using the "Upload Image" option 560a. All images are stored under a '/images/' top level folder that is shown by the "Current Folder" field 560b. Under this folder, the content provider 405 can create additional folders using the "Add Folder" option 560c. The images and folders that have been added are shown on the right side of the page 560 as a listing of icons and image names 560d.

Figure 5M:
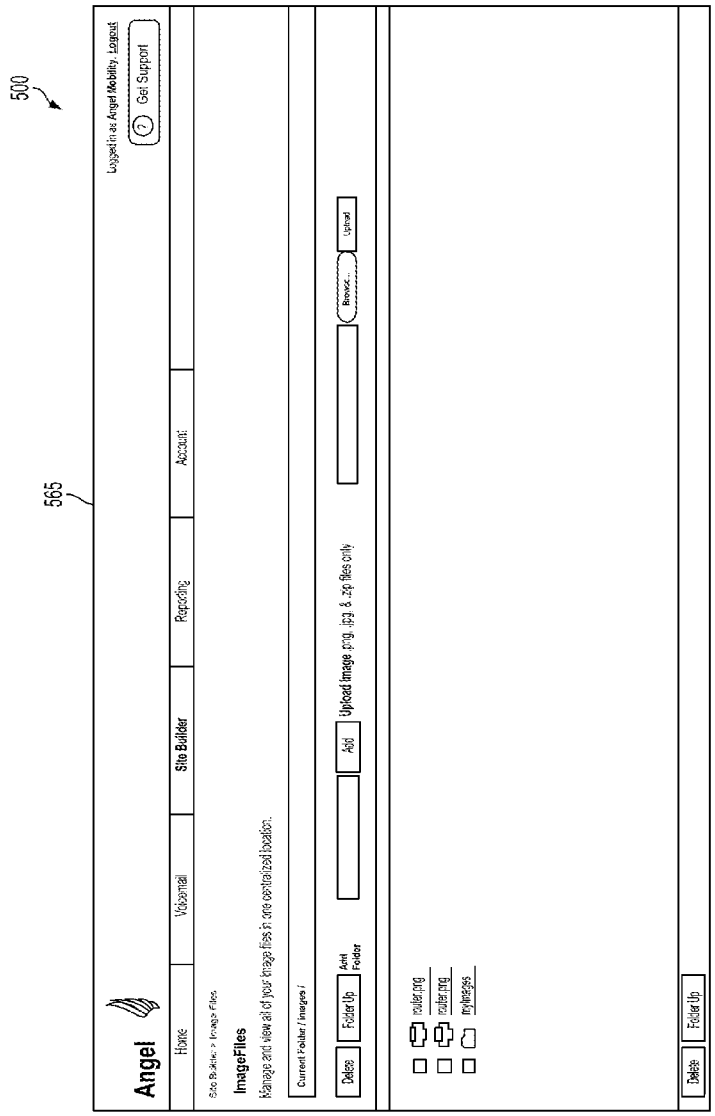
Figure 5N:
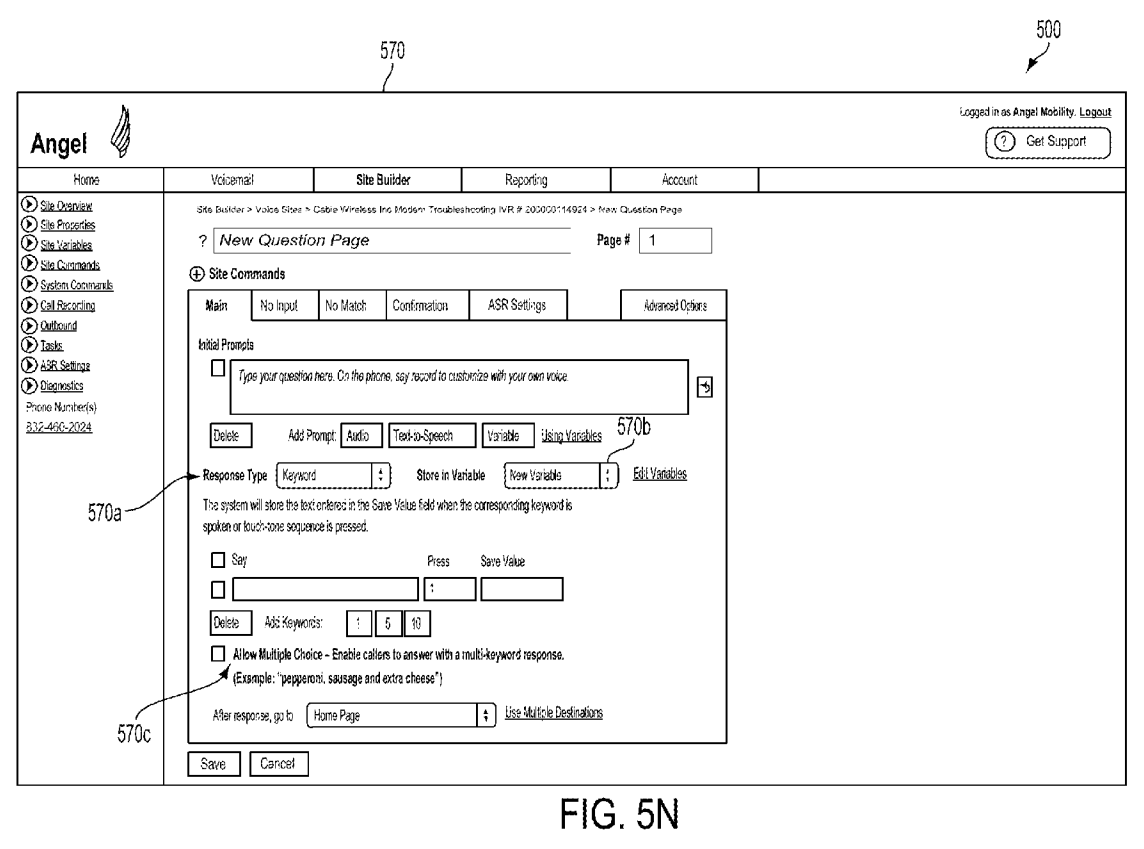

FIG. 5M illustrates an Image Manager page 565 that is accessible to the content provider 405 from the "Home" tab of the account belonging to the content provider 405. The Image Manager page 565 is used to manage all image files that are uploaded by the content provider 405. There are similar Audio Manger page that is used to manage audio files, a Text Manager page that is used to manage text files and a Video Manager page that is used to manage video files.

FIG. 5N illustrates a question page 570 that is used in the creation of a voice site when the MM-IVR 470 asks a question of the caller calling the voice site. The question that is asked is specified by the voice site creator using the 'Initial Prompts' option. The response received from the caller is processed based on the "Response Type" 570a specified by the site creator and is stored in a variable 570b. The question page 570 also may allow the caller to provide responses including multiple keywords—this is enabled by selecting the radio button associated with the "Allow Multiple Choice" option 570c.

FIGS. 6A-6D illustrate a GUI 600 for another example of a multimodal application on a smart phone. The GUI 600 may be associated with the multimodal application 418 for the voice site created by the content provider 405 using the content provider web interface 442. For example, the GUI 600 may be the interface for the smart phone application that is created as part of the voice site illustrated in FIGS. 5A-5K. Therefore the GUI 600 may be the interface that is presented to the user of the smart phone 415 on the display of the smart phone 415 when the user connects to the voice site created by the content provider 405. The following describes the different components of the GUI 600 with respect to the system 400 that is described with reference to FIG. 4 and the application development tool interface 500 that is described with reference to FIGS. 5A-5N. However, the GUI 600 and the associated multimodal application may be associated with other systems, content providers or application developers, among others.

FIG. 6A illustrates a GUI 605 that is presented to the user of the smart phone 415 on the display of the smart phone 415 when the user calls the voice site created by the content provider 405 using the native telephony application 416 in the smart phone 415. When the user calls the voice site and establishes a voice connection between the smart phone 415 and the MM-IVR 470, the smart phone 415 may receive multimodal instructions from the application server 425 via the push notification service 420. The multimodal application 418 is not launched on the smart phone, and therefore the multimodal instructions may be received by the notification application 417. Based on receiving the multimodal instructions, the notification application 417 generates a pop-up notification 605a that is displayed on the display of the smart phone 415. The pop-up notification 605a prompts the user to launch the multimodal application by clicking the view button. The user may opt not to launch the multimodal application, in which case the user clicks the "Close" button, which causes the pop-up notification to disappear and the native telephony application 605b returns to the foreground on the display of the smart phone 415. However, if the user opts to launch the multimodal application, the user clicks the "View" button on the pop-up notification. This causes the pop-up notification to disappear and the native telephony application 605b to run minimized in the background, while the multimodal application 418 is launched.

FIG. 6B illustrates a GUI 610 that is presented to the user of the smart phone 415 on the display of the smart phone 415 when the multimodal application 418 is launched due to the user clicking the "View" button on the pop-notification 605a. When the multimodal application 418 is launched, the multimodal application 418 may present a splash image 610a on the display of the smart phone 415. The splash image 610a may be pushed to the smart phone 415 by the application server 425 based on a 'PushImage' action in a multimodal action page. The splash image 610a may identify to the user of the smart phone 415 that the user has launched the multimodal application associated with the customer service voice site of 'Cable Wireless Corp.' In addition or as an alternative to displaying the splash image 610a, the user may also hear through the speakers of the smart phone 415 the voice site say, using the native telephony application 416, "Hi. Welcome to Cable Wireless Inc.'s modem troubleshooting hotline." This is based on scripts executed by the MM-IVR 470 when the MM-IVR processes the message page 515 as part of running the voice site when the user of the smart phone 415 has called the voice site.

The user also may be provided with the option to save the splash image 610a in the local storage of the smart phone 415 by clicking on the 'Save Image' button 610b. If the user saves the splash image 610a in the local storage of the smart phone 415 by clicking on the 'Save Image' button 610b, then for future launches of the multimodal application 418, the splash image 610a may be retrieved by the multimodal application 418 from the local storage of the smart phone 415, thereby obviating the need for the application server 425 to push the splash image 610a to the multimodal application 418. Since the native telephony application 416 is running in the background while the multimodal application 418 is displayed on the display of the smart phone 415, the user may switch to the native telephony application 416 by touching the strip 610c near the top of the display above the splash image 610a. This minimizes the GUI 610 of the multimodal application 418 and returns the GUI 605b of the native telephony application 416 to the foreground of the display of the smart phone 415.

FIG. 6C illustrates a GUI 615 that is presented to the user of the smart phone 415 on the display of the smart phone 415 when the MM-IVR 470 has processed the page 520 that is created by the content provider 405 as part of the content provider 405's voice site. The keyboard 615a and the text input field 615b are displayed to the user on the display of the smart phone 415 based on instructions received by the multimodal application 418 from the application server 425. The application server sends a multimodal instruction to the multimodal application 418 to show the keyboard 615a and the text input field 615b when the application server executes a script associated with the multimodal action page 520 that specifies the action 'Show Keyboard.' In addition to viewing the keyboard 615a and the text input field 615b, the user may also hear through the speakers of the smart phone 415 the voice site say, using the native telephony application 416, "Please enter your email address using the keyboard on your phone. Say 'continue' when you are done." This is based on scripts executed by the MM-IVR 470 when the MM-IVR processes the message page 525. Based on the multimodal application 418 display and the audible prompts, the user may enter a text string in the input field 615b by typing alphanumeric characters using the keyboard 615a. The text string may identify an email address associated with the user, e.g., 'pperera@angel.com.'

The native telephony application 416 is runs in the background at all times while the multimodal application 418 is displayed on the display of the smart phone 415, so that the user remains connected to the MM-IVR 470 over the voice communications session. From any multimodal application GUI, the user may switch to the native telephony application 416 by touching the strip, e.g., 615c, near the top of the multimodal application 418 GUI display. This minimizes the GUI, e.g., 615, of the multimodal application 418 and returns the GUI 605b of the native telephony application 416 to the foreground of the display of the smart phone 415.

FIG. 6D illustrates a GUI 620 that is presented to the user of the smart phone 415 on the display of the smart phone 415 when the MM-IVR 470 has processed the multimodal action page 545 that is created by the content provider 405 as part of the content provider 405's voice site. The image 620a may be pushed to the smart phone 415 by the application server 425 based on the 'PushImage' action 545a in the multimodal action page 545. The image 620a may be associated with the image file 'D_Link_DSL_Modem.png' 545b and may provide to the user of the smart phone 415 a visual identification of the model of the wireless cable modem product is used by the user. In addition to viewing the image 620a, the user may also hear through the speakers of the smart phone 415 the voice site say, using the native telephony application 416, "Go ahead and unplug the modem, as shown in the image, wait 10 seconds, then plug it back in. When you've done that, say, I'm done." This prompt is audibly communicated to the user by the voice site through the execution, by the MM-IVR 470, of one or more scripts corresponding to the message page 550. The combination of the visual cues provided by the image 620a and the audible instructions provided by the voice site provides a rich multimodal experience to the user. This may facilitate easier troubleshooting of the product by the user and/or enhance the user's customer service experience.

The user also may be provided with the option to save the splash image 620a in the local storage of the smart phone 415 by clicking on the 'Save Image' button 620b. If the user saves the splash image 620a in the local storage of the smart phone 415 by clicking on the 'Save Image' button 620b, then for future launches of the multimodal application 418, the splash image 620a may be retrieved by the multimodal application 418 from the local storage of the smart phone 415, thereby obviating the need for the application server 425 to push the splash image 620a to the multimodal application 418.

Figure 7:
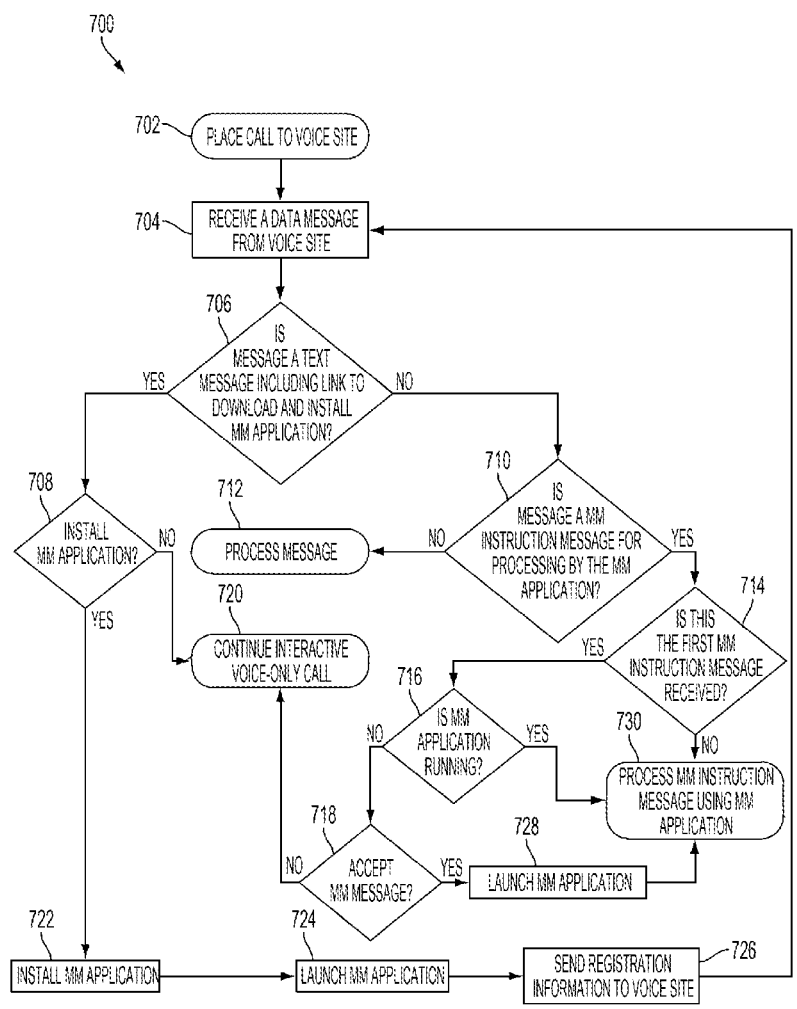
FIG. 7 is a flow chart illustrating an example of a process using which the user of a smart phone may engage in multimodal interaction with an enhanced voice site.

FIG. 7 is a flow chart illustrating an example of a process 700 that may be implemented by a smart phone to enable multimodal interactions with an enhanced voice site. The process 700 may be performed, for example, by the smart phone 415 when the user interacts with the voice site created by the content provider 405, using the native telephony application 416 and/or the multimodal application 418. The following describes the process 700 being performed by components of the communications system 400 that is described with reference to FIG. 4. However, the process 700 may be performed by other communications systems or system configurations.

The smart phone 415 places a call to a voice site in response to a user request (702). The voice site is created by the content provider 405 using the content provider web interface 442 provided by the call handling system 440. The user of the smart phone 415 may place the call to receive customer service from the voice site. For example, the content provider 405 may be a cable company (e.g., Cable Wireless Corp. that is described with reference to FIG. 6B) and the voice site may provide technical support to subscribers/product users of the cable company. The user of the smart phone 415 may be using a wireless cable modem provided by the cable company and therefore calls the voice site to troubleshoot an issue that user is experiencing with the wireless cable modem.

When the call is connected, the voice site may audibly greet the user by playing a prompt that is heard by the user through the speakers of the smart phone 415. During the user's interaction with the enhanced voice site, the smart phone 415 also may receive a data message from the voice site (704). The data message may be sent by the MM-IVR 470 and/or the application server 425 as a result of execution of scripts associated with the voice site while the user is interacting with the voice site. If the user has not registered for multimodal interaction with the call handling system 440, the data message may be, for example, a text message (e.g., a Short Message Service (SMS) message) that is received using a text messaging application on the smart phone 415. Along with receiving the data message, the user may hear audible information from the voice site that informs the user that the user is going to receive the text message that will include a link selectable to allow the user to register for multimodal interaction with the call handling system 440. The link may be, for example, a hyperlink selectable to access a network location from which the user can download and install the multimodal application associated with the voice site.

If the data message is a text message having a link selectable to register for multimodal interaction with the call handling system 440 (or, in some implementations, with only a particular voice site) (706), the user may select the link to download and install the multimodal (MM) application by, for example, using a graphical pointer or other selection mechanism supported by the smart phone to click or otherwise select the link provided in the text message (708). The user may opt not to select the link to install the MM application (708), in which event the call with the voice site continues as an interactive voice-only call (720). In an alternative implementation, if the user opts not to install the MM application, the call with the voice site is terminated by the voice site.

If the user selects the link to install the application, the smart phone automatically downloads and installs the MM application (722). In an alternative implementation, clicking on the link provided in the text message takes the user to a network location where the user has to perform further actions to download and install the MM application. The smart phone 415 may have multiple MM applications installed, where each of the multiple MM applications is used for multimodal interaction with a different voice site. In an alternative implementation, the smart phone 415 may have a single MM application installed, where the single MM application is configured to handle multimodal interactions for multiple voice sites.

Once the MM application is installed on the smart phone 415, an icon may be provided on the display of the smart phone 415 associated with the MM application. The smart phone may launch the MM application (724) in response to the user clicking on the icon associated with the MM application that is provided on the display of the MM application. The MM application may be, for example, the multimodal application 418. Alternatively, immediately after the MM application is installed, the smart phone may automatically launch the MM application to enable the user to register for multimodal interaction. Once the MM application is launched, the MM application may automatically send registration information to the voice site (726). The registration information may be sent to the application server 425 via the data network 410 that forwards the registration information to the MM-IVR 470 that is executing instructions associated with the voice site. In an alternative implementation, the registration information may be sent via the data network 410 to the push notification service 420 that stores the registration information locally. In addition or as an alternative to storing the registration information locally, the push notification service 420 may forward the registration information to the application server 425 and/or the MM-IVR 470. In another alternative implementation, the registration information may be sent automatically to the call handling system 440 via the voice network 430; the registration information may be received by the user registration module 448 and/or the call center module 450.

In yet another alternative implementation, once the MM application is launched, the user enters the caller id on a form that is displayed on the display of the smart phone 415 using the MM application. The MM application communicates with the push notification service 420 to obtain a unique token from the push notification service 420 that identifies the smart phone 415. The caller id entered by the user on the form and the unique token obtained from the push notification service 420 are sent by the MM application to the application server 425 to register the smart phone 415.

The sending of the registration information to the voice site (726) may be done only once, at the time when the MM application is installed and launched for the first time. It may not be required to send the registration information for subsequent calls to the voice site and/or for subsequent uses of the MM application. In an alternative implementation, it may be required to send the registration information every time a call is established with the voice site.

After the registration information has been sent and processed by the MM-IVR 470 and/or the application server 425, the smart phone 415 may receive additional data messages from the voice site (704). The smart phone 415 processes the data messages using the MM application, the text application, and/or other applications on the smart phone 415. For example, the MM application may prompt the user of the smart phone 415 to send additional identifying information. This may happen after the MM application has displayed a greeting page and/or the MM-IVR 470 has sent audible greeting information associated with the voice site (e.g., as described with reference to FIG. 6B), and then the MM application displays a keyboard and text input field on the display of the smart phone 415, e.g., as described with reference to FIG. 6C. In addition, as described with reference to FIG. 6C, the MM-IVR 470 may audibly prompt the user to enter an email address associated with the user in the text input field that is displayed by the MM application. The email address may be used, for example, to locate a subscriber account for the user that is associated with the voice site. Information on the subscriber account may be stored by the call handling system 440 and may be accessible to the MM-IVR 470 and/or the application server 425. The information entered by the user in the text input field is communicated by the MM application to the application server 425, which forwards the information to the MM-IVRF 470 for processing, for example as described with reference to the transaction page 535 illustrated in FIG. 5G.

If the data message is not a text message having a link for installing the MM application (706) and is not an MM instruction message for processing by the MM application (710), the message may be processed in accordance with a corresponding other application to communicate its contents to the user (712). For example, the message may be a second text message (e.g., SMS message) that provides other information to the user (e.g., an address of interest to the user) that may be processed by the text messaging application on the smart phone to enable the user to access the contents of the message.

On the other hand, if the message is a MM instruction message for processing by the MM application, then the smart phone 415 may determine whether the received MM instruction message is the first MM instruction message that has been received by the smart phone 415 for the MM application (714) for the current call. If the smart phone 415 determines that the received message is the not first MM instruction message that has been received for the current call, then the MM application is known to be currently running and consequently the smart phone 415 forwards the received message to the MM application. The message is then processed as an MM instruction by the MM application (730), for example as described with reference to FIGS. 6B-6D.

If the smart phone 415 determines that the received message is the first MM instruction message that has been received for the MM application for the current call, the smart phone 415 checks whether the MM application is running (716). If the MM application is running, the smart phone 415 forwards the received message to the MM application. The message is then processed as an MM instruction by the MM application (730), for example as described with reference to FIGS. 6B-6D.

If the MM application is not running, the smart phone 415 may display a notification pop-up on the display of the smart phone 415 asking the user to launch the MM application, e.g., as shown in the GUI 605 in FIG. 6A. When the user receives the pop-up notification on the display of the smart phone 415, the user has to decide whether to accept the MM message (718), i.e., whether to launch the MM application to accept the MM message. The user may decide not to launch the MM application, for example, by clicking the 'Cancel' button on the pop-up notification that is displayed on the display of the smart phone 415, as shown in the GUI 605 of FIG. 6A. Then the call that the user has placed to the voice site continues as an interactive voice-only call (720). In an alternative implementation, if the user opts not to launch the MM application, the call with the voice site is terminated by the voice site.

Alternatively, the user may decide to launch the MM application (728), for example, by clicking the 'View' button on the pop-up notification that is displayed on the display of the smart phone 415, as shown in the GUI 605 of FIG. 6A. Once the MM application is launched, the received message is processed as an MM instruction by the MM application (730), for example as described with reference to FIGS. 6B-6D.

Figure 8:
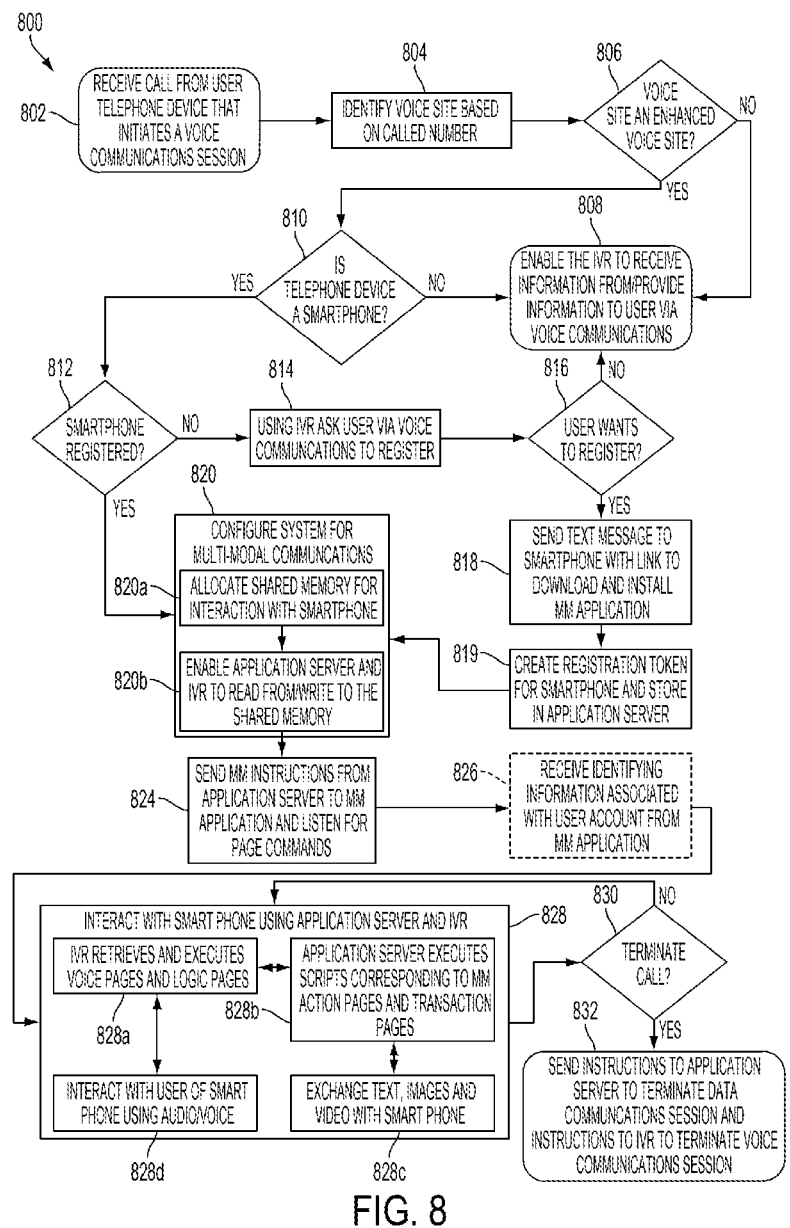
FIG. 8 is a flow chart illustrating an example of a process that is executed by a call handling system when a user calls an enhanced voice site using a smart phone.

FIG. 8 is a flow chart illustrating an example of a process 800 that is executed by a call handling system when a user calls an enhanced voice site using a smart phone. The process 800 may be performed, for example, by the call handling system 440 when the user of the smart phone 415 calls and interacts with the voice site created by the content provider 405, using the native telephony application 416 and/or the multimodal application 418. Specifically, the process 800 may be performed by the MM-IVR 470 and the application server 425 as components of the call handling system 440. Accordingly, the following describes the process 800 being performed by components of the communications system 400 that is described with reference to FIG. 4. However, the process 800 also may be performed by other communications systems or system configurations.

The call handling system 440 may receive a call from a user telephone device that initiates a voice communications session (802) between the call handling system and the user telephone device. The call may be placed by the user of the smart phone 415 to a number associated with the voice site created by the content provider 405. The call is received by the call handling system 440 because the call handling system 440 hosts the voice site created by the content provider 405. The call may be received by the call reception 450 that is part of the MM-IVR 470 in the call handling system 440.

Upon receiving the call from the user telephone device, the call handling system 440 identifies the voice site that the user is trying to reach based on the called number (804). As described with reference to FIG. 5A, every voice site hosted by the call handling system 440 may have one or more phone numbers uniquely associated with the voice site. Therefore the call handling system 440 may analyze the received transmission of information from the user telephone device and determine the called number that the user telephone device is attempting to reach. Based on analyzing the called number, the call handling system 440 may be able to identify the particular voice site that the user is trying to connect to, e.g. the voice site created by the content provider 405.

Once the voice site is identified, the call handling system 440 determines whether the voice site is an enhanced voice site (806). As described previously, an enhanced voice site is a voice site that is configured for multimodal interaction with callers to the voice site. The call handling system 440 may make the determination based on information that is stored at the call handling system 440 associated with the voice site. For example, when a content provider creates a voice site, based on the information provided by the content provider and/or the types of pages created by the content provider, the call handling system 440 may tag the created voice site as either a standard voice site or an enhanced voice site.

If the call handling system determines that the voice site is a standard voice site, then the call handling system 440 enables the interactive voice response (IVR) system to receive information from/provide information to the user via standard voice communications (808). The IVR may be, for example, the MM-IVR 470, but handling standard calls without multimodal interaction. In an alternative implementation, the IVR handling standard calls via standard voice communications may be different than the MM-IVR 470 that is configured to handle calls to enhanced voice sites including multimodal interaction. In the discussion going forward, the IVR and the MM-IVR 470 will be taken to refer to the same entity and therefore the terms may be used interchangeably. Upon being enabled by the call handling system 440, the IVR retrieves the pages associated with the called voice site (for example, by using the page retrieval module 468) and executes VoiceXML scripts corresponding to the called voice site (for example, by using the page execution module 464) as standard voice pages.

On the other hand, if the call handling system 440 determines that the called voice site is an enhanced voice site (e.g., the voice site described by FIGS. 5A-5K created by the content provider 405), then the call handling system 440 determines whether the calling telephone device is a smart phone (810). This determination may be made, for example, by data sent with the transmission of information when the call from the telephone device is received by the call handling device 440. The data may, for example, uniquely identify the phone. Using the phone identification, the call handling system 440 may look up in a database that provides information on whether the telephone is a standard telephonic device or a smart phone. The database may be part of the call handling system 440, or it may be an external database provided by an independent entity different from the call handling system 440 and accessed by the call handling system 440. In an alternative implementation, the data sent with the transmission of information when the call from the telephone device is received by the call handling device 440 may contain information sufficient to determine whether the telephone is a standard telephonic device or a smart phone.

If the call handling system 440 determines that the telephone is a standard telephonic device, then the call handling system 440 enables the interactive voice response (IVR) system to receive information from/provide information to the user via standard voice communications (808), as described previously. The IVR retrieves the pages associated with the called voice site and executes, for example, VoiceXML scripts corresponding to the called voice site as standard voice pages. The called voice site may be an enhanced voice site, but it may be configured to interact with a standard telephonic device using standard voice pages. For example, the enhanced voice site may include scripts corresponding to a subset of standard voice pages (e.g., message pages and question pages) that are processed during the caller's interaction with the voice site instead of the scripts corresponding to the multimodal action pages in response to the call handling system 440 determining that the telephone is a standard telephonic device rather than a smart phone. In this manner, the same enhanced voice site is able to provide service to both standard telephonic devices and smart phones.

On the other hand, if the call handling system 440 determines that the telephone is a smart phone, then the call handling system 440 proceeds to check whether the smart phone is registered (812), i.e., whether the smart phone has previously downloaded, installed and launched the MM application that is associated with the called voice site. The call handling system 440 may determine the registration status of the smart phone by performing a lookup of the information processed by the user registration module 448. In addition or as an alternative to performing the lookup of the information processed by the user registration module 448, the call handling system 440 may obtain the registration information of the smart phone from the application server 425 and/or the push notification service 420.

If the call handling system 440 determines that the smart phone is registered, then the call handling system 440 configures the system for multimodal communications (820) between the MM application and the enhanced voice site that is being called, as is described below.

If the call handling system 440 determines that the smart phone is not registered, then the call handling system 440 asks the user, using the IVR via voice communications, to register (814). For example, the MM-IVR 470 may send an audible message to the smart phone over the established voice communications session that asks the user of the smart phone whether the user wants to download and install the MM application that will allow the user to engage with the voice site through multimodal interaction.

Upon receiving the message sent by the IVR asking the user to register, the user of the smart phone sends back a response. The user may send a back a voice response, saying "Yes" or "No", or the user may press a button on the smart phone dial pad to indicate the response, for example, by pressing "1" for "Yes" and "2" for "No." Based on receiving the response from the user, the IVR analyzes the received response and determines whether the user wants to register (816). The IVR may determine that the user does not want to register, for example, if the received transmission indicates that the user has either said "No" or pressed the "2" button on the dial pad of the smart phone. If the IVR determines that the user does not want to register, then IVR is enabled to receive information from/provide information to the user via standard voice communications (808), as described previously. The IVR retrieves the pages associated with the called voice site and executes VoiceXML scripts corresponding to the called voice site as standard voice pages. The called voice site may be an enhanced voice site, but it may be configured to interact with a standard telephonic device using standard voice pages.

Alternatively, the IVR may determine that the user wants to register, for example, if the received transmission indicates that the user has either said "Yes" or pressed the "1" button on the dial pad of the smart phone. The IVR then sends a text message to the smart phone with a link to download and install the MM application (818). In addition to sending the text message, the IVR may send a voice transmission to the smart phone that informs the user via audible information that the user is going to receive the text message that will contain a link to a network location from where the user can download and install the MM application associated with the voice site the user has called.

After the user downloads and installs the MM application associated with the voice site, the user launches the MM application. When the MM application (e.g. multimodal application 418) is launched, a data communications session may be established between the MM application running on the smart phone and the application server 425 over the data network 410.

The MM application, when launched for the first time, may automatically communicate with the push notification service 420 to obtain a unique token from the push notification service 420 that identifies the smart phone 415. The MM application also may display a form on the display of the smart phone 415 and prompt the user to enter the caller id associated with the smart phone 415 on the form that is displayed using the MM application. The caller id entered by the user on the form and the unique token obtained from the push notification service 420 are sent by the MM application to the application server 425 to register the smart phone 415. The application server 425 may store the registration information for the smart phone 415 in the application server 425 (819), e.g., in the data store 427. In addition or as an alternative to the application server 425 storing the registration information, the application server 425 may send the registration information to the MM-IVR 470, which forwards the information to the user registration module 448 so that the smart phone is registered with the MM-IVR 470 as using the MM application associated with the voice site being called.

In an alternative implementation, the MM application, when launched for the first time, may automatically send information to the application server 425 that uniquely identifies the smart phone and/or the MM application associated with the voice site that is being called. The application server 425 may create a registration token for the smart phone and store it in the application server 425 (819), e.g., in the data store 427. In another alternative implementation, the MM application may automatically send information to the push notification service 420 that uniquely identifies the smart phone and/or the MM application associated with the voice site that is being called. The push notification service 420 may create a registration token for the smart phone and store it locally. In addition or as an alternative to storing it locally, the push notification service 420 may forward the registration token to the application server 425, which in turn may forward the token to the MM-IVR 470.

Once the data communications session is established between the MM application running on the smart phone and the application server 425, the call handling system 440 configures the system for multimodal communications (820) between the MM application and the enhanced voice site that is being called. As described previously with reference to FIG. 1, the call handling system 440 allocates shared memory for interaction with the smart phone (820*a*) and enables the application server 425 and the MM-IVR 470 to read from/write to the shared memory (820*b*). Use of the shared memory ensures that both the MM-IVR 470 and the application server 425 have a consistent view of the multimodal session that is ongoing between the smart phone and the enhanced voice site.

Once the call handling system 440 is configured to facilitate the multimodal interaction between the smart phone and the enhanced voice site, the MM-IVR 470 instructs the application server 425 to send MM instructions from the application server 425 to the MM application running on the smart phone and to listen for page commands (824). For example, the application server 425 may push the welcome splash image 610*a* to the multimodal application 418 running on the smart phone 415 that is described with reference to FIG. 6B.

The application server 425 and/or the MM-IVR 470 also may receive identifying information associated with the user account from the MM application (826) running on the smart phone. For example, as described with reference to FIG. 6C, the user of the smart phone 415 may type in an email address associated with the subscription account maintained by the user with the Cable Wireless Corp. whose customer service voice site is called by the multimodal application 418. In an alternative implementation, such identifying information is not required and therefore the application server 425 and/or the MM-IVR 470 does receive identifying information associated with the user account from the MM application.

Subsequently the enhanced voice site may interact with the smart phone using the application server 425 and the IVR (828). The MM-IVR 470 retrieves the pages associated with the voice site (for example, by using the page retrieval module 468) and executes scripts based on processing voice pages and logic pages (828*a*), and interacts with the user of the smart phone using audio/voice information (828*d*) through the native telephony application on the smart phone, as described previously with reference to FIGS. 5A-5K. Based on instructions received from the MM-IVR 470, application server 425 executes multimodal action pages and transaction pages (828*b*) and exchanges text, images and/or video with the smart phone (828*c*) using the MM application running on the smart phone.

When the call handling system 440 receives a signal from the smart phone, the call handling system 440 checks if the signal is to terminate the call (830). If the signal is meant for other data transmission, for example further multimodal interaction, then the call handling system 440 determines that the call is not to be terminated and therefore continues interaction with the smart phone using the application server 425 and the MM-IVR 470 (828).

However, the signal from the smart phone may indicate that the call is to be terminated, for example, when the smart phone closes the native telephony application and/or closes the MM application. If the call handling system 440 determines that the call is to be terminated, then the call handling system 440 sends instructions to the application server 425 to terminate the data communications session and sends instructions to the IVR to terminate the voice communications session (832). Based on the instructions received form the call handling system 440, the data communications session between the MM application and the applications server 425 is closed, and/or the voice communications session between the native telephony application on the smart phone and the MM-IVR 470 is closed. In an alternative implementation, the data and voice communications sessions are automatically terminated when the user of the smart phone terminates the call, e.g., by hanging up, and therefore the call handling system 440 does not have to send additional instructions to the application server 425 or the MM-IVR 470.

Figure 9:
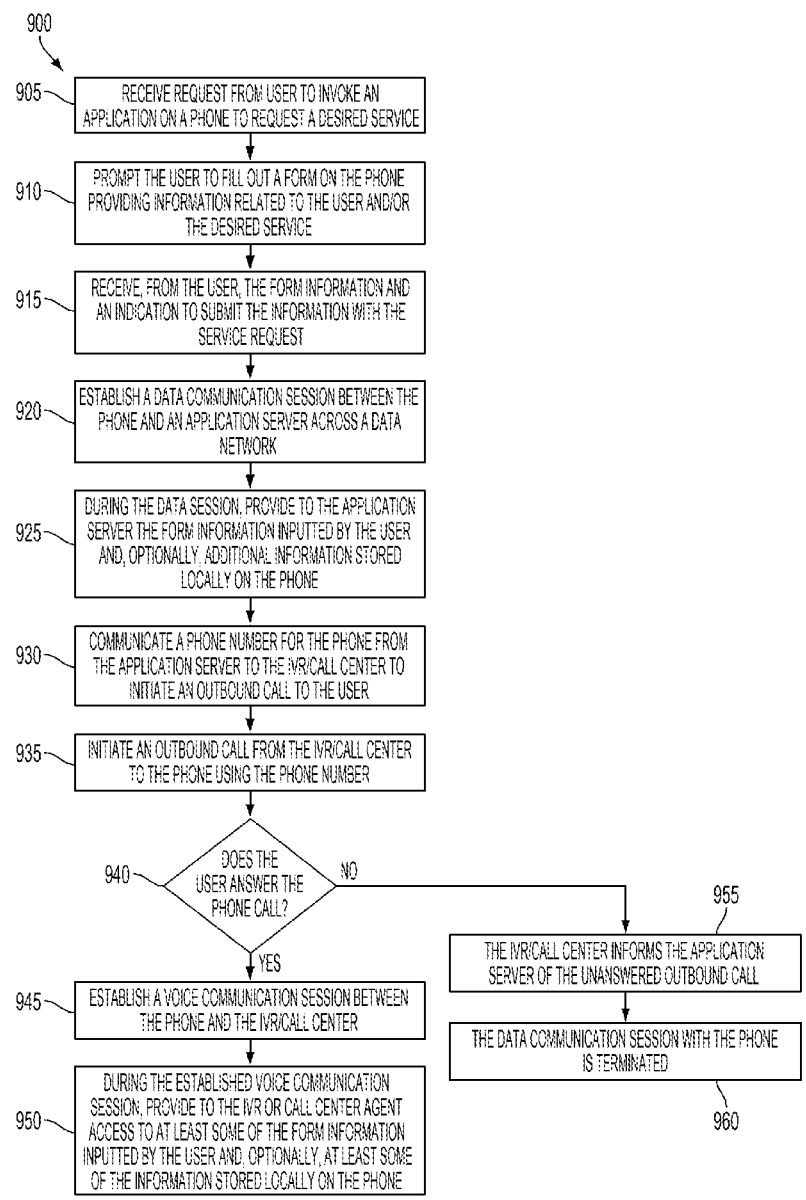
FIG. 9 is flowchart illustrating an example of a process for enabling a user of a smart phone to communicate information to a call center or to an interactive voice response system.

FIG. 9 is flowchart illustrating an example of a process 900 for enabling a user of a smart phone to communicate information to a call center or to an interactive voice response system. The process 900 may be performed, for example, by the call handling system 440 when the user of the smart phone 415 calls and interacts with an enhanced voice site that is hosted by the call handling system 440, using the native telephony application 416 and/or the multimodal application 418. Specifically, the process 900 may be performed by the MM-IVR 470 and/or the call center 480, and the application server 425 as components of the call handling system 440. The voice site may be the voice site created by the content provider 405, or it may be a different voice site that is hosted by the call handling system 440. Accordingly, the following describes the process 900 being performed by components of the communications system 400 that is described with reference to FIG. 4. However, the process 900 also may be performed by other communications systems or system configurations.

The user of the smart phone 415 is able to interact with the phone to indicate a desire to request a service from a service provider (905). The service provider in this context is different from the provider of the voice site hosting service that provides the call handling system 440. The service provider may be, for example, a company that has created a voice site using the call handling system 440 that is hosted by the call handling system 440. The user may indicate a desire to request a service from the service provider by selecting a graphically displayed icon on a graphical user interface (GUI) of the smart phone 415 to thereby invoke an MM application stored in the smart phone 415 with which the user can interact to initiate a service request. The service may be, for example, a request to purchase a particular product or service offered by or made available through the service provider.

In response to the indication, the smart phone 415, through execution of the MM application, visually presents to the user a single-field or a multi-field form to fill out (910). A single-field form is a form that includes a single data field in which the user is prompted to provide data (i.e., a field in the form that the user is instructed to fill in or otherwise complete by providing input). A multi-field form is a form that includes multiple such data fields A form may be, for example, a textual form having one or more blank spaces indicative of the data fields that are available to be filled in with data provided by the user of the smart phone 415. The user is able to fill out the form by providing text, audio, image, and/or video input into the smart phone 415 and initiate the submission of a service request by the smart phone 415 to an application server 425 across a data network 410 (915). For example, after providing the form data, the user may initiate submission of the service request by depressing a button on the smart phone 415 or by selecting a graphical element displayed by the GUI of the MM application on the smart phone 415.

A data communications session is setup between the smart phone 415 and the application server 425 in response to the service request (920), and at least some of the form information provided by the user is communicated to the application server 425 during the data communications session (925). Optionally, the smart phone 415, under the direction of the MM application, may provide additional caller information that is stored locally on the smart phone 415 but that is not otherwise specifically provided by the user in connection with the specific service request to be submitted by the smart phone 415. Such additional information may include, for example, a phone number of the smart phone, a profile of the user that includes the interests and/or demographics of the user, calendar information of the user, address book information of the user, information about the applications resident on the smart phone, and an identification number or model number of the smart phone. A user of the smart phone 415 may, for example, have previously set privacy preferences stored on the smart phone 415 indicating that such information may be accessed by some or all of the applications on the smart phone 415 for processing service requests or for other purposes.

The application server 425 provides a phone number of the smart phone 415 to a call handling system 440. The call handling system 440 may include an MM-IVR 470 and/or a call center 480. The call handling system 440 requests that the call center 480 and/or the MM-IVR 470 initiates an outbound call to the phone number to provide service to the user of the smart phone 415 (930). In other implementations, the application server 425 provides a phone number of another phone designated by or for the user as the phone over which the user desires to receive service. The other phone number may, for example, be provided by the user as input into one of the multiple fields of the form and communicated to the application server as part of the form information provided by the smart phone 415. The application server 425 may, for example, provide the phone number of the smart phone 415 or other phone number to the call center 480 or MM-IVR 470 over the data network 410.

The call center 480 or MM-IVR 470 initiates an outbound call to the phone number of the smart phone 415 (or other designated phone number) across a voice network 430 (935) and, upon the user answering the call (940), a voice communications session is setup between the call center 480 or MM-IVR 470 and the smart phone 415 (945). In some implementations, the application server 425 provides the form information and, optionally, the other caller information received from the smart phone 415 to the call center 480 or MM-IVR 470 prior to the outbound call being made to enable identification of the right-skilled agent or the correct IVR script (or voice site) to be used for the outbound call that best serves the user's service needs. If the user does not answer the call (940), the call center 480 or the MM-IVR 470 communicates this to the application server 425 (955) and, in some implementations, the application server 425 may terminate the data communications session with the smart phone 415 (960).

The application server 425 enables the MM-IVR 470 or call center 480 to access at least some of the form information and, optionally, other caller information received from the smart phone 415 prior to, upon, or subsequent to the user answering the call (950). For example, if the outbound call is made by an agent at the call center 480, at least some of the form information and/or optional other caller information may be provided to the agent as a screen pop prior to, upon, or subsequent to the user answering the outbound call. The form information and optional other caller information may enable the agent to better serve the user's needs by providing context information for the phone call/service request. The application server 425 may, for example, provide the form information and/or other optional caller information to the call center 480 or MM-IVR 470 over the data network 410.

If the MM-IVR 470 or the call center 480 is very busy, the outbound call request may be placed in a queue until a telephone line of the MM-IVR 470 or an appropriate agent at the call center 450 becomes available. In some implementations, the call center 480 or MM-IVR 470 may provide the application server 425 information indicating that the outbound call request has been placed in a queue and may additionally provide an estimate of the wait time before the outbound call will be made. The application server 425 may communicate this information to the smart phone 415, which, under the direction of the MM application, may display the information to the user during the previously established data communications session. The smart phone 415, under the direction of the MM application, may prompt the user to indicate whether he or she wishes to wait to receive the outbound call. If the user indicates that he or she does not wish to wait for the outbound call, the smart phone 415 may communicate this to the application server 425 and the application server 425 may request that the MM-IVR 470 or call center 480 remove the outbound call request from the queue. In some implementations, the application server 425 also may terminate the data session with the smart phone 415 in response to the user indicating that he or she does not wish to wait to receive service via the outbound call.

In some implementations, upon a voice communications session being setup between the user of the smart phone 415 and the MM-IVR 470 or call center 480, the application server 425 may terminate the data communications session with the smart phone 415. In other implementations, the data communications session between the application server 425 and the smart phone 415 may persist simultaneously with the voice communications session between the smart phone 415 and the MM-IVR 470 or call center 480.

In implementations in which the data communications session and the voice communications session concurrently persist, the user may be presented with additional single-field or multi-field forms to be filled out by the user via the smart phone 415 in real-time while the user interacts with the MM-IVR 470 or the agent at the call center 480. The delivery of the additional forms may be triggered by the MM-IVR 470 or by the agent at the call center 480 based on interactions with the user during the voice communications session. For example, the MM-IVR 470 may process scripts for a voice site that includes a multimodal action page having a "PushForm" action parameter with a value parameter that indicates a name for a file that stores the form to be pushed to the smart phone 415. As the user interacts with the scripts corresponding to the various pages of the voice site (including, for example, voice message pages and voice question pages), the user interaction may lead to the MM-IVR 470 processing a multimodal action page that sends an MM instruction to the MM application that includes the action parameter "PushForm" and the value parameter "Form AB" corresponding to a file that stores a form having the name "AB." In some implementations, the MM-IVR 470 may use multiple multimodal action pages to push a form to a user and to then receive corresponding form information from the user.

Upon the delivery of an additional form being triggered by the MM-IVR 470 or by the call center agent, a signal is communicated from the MM-IVR 470 or call center 480 to the application server 425 over, for example, the data network 410. In response to the signal, the application server 425 may communicate an MM instruction to enable the smart phone 415 to access and download the appropriate single-field or multi-field form over, for example, the data network 410 during the data communications session. The smart phone 415 may then present the appropriate form to the user for entry of additional form information. After entry of the additional form information by the user, the smart phone 415 may provide all or some of the additional form information to the application server 425 that, in turn, may provide to or otherwise enable access to the additional form information to the MM-IVR 470 or the call center 480 (or agent) in real-time during the call. In this manner, the user is able to provide information to the MM-IVR 470 or the agent at the call center 480 both via speaking to the MM-IVR 470 or to the agent and by providing form input (e.g., text, audio, image, and video input) through interactions with the smart phone 415 in real-time during the call with the MM-IVR 470 or the agent.

While the above-described processes and systems involve an MM-IVR 470 or a call center 480 making an outbound call to the recipient, other implementations may differ. For example, in some implementations, rather than the MM-IVR 470 or call center 480 placing an outbound call, the smart phone 415, under the direction of the MM application, instead initiates a call to the MM-IVR 470 or to the call center 480 prior to, concurrently with, or subsequent to establishing the data communications session with the application server 425 and submitting the form information to the application server 425. In these implementations, the application server 425 may provide the MM-IVR 470 or the call center 480 with the form information during the voice communications session setup between the smart phone 415 and the MM-IVR 470 or the call center 480. For example, the application server 425 may provide the form information upon receiving a signal from the MM-IVR 470 or from the call center 480 requesting the information or, additionally or alternatively, upon being requested to do so by the smart phone 415. If the MM-IVR 470 or the call center 480 is busy, the call placed by the user may be placed in the inbound call queue and the MM-IVR 470 or the call center 480 may provide an estimated wait time to the user of the smart phone 415 directly or via the application server 425 as discussed previously. As before, the user of the smart phone 415 can then choose to wait or not wait to be connected to an agent of the call center 480 or to the MM-IVR 470.

The above-described techniques for enabling a user to push information to a call center and/or to an IVR may offer various benefits. In particular, if the user of the smart phone is interacting with an IVR, the described techniques may allow the number of data gathering operations that are needed in the IVR to be streamlined to only include those that are best suited for voice interaction (e.g., voice biometrics, yes/no questions). Any data that is ill-suited to being gathered through voice interaction can be provided to the IVR via the user of the smart phone filling out form information that is then communicated to the IVR via the application server in real-time. Additionally, in this manner, the IVR may be able to receive input that today is impossible to receive (e.g., e-mail addresses) or input that requires interactions that challenge Voice User Interface (VUI) usability (e.g., full name capture and address capture).

If the user of the smart phone is interacting with an agent at a call center, the above-described techniques also may offer various benefits. Specifically and as stated previously, the outbound call made to the smart phone may be made by the right-skilled agent (e.g., the agent that speaks the language of the user of the smart phone or that is knowledgeable about the product or service type being requested by the user of the smart phone) or, in other implementations, the call made by the smart phone to the call center can be routed to the right-skilled agent. Moreover, as described above, the call center can provide more contextualized handling of the calls by providing the agent with some or all of the collected form information or other information received from the smart phone upon the agent receiving or making the call. The form information or other information can specify the nature of the call and/or personal information (such as name, e-mail address) of the caller/call recipient.

While the above-described processes and systems involve an MM-IVR 470 or a call center 480, other implementations may differ. For example, in some implementations, the user of the smart phone 415 fills out a single-field or a multi-field form prior to initiating a call with a call recipient that is neither an IVR nor an agent at a call center, but rather is simply a user of another smart phone. The application server 425 provides the form information to the smart phone of the call recipient by establishing a data communications session with the smart phone of the call recipient. The information may be provided prior to, upon, or subsequent to a voice communications session being established between the two smart phones. As before, the application server 425 may or may not terminate the data communications sessions with the smart phones upon the voice communications session being established between the two smart phones. If the application server 425 does not terminate the data communications sessions, the application server 425 may again enable the users of the smart phones to fill-in and provide to each other form data in real-time while the users remain conversing with each other in the voice communications session.

Figure 10A:
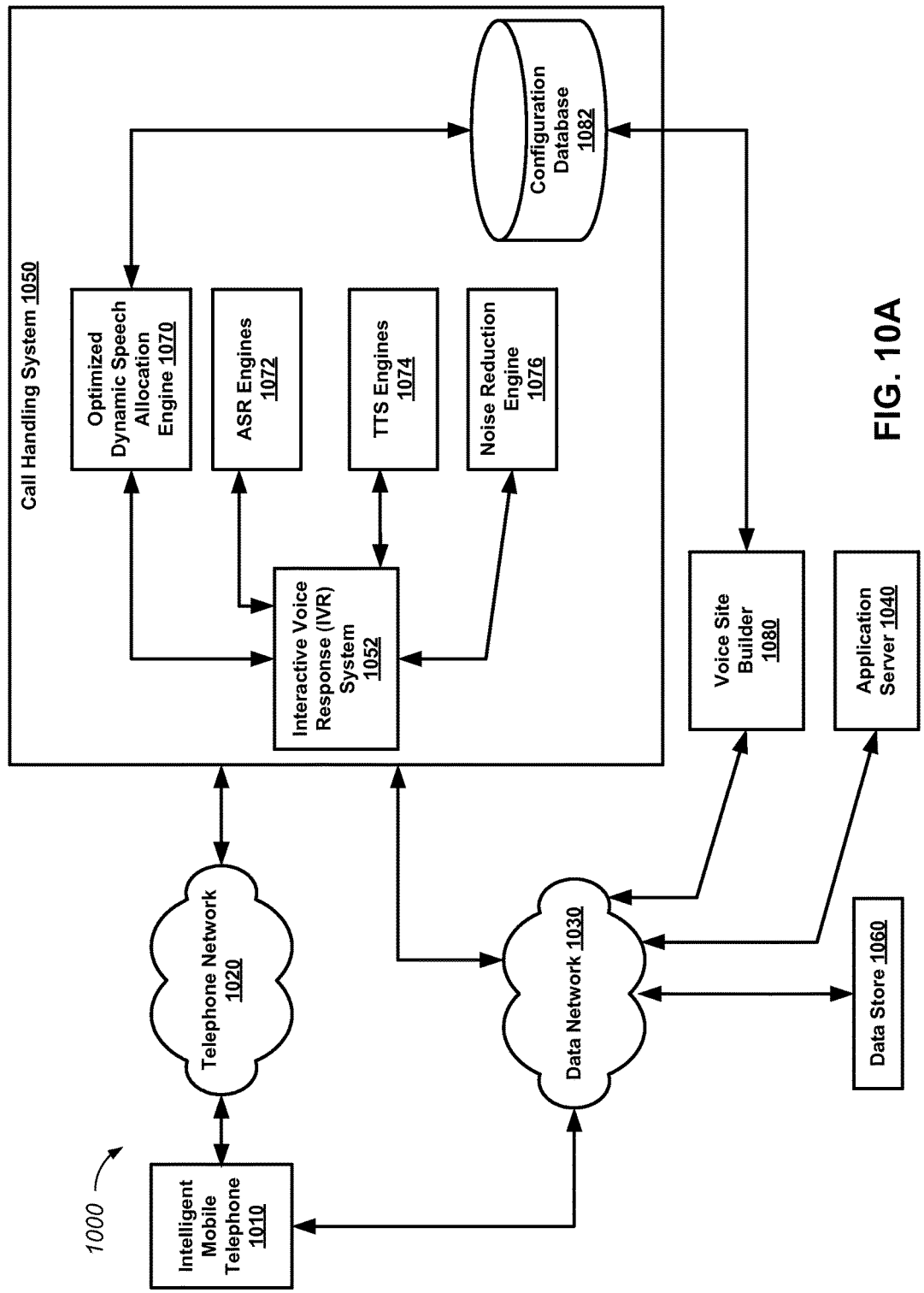
FIGS. 10A-10B are block diagrams of a communications system that provides optimized dynamic speech resource allocation for voice interactions.

FIG. 10A is a block diagram of a communications system 1000 that provides optimized dynamic speech resource allocation for voice interactions. From a content provider's perspective, the determination of a particular speech resource for a particular voice interaction is preferably based on a balance between minimizing the transaction cost to the content provider of using the speech resource and optimizing the user's experience when interacting with the voice site by ensuring that the speech resource is up to the task of supporting a smooth interaction with the user. From a service provider's perspective, the selection of particular speech resources is preferably transparent to the content provider, as the service provider may wish to have the flexibility of upgrading, removing, or replacing certain speech resources without affecting the operation of a voice site as designed by the content provider. A system, like that described in more detail below, may determine the data processing needs for a given voice application from a content provider and may automatically select the lowest cost speech resources able to handle those data processing needs. In doing so, the system decreases the speech resource costs associated with the voice site while not compromising a user's experience while interacting with the voice site. The communications system 1000 may be implemented in part using, for example, components in the communications system 100 as illustrated in FIG. 1.

As mentioned previously, a voice site may be hosted by a third party service provider that facilitates the creation and hosting of voice sites on servers owned and operated by the service provider. The service provider may provide a service/method that enables the design, development, and hosting of voice applications that run a thin client on the intelligent mobile telephone that interacts with a fully hosted, on-demand voice solution platform/call handling system maintained and managed by the service provider. A content provider may use the service to design voice applications, such as, for example, a voice application that provides customer service for a particular product or service (e.g., technical support service and/or sales service to enable the customer to purchase the product or service). The content provider configures the voice site that is to be used for the particular product or service and provides the logic for the voice site that is to be executed by the IVR system. A voice interaction is an interaction flow between the user of the intelligent mobile telephone and the voice site using voice as the communication means. For an enhanced voice site, the voice interaction may be supplemented by communications other than voice that occur in parallel or sequentially with the voice communications as noted previously. Notably, system 1000 may be used to provide optimized dynamic speech resource allocation for both voice sites and enhanced voice sites. The term "voice site," as used in the following description, should be understood to cover both enhanced and non-enhanced voice sites.

Depending on the voice application, each voice site may have different static data processing requirements. Here, data may be audio, video, text, or any other information being exchanged between the IVR system and the user. For example, the data processing requirements for a pizza ordering application may be more complex than the data processing requirements for a customer satisfaction surveying application because of the greater need for more sophisticated natural language processing in the former than the latter. As another example, the data processing requirements within a flow of a voice application may change at different states of the flow. For example, at the topping-ordering state of the pizza ordering application, a robust but more expensive ASR engine may be required to process the spoken input from the user. However, at the payment state of the same pizza ordering application, a more cost-effective ASR engine that is optimized to take credit card numbers may be sufficient to process the spoken input from the user. Moreover, there may be additional dynamic data processing requirements raised during a voice interaction due to changes in the calling environment. For example, the IVR system may detect that the ambient noise level around the caller has changed during the voice interaction. To satisfy the static and dynamic data processing requirements, the service provider may have access to various types of speech resources that can be customized to enable the IVR system to optimally process data received from the user.

A speech resource may be developed by the service provider, or may be purchased by the service provider from an external resource provider. Speech resources may include ASR engines, TTS engines, and a noise reduction engine.

Each speech resource may have its associated functionalities, properties, and cost. For example, an ASR engine may be optimized to process natural language or to process simple grammar (e.g., numbers), where the cost associated with an ASR that is optimized to process natural language may be higher due to processing complexity.

As noted previously, from a content provider's perspective, the determination of a particular speech resource for a particular voice interaction is preferably based on a balance between minimizing the transaction cost to the content provider and optimizing the user's experience with the voice interaction. From a service provider's perspective, the selection of particular speech resources preferably occurs without that selection being visible or readily visible to the content provider to thereby enable the service provider to upgrade, remove, or replace certain speech resources without negatively impacting the operation of voice sites previously designed and setup for content providers. Accordingly, a communications system that can integrate the service provider's available speech resources, and identify, from among the available speech resources, those speech resources that are optimal for a voice interaction based on its static and/or dynamic data processing requirements may enable a content provider and/or service provider to enjoy a decrease in costs associated with their corresponding voice site without compromising the quality of the user experience with the voice site.

The communications system 1000 is an example implementation of a system that supports optimized dynamic speech resource allocation for voice interactions. The communications system 1000 includes an intelligent mobile telephone 1010, a telephone network 1020, a data network 1030, an application server 1040, a call handling system 1050, a data store 1060, and a voice site builder 1080. The telephone 1010, the telephone network 1020, the data network 1030, the application server 1040, the call handling system 1050 and the data store 1060 are implementation examples of the telephone 110, the telephone network 120, the data network 130, the application server 140, the call handling system 150 and the data store 160 of FIG. 1, respectively.

In general, the intelligent mobile telephone 1010 is configured to place and receive calls across the telephone network 1020 and to establish data communications sessions with servers, such as the application server 1040, across the data network 1030 for transmitting and receiving data. The intelligent mobile telephone 1010 may be a cellular phone or a mobile personal digital assistant (PDA) with embedded cellular phone technology. The intelligent mobile telephone 1010 may be a computer that includes one or more software or hardware applications for performing communications between the intelligent mobile telephone 1010 and servers across the data network 1030. The intelligent mobile telephone 1010 may have various input/output devices with which a user may interact to provide and receive audio, text, video, and other forms of data. For example, the intelligent mobile telephone 1010 may include a screen on which may be displayed form data and with which the user may interact using a pointer mechanism to provide input to single-field or multi-field forms.

The telephone network 1020 may include a circuit-switched voice network, a packet-switched data network, or any other network able to carry voice data. The data network 1030 is configured to enable direct or indirect communications between the intelligent mobile telephone 1010, the application server 1040, and the call handling system 1050. In some implementations, the data network 1030 and the telephone network 1020 may be implemented by a single or otherwise integrated communications network configured to enable voice communications between the intelligent mobile telephone 1010 and the call handling system 1050, and to enable communications between the intelligent mobile telephone 1010, the application server 1040, and the call handling system 1050.

The application server 1040 is configured to establish a data communications session with the intelligent mobile telephone 1010 and to receive and send data to the intelligent mobile telephone 1010 across the data network 1030. The application server 1040 also is configured to communicate with the call handling system 1050 to send data received from the intelligent mobile telephone 1010 to the IVR 1052. The application server 1040 may also send other application-related data that did not originate from the intelligent mobile telephone 1010 to the IVR 1052 or, more generally, to the call handling system 1050. The application server 1040 may also be configured to communicate with the data store 1060 to read and/or write user interaction data (e.g., state variables for a data communications session) in a shared memory space as described previously with respect to application server 140 and data store 160 shown in FIG. 1. The application server 1040 may be one or more computer systems that operate separately or in concert under the direction of one or more software programs to perform the above-noted functions. In some implementations, the application server 1040 and the call handling system 1050 are a single integrated computer system.

The data store 1060 is configured to store user interaction data of voice interactions. In some implementations, the data store 1060 may store interaction data associated with a particular user. For example, the interaction data may include the gender and other voice characteristics of the caller, the choices made by the caller during each state of the voice interaction, and the speech resources utilized during each state of the voice interaction. In some implementations, the data store 1060 may store aggregated interaction data associated with a particular voice site or voice application. For example, the aggregated interaction data may include data specifying a breakdown of genders among all callers that accessed the particular voice site. In some implementations, a user may opt-out such that her usage data is then not stored in the data store 1060. In some implementations, a user may opt-in to have her usage data be stored in the data store 1060.

The voice site builder 1080 is configured to provide application development tools to third party content providers for creating voice sites. The voice site builder 1080 may be implemented, for example, as a special-purpose or a general-purpose computer configured to access instructions included in one or more programming modules that are stored on a computer-readable storage medium. The instructions, when executed by the computer, enable the computer to communicate with a content provider computing device to enable the content provider computing device to provide a user interface with which a user of the content provider computing device may interact to create a voice site using the application development tools. In one implementation, the content provider computer is a desktop computer that uses a browser program (e.g., a Web browser) to access the voice site builder 1080 across the data network 1030 (e.g., the Internet).

In some implementations, the voice site builder 1080 resides in a server (e.g., a Web server) separate from but in communication with the call handling system 1050. In other implementations, the voice site builder 1080 is integrated into the call handling system 1050. In yet other implementations, the voice site builder 1080 is entirely contained within the content provider computing device, which periodically communicates data that defines the developed voice site to the call handling system 1050 for approval and implementation.

Example application development tools provided by the voice site builder 1080 are illustrated in FIGS. 5A-5N, which were described previously, and in FIGS. 12A-12C, which are described below. In some implementations, a content provider may use the voice site builder 1080 to configure data processing requirements associated with a voice page, and the configured data processing requirements may be stored in a configuration database 1082.

In general, the call handling system 1050 may include an interactive voice response (IVR) system 1052, an optimized dynamic speech allocation (ODSA) engine 1070, a configuration database 1082, and speech resources, which include ARS engines 1072, TTS engines 1074, and a noise reduction engine 1076. In some implementations, the call handling system 1050 may additionally or alternatively include other resources that can be used to process other modes of information, such as video and text. As used in this specification, an "engine" (or "software engine") refers to a software implemented input/output system that provides an output that is different from the input. An engine can be an encoded block of functionality, such as a library, a platform, a Software Development Kit ("SDK"), or an object.

The IVR 1052 may include a voice gateway coupled to a voice application system via a data network. Alternatively, the voice gateway may be local to the voice application system and connected directly to the voice application system. The voice gateway is a gateway that receives user calls from or places calls to voice communications devices, such as the intelligent mobile telephone 1010, and responds to the calls in accordance with a voice interaction. The voice interaction may be accessed from local memory within the voice gateway or from the application system. In some implementations, the voice gateway processes voice interactions that are script-based voice applications. The voice interaction, therefore, may be a script written in a scripting language such as, for example, voice extensible markup language (VoiceXML) or speech application language tags (SALT). The voice application system includes a voice application server and all computer systems that interface and provide data to the voice application server. The voice application system sends voice application programs or scripts to the voice gateway for processing and receives, in return, user responses. The user responses are analyzed by the voice application system and new programs or scripts that correspond to the user responses may then be sent to the voice gateway for processing. The voice application system may determine which programs or scripts to provide to the voice gateway based on some or all of the information received from the intelligent mobile telephone 1010 via the application server 1040. The IVR 1052 also is configured to communicate with the data store 1060 to read and/or write user interaction data (e.g., state variables for a data communications session) in a shared memory space as described previously.

The optimized dynamic speech allocation (ODSA) engine 1070 is one or more computing devices configured to select a speech resource for the IVR system 1052 based on a set of static and/or dynamic data processing requirements associated with a voice interaction, and a set of engine attributes associated with speech resources. In general, in response to a request from the IVR system 1052, the ODSA engine 1070 determines and provides to the IVR system 1052 one or more port identifiers for identifying speech resources. A port is a data communication channel that the IVR system 1052 may subsequently use to connect to and communicate with the identified speech resource to process voice data. In some implementations, port identifiers are stored in the configuration database 1082.

The call handling system 1050 may include multiple speech resources for processing voice data. The speech resources may include, for example, ASR engines 1072. ASR engines 1072 are one or more engines that are running software and/or hardware applications for performing automatic speech recognition (e.g., ISPEECH™, GOOGLE™, and NVOQ™). When executing voice interactions, the IVR system 1052 may access any one of the ASR engines 1072 through a port identified by the ODSA engine 1070.

Additionally or alternatively, the speech resources may include TTS engines 1074. TTS engines 1074 are one or more engines that are running software and hardware applications for performing text-to-speech conversions (e.g., ISPEECH™). When executing voice interactions, the IVR system 1052 may access any one of the TTS engines 1074 through a port identified by the ODSA engine 1070.

Additionally or alternatively, the speech resources may include a noise reduction engine 1076. The noise reduction engine 1076 is configured to increase voice recognition accuracy by reducing background noise associated with the calling environment of a user. When executing voice interactions, the IVR system 1052 may access the noise reduction engine 1076 through a port identified by the ODSA engine 1070.

Figure 10B:
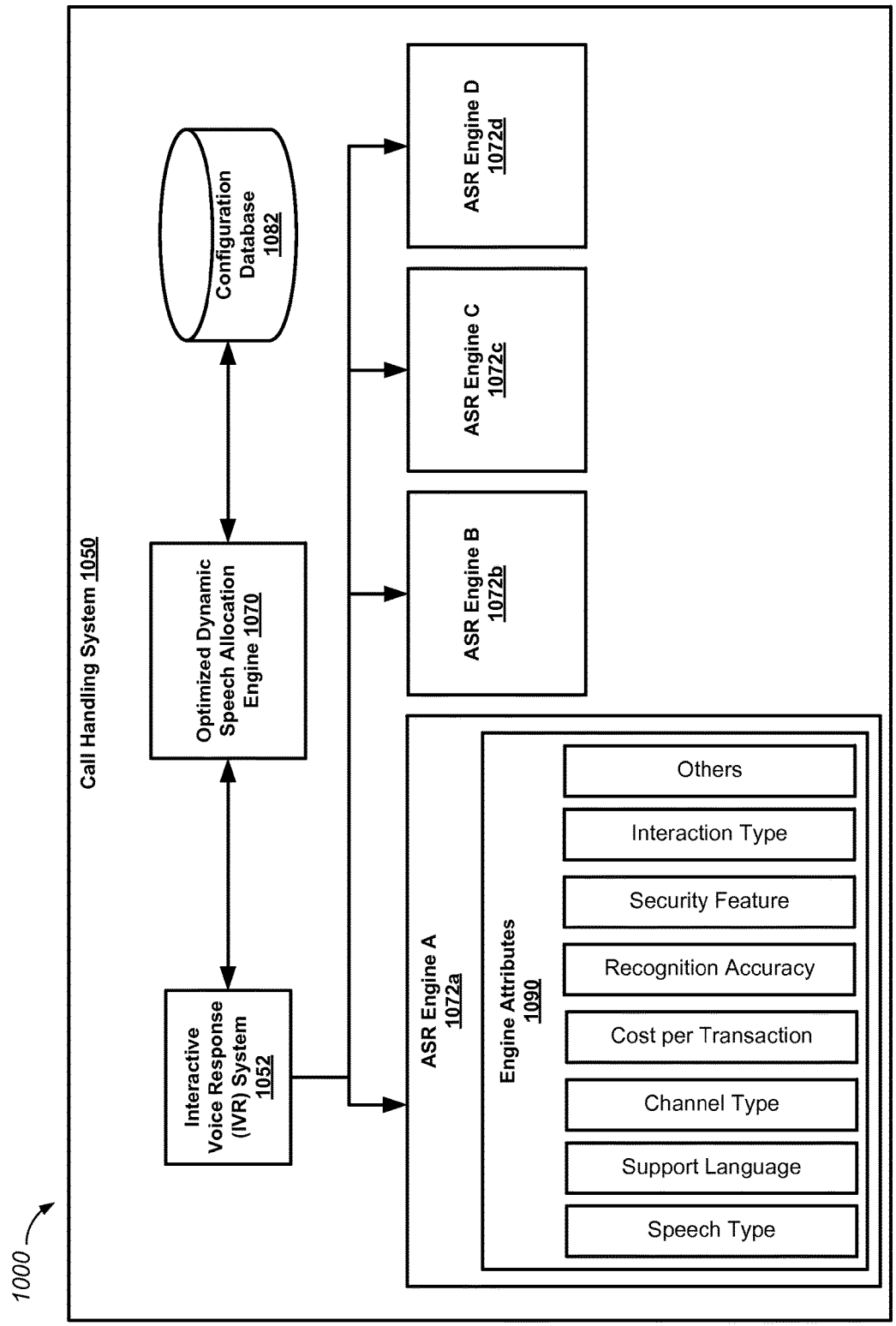

FIG. 10B is a block diagram of a communications system 1000 that illustrates more specifically different types of speech resources that may be available in the call handling system 1050. Here, FIG. 10B illustrates an example where four ASR engines (ASR engine A 1072a, ASR engine B 1072b, ASR engine C 1072c, and ASR engine D 1072d) are available in the call handling system 1050. In other implementations, fewer or more ASR engines may be implemented in the call handling system 1050. In other implementations, other types of resources for processing speech, text, video, or other data may be additionally or alternatively implemented in the call handling system 1050. In general, each ASR engine includes a set of engine attributes 1090. The ODSA engine 1070 determines an optimal ASR engine in response to a request by the IVR system 1052 based on one or more sets of engine attributes 1090 and the data processing requirements received from the IVR system 1052 and/or from the configuration database 1082.

In particular, the ODSA engine 1070 may select an optimal ASR engine by comparing the one or more sets of engine attributes 1090 to the static data processing requirements received from the configuration database 1082 and/or from the IVR system 1052, and/or by comparing the one or more sets of engine attributes 1090 to the dynamic data processing requirements received from the IVR system 1052. The ODSA engine 1070 provides the IVR system 1052 with one or more port identifiers that can be used to connect to the identified ASR engine, and the IVR system 1052 may subsequently communicate with the identified ASR engine 1072a, 1072b, 1072c, or 1072d via the one or more ports using the port identifiers to process voice data.

In some implementations, the engine attributes 1090 of an ASR engine may include one or more speech types. A speech type may indicate the complexity of user speech that an ASR engine may recognize and process. Examples of speech types include, but are not limited to, basic ASR, dictation, and natural language. In some implementations, an ASR engine having an attribute of a basic ASR speech type may be configured to recognize a sentence within a known context. For example, the IVR system 1052 has asked a user a question, and the context of voice interaction with the user is constrained by the question. In some implementations, an ASR engine having an attribute of a dictation speech type may be configured to render a user's speech into text automatically and without engaging in a spoken language exchange between the user and a voice application. In some implementations, an ASR engine having an attribute of a natural language type may be configured to allow a user to proactively provide voice data in a voice application without the IVR system 1052 prompting the user to do so. For example, a pizza ordering application may allow the user to specify desired toppings before the IVR system 1052 asks the user for such input.

In some implementations, the engine attributes 1090 of an ASR engine may include one or more support languages. A support language may indicate a specific language that an ASR engine may be configured to recognize. Examples of a support language include, but are not limited to, English, Spanish, French, and other foreign languages.

In some implementations, the engine attributes 1090 of an ASR engine may include one or more channel types. A channel type may indicate whether an ASR engine is configured to support speech recognition only, or an ASR engine is configured to support speech recognition assisted by information provided by the user using other modes (e.g., text). For example, the voice recognition accuracy may improve if an ASR engine can process text information provided by the user, which may provide additional context for recognizing the voice data. For instance, a user may be asked during a voice interaction to provide a ticket ID that is an alphanumeric string (e.g., "72HB8C2"). In such instances, depending on the numbers and characters allowed, speech responses may have a high level of misrecognition (e.g., the "H" may be mistaken for an "8", the "8" for "H", or the "C" for the "Z"). In such instances, the user may be asked to enter their ticket ID by responding to an SMS that was sent to them during the call. The user may respond by typing that ID and the IVR/Voice interaction may proceed on from that point.

In some implementations, the engine attributes 1090 of an ASR engine may include a cost per transaction. In general, a service provider may charge a content provider based on the speech resources used by the IVR system 1052 during a voice interaction with a user. For example, the cost may be associated with the complexity of the required voice data. For instance, a high premium may be charged for voice interactions requiring large grammars (e.g., City and State), or complex grammars (e.g., full physical addresses), or Natural language grammars (e.g., the ability of the user to express themselves without any unnatural constraints in how them may express themselves, for the purpose of describing a type of problem). A lesser premium may be placed on interactions that require moderately sophisticated but very well behaved grammars (e.g., dates, currency, credit card numbers), and then an even lesser premium for simple grammars (e.g., phone numbers, digit sequences), with the least complex being a small set of keywords or phrases (e.g., "What is your favorite color?"). As another example, the cost may be associated with additional functionality provided by a speech resource (e.g., an ASR engine that provides an optional biometrics feature may result in a higher cost when the optional biometrics feature is enabled). As another example, the cost may be associated with an arrangement between the service provider and external developers of the speech resources (e.g., a service provider may pay an external developer each time an IVR system is connected to an ASR engine, or the service provider may pay the external developer a flat fee each year.)

In some implementations, the engine attributes 1090 of an ASR engine may include recognition accuracy of the ASR engine. An ASR engine with a higher recognition accuracy attribute provides greater accuracy in recognizing the content of spoken input than an ASR engine with a lower recognition accuracy attribute. In general, an ASR engine produces a confidence level or score after processing voice data that reflects the likelihood that the content identified by the ASR engine as corresponding to the voice data in fact does correspond to the voice data. In some implementations, the ASR engine may determine that there are multiple possible interpretations for the received voice data, and the ASR engine may assign a separate score to each of the possible interpretations to reflect the differing respective likelihoods that each corresponding interpretation correctly identifies the content of the spoken input. In some implementations, an ASR's recognition accuracy attribute or attributes is specific to speech type such that the ASR has a different recognition accuracy attribute for each of one or more different speech types. In some implementations, an ASR having a higher recognition accuracy attribute may indicate that the ASR engine is better able to accurately analyze voice data in the presence of more background noise than an ASR having a lower recognition accuracy attribute.

In some implementations, the engine attributes 1090 of an ASR engine may include additional security features supported by the ASR engine. For example, an ASR engine may be configured to support biometrics features, which allow the ASR engine to securely verify the identity of a caller by analyzing voice characteristics of the caller.

In some implementations, the engine attributes 1090 of an ASR engine may include interaction types. An interaction type may indicate what type of voice interaction an ASR engine is configured to process. Examples of interaction types include, but are not limited to, directed dialog and mixed initiative. In some implementations, an ASR engine having an attribute of directed dialog interaction type may be configured to require that the IVR system 1052 exchange voice information with the user using a step-by-step, question-and-answer type of voice interaction. In some implementations, an ASR engine having an attribute of mixed initiative interaction type may be configured to allow a user to initiate a conversation using natural language before the IVR system 1052 prompts a specific question to the user.

In some implementations, the engine attributes 1090 of an ASR engine may include other features supported by the ASR engine. For example, an ASR engine may be configured to support a feature that is specifically designed to process voice information having characteristics of a high pitch. As another example, an ASR engine may be configured to support a built-in feature for background noise reduction.

Each of the ASR engines 1072a, 1072b, 1072c, and 1072d may have its own set of engine attributes. In some implementations, an ASR engine may have customized engine attributes because the ASR engine is developed by a different external ASR engine developer. In some implementations, the engine attributes of each of the ASR engines 1072 may be stored at the configuration database 1082. In some other implementations, the engine attributes of each of the ASR engines 1072 may be stored at the ODSA engine 1070.

Figure 11A:
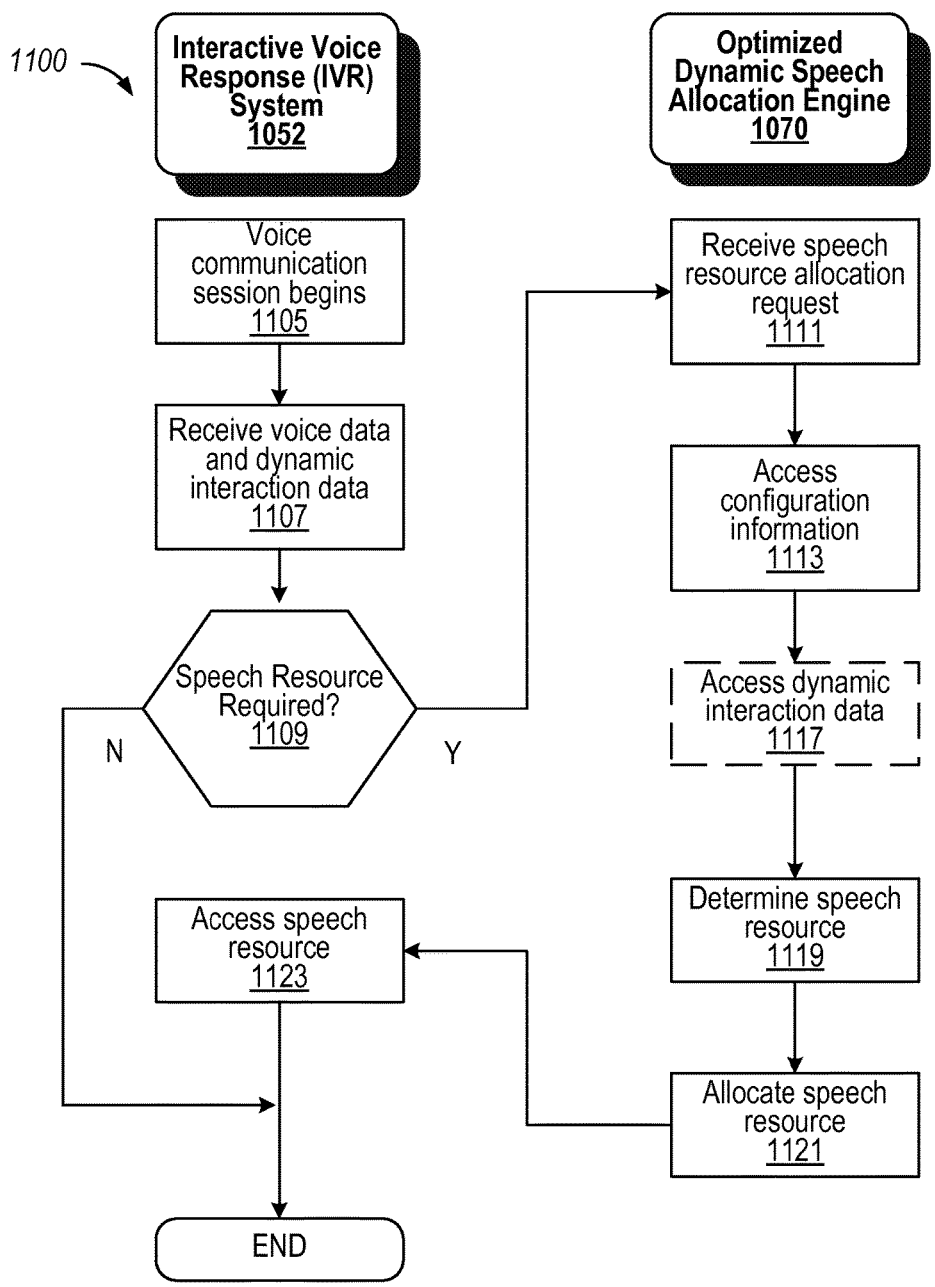
FIGS. 11A-11C are flow charts illustrating example processes that determine and allocate speech resources based on static and dynamic characteristics of voice interactions.

FIG. 11A illustrates a flow chart illustrating an example process 1100 that determines and allocates speech resources based on a static configuration of the voice interaction, dynamic interaction data, and engine attributes of the speech resources. In general, the process 1100 analyzes static configuration data and, optionally, dynamic interaction data to identify an optimal speech resource for the IVR system, and then enables the IVR system to access the identified speech resource. The process 1100 is described as being performed by a computer system comprising one or more computers, for example, the communications system 1000 shown in FIG. 10A. While process 1100 takes into account a static configuration of the voice interaction and, optionally, dynamic interaction data to select an optimal speech resource, other implementations may only take into account dynamic interaction data without taking into account the static configuration data in selecting an optimal speech resource.

A user initiates a voice communications session with the IVR system 1052 (1105). In some implementations, the user may dial a telephone number via the telephone network 1020 that is subsequently routed to the IVR system 1052 handling the corresponding voice site. In some other implementations, the user may initiate a voice application on her intelligent mobile telephone 1010, and the voice application may connect to the IVR system 1052 via the data network 1030. In some other implementations, the user may initiate a multimodal application on her intelligent mobile telephone 1010, and the multimodal application may connect to the IVR system 1052 and the application server 1040 via the data network 1030.

The IVR system 1052 receives voice data and, optionally, dynamic interaction data from the user of the intelligent mobile telephone 1010 (1107). In some implementations, the voice data may be received as the user's response to a question prompted by the IVR system 1052. In some other implementations, the user may speak the voice data without being prompted by the IVR system 1052. The dynamic interaction data includes data that represents characteristics associated with the user and her calling environment during the user's interaction with the IVR system 1052. For example, the dynamic interaction data may include the ambient noise level around the user during the call. As another example, the dynamic interaction data may include the location of the intelligent mobile telephone 1010. As another example, the dynamic interaction data may include voice characteristics of the user (e.g., gender, pitch, speed, volume, tone, preferred spoken language, age group, accent, and any other characteristics that may be processed using the received audio input from the user). In some implementations, the IVR system 1052 may analyze the dynamic interaction data and store the analyzed dynamic interaction data in the data store 1060. In some other implementations, the IVR system 1052 may store the analyzed dynamic interaction data internally. In some other implementations, the IVR system 1052 may store the received dynamic interaction data without further analysis.

The IVR system 1052 determines whether a speech resource is required to process the received voice data (1109). If the IVR system 1052 determines that a speech resource is required to process the received voice data, the IVR system 1052 may send a speech resource allocation request to the ODSA engine 1070. In some implementations, the speech resource allocation request may include the state of the voice communications session and, optionally, the dynamic interaction data. In some other implementations, the IVR system 1052 may store the state of the voice communications session and, optionally, the dynamic interaction data at the data store 1060, and may not include such information in the speech resource allocation request. In some implementations, the state of the voice communications session is an identifier for a voice page (e.g., the voice page that was executed to collect the received voice data from the user).

The ODSA engine 1070 receives the speech resource allocation request from the IVR system 1052 (1111). Upon receiving the speech resource allocation request, the ODSA engine 1070 identifies the state of the voice communications session. In some implementations, the ODSA engine 1070 may identify the state of the voice communications session by receiving such information from the IVR system 1052. In some other implementations, the ODSA engine 1070 may identify the state of the voice communications session by communicating with the data store 1060.

After identifying the state of the voice communications session, the ODSA engine 1070 accesses the configuration information associated with the state (1113). For example, a content provider for the voice communications session may have specified static speech data processing requirements at the time of developing the voice site, and the static speech data processing requirements have been previously stored at the configuration database 1082 as configuration information. The ODSA engine 1070 communicates with the configuration database 1082 to access the static speech data processing requirements (i.e., configuration information) based on the state of the voice communications session.

The ODSA engine 1070 then, optionally, accesses the dynamic interaction data associated with the voice communications session (1117). In some implementations, the ODSA engine 1070 may access the dynamic interaction data by receiving such information from the IVR system 1052. In some other implementations, the ODSA engine 1070 may access the dynamic interaction data by communicating with the data store 1060. The ODSA engine 1070 may then determine a set of dynamic speech data processing requirements based on the dynamic interaction data.

Based on the static speech data processing requirements and, optionally, the dynamic speech data processing requirements, the ODSA engine 1070 determines a speech resource for processing the voice data (1119). In some implementations, the ODSA engine 1070 may access engine attributes associated with a set of different speech resources, and select, based on the engine attributes, a speech resource from among the set of different speech resources that satisfies both the static speech data processing requirements and the dynamic speech data processing requirements. In some implementations, the ODSA engine 1070 may select multiple speech resources that, in combination, satisfy both the static speech data processing requirements and the dynamic speech data processing requirements. In some implementations, the ODSA engine 1070 may select a single speech resource that satisfies the static speech data processing requirements (e.g., an ASR engine that handles basic ASR) and a different single speech resource that satisfies the dynamic speech data processing requirements (e.g., a noise reduction engine). In some implementations, the ODSA engine 1070 may select multiple different speech resources that are each able to satisfy the static speech data processing requirements and/or the dynamic speech data processing requirements, and may then select, from among these, the speech resource for the content provider based on cost (e.g., the lowest cost speech resource). For example, the dynamic interaction data for the user indicates that the user is a female, so the ODSA engine 1070 selects an ASR engine best able to handle a female voice. In some implementations, one or more static or dynamic speech data processing requirements may be weighted, and the ODSA engine 1070 may determine the optimal speech resource that satisfies the weighted speech data processing requirements.

After determining the speech resource, the ODSA engine 1070 allocates the speech resource to the IVR system 1052 (1121). In some implementations, the ODSA engine 1070 may identify a port that can be connected to the determined speech resource, and communicates the port identifier to the IVR system 1052. In some implementations, the ODSA engine 1070 may identify more than one port for the IVR system 1052. For example, the ODSA engine 1070 may determine that the IVR system 1052 should connect to both an ASR engine 1072 and the noise reduction engine 1076. The ODSA engine 1070 then communicates the speech resource allocation information to the IVR system 1052. In some implementations, the speech resource allocation information may include information identifying resource type and the port identifier.

After receiving the speech resource allocation information from the ODSA engine 1070, the IVR system 1052 accesses the allocated speech resource (1123). In some implementations, the IVR system 1052 may connect to and access the allocated speech resource via a port identified by the port identifier. The IVR system 1052 may communicate with the allocated speech resource to process the voice data received from the user.

Under the example process 1100 illustrated in FIG. 11A, the IVR system 1052 may continue to use the same allocated speech resource to process subsequent voice data received from the user at subsequent states of the voice interaction. However, the static speech data processing requirements or the dynamic speech data processing requirements may change at subsequent states of the voice interaction. It, therefore, may be useful to iteratively determine and allocate speech resources at different states of the voice interaction.

Figure 11B:
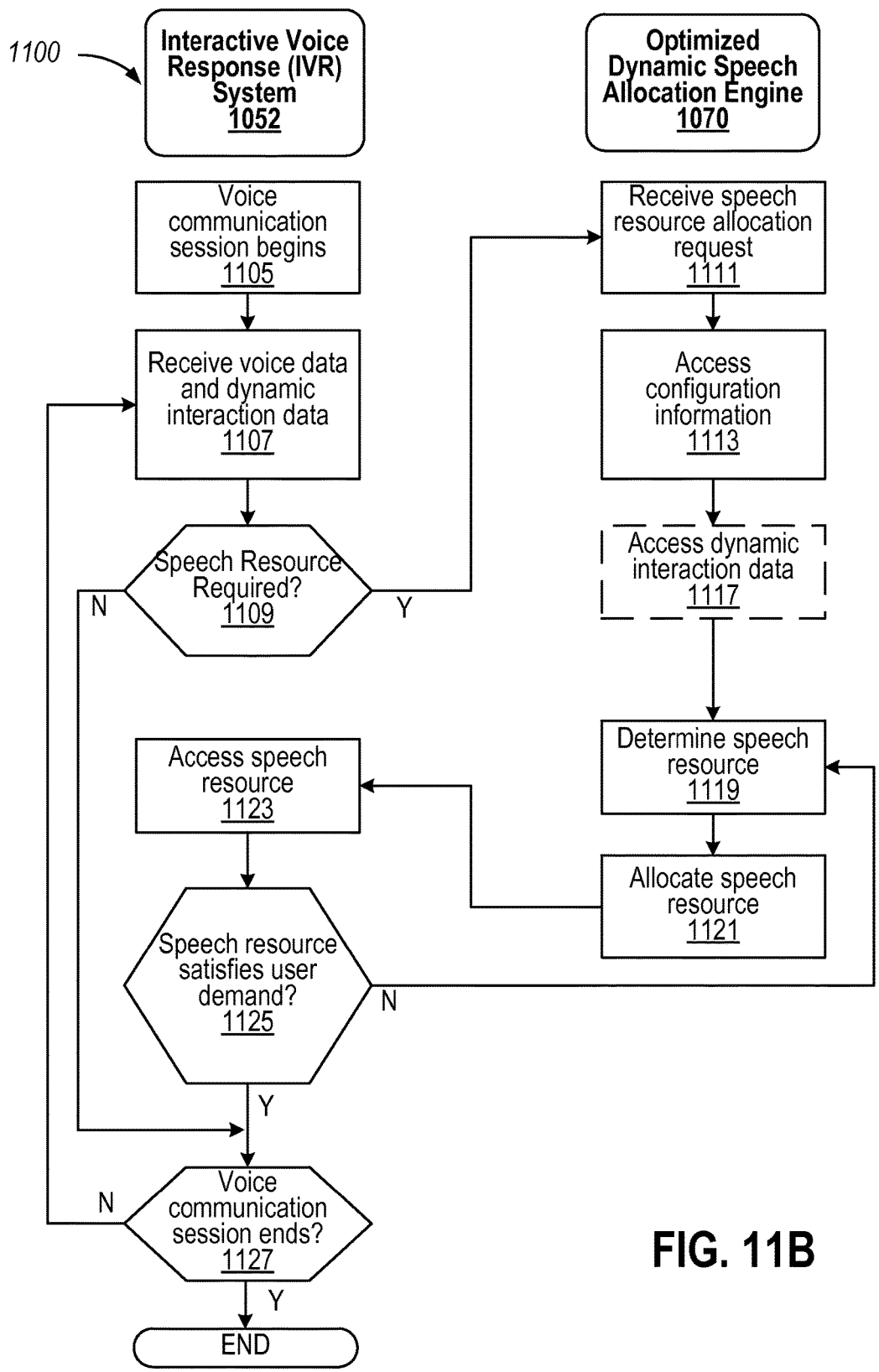

FIG. 11B depicts a flow chart illustrating an example process 1100 that iteratively determines and allocates speech resources based on static configuration of the voice interaction, dynamic interaction data, and engine attributes of the speech resources. As described previously, after receiving the speech resource allocation information from the ODSA engine 1070, the IVR system 1052 accesses the allocated speech resource and processes the voice data received from the user using the allocated speech resource (1123). The IVR system 1052 then provides the processed voice data to the user and determines whether the speech resource has satisfied the user's demand (1125). In some implementations, the IVR system 1052 may determine whether the speech resource has satisfied the user's demand by determining whether the user speaks the same or similar voice data again. In some implementations, the IVR system 1052 may determine whether the speech resource has satisfied the user's demand by determining the tone or other voice characteristics of the user's subsequent voice data input.

If the IVR system 1052 determines that the speech resource has satisfied the user's demand (1125), the IVR system 1052 determines whether the voice communications session has ended (1127). In some implementations, the IVR system 1052 may determine whether the voice communications session has ended by identifying the state of the voice interaction. In some implementations, the IVR system 1052 may determine whether the voice communications session has ended by analyzing the user's voice data. If the IVR system 1052 determines that the voice communications session has ended, the IVR system 1052 may close the port connected to the allocated speech resource. If the IVR system 1052 determines that the voice communications session has not ended, the IVR system 1052 receives subsequent voice data and, optionally, dynamic interaction data from the user (1107). Based on the newly received voice data and, optionally, the dynamic interaction data, the IVR system 1052 determines whether a speech resource is required to process the received voice data (1109). In some implementations, the IVR system 1052 may determine that the previously allocated speech resource is sufficient to process the newly received voice data. In that case, after the IVR system 1052 processes the voice data, the IVR system 1052 determines whether the voice communications session has ended (1127).

If the IVR system 1052 determines that a new speech resource is required, a speech resource allocation request is sent to the ODSA engine 1070. Upon receiving the speech the speech resource allocation request from the IVR system 1052 (1111), the ODSA engine 1070 accesses the configuration information associated with the newly identified state (1113), optionally accesses the newly received dynamic interaction data (1117), and determines a speech resource for processing the newly received voice data (1119). After determining the speech resource, the ODSA engine 1070 allocates the speech resource to the IVR system 1052 (1121), and after receiving the speech resource allocation information from the ODSA engine 1070, the IVR system 1052 accesses the allocated speech resource (1123).

If the IVR system 1052 determines that the speech resource has not satisfied the user's demand (1125), the IVR system 1052 sends a request to the ODSA engine 1070 to determine another speech resource for processing the previously received voice data (1119). In some implementations, the ODSA engine 1070 may determine to select the most robust speech resource based on the feedback from the IVR system 1052. In some implementations, the ODSA engine 1070 may determine to select another speech resource based on the dynamic interaction data. In some implementations, the ODSA engine 1070 may determine to add another speech resource (e.g., the noise reduction engine 1076) in addition to the previously determined speech resource. After determining the speech resource, the ODSA engine 1070 allocates the speech resource to the IVR system 1052 (1121), and after receiving the speech resource allocation information from the ODSA engine 1070, the IVR system 1052 accesses the allocated speech resource (1123).

Figure 11C:
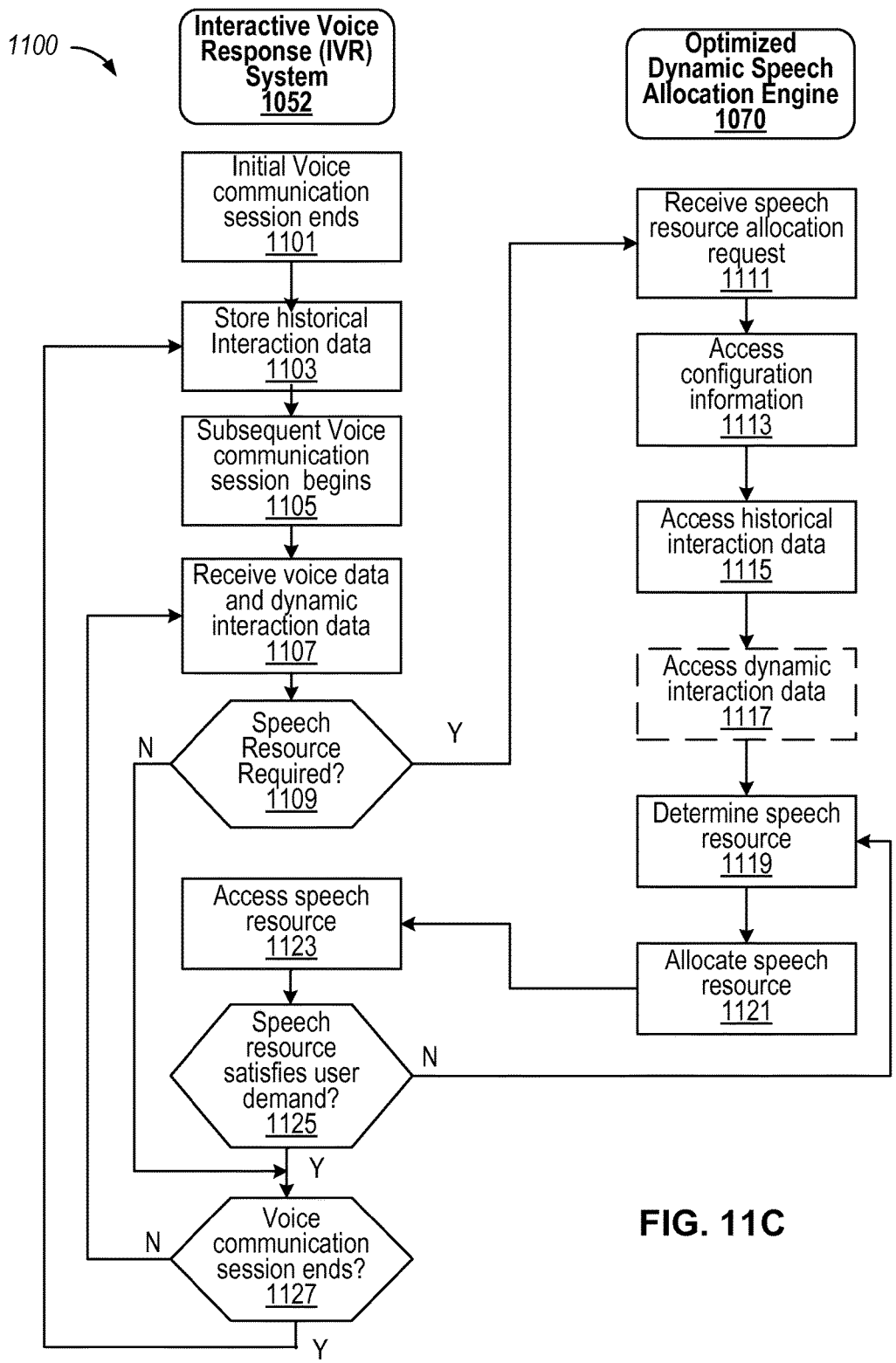

FIG. 11C illustrates a flow chart illustrating an example process 1100 that iteratively determines and allocates speech resources based on historical interaction data, static configuration of the voice interaction, dynamic interaction data, and engine attributes of the speech resources. Referring to FIG. 11C, an initial voice communications session has ended (1101). In some implementations, the initial voice communications session may be exchanged between the user of the intelligent mobile telephone 1010 and the IVR system 1052. In some implementations, the initial voice communications session may be exchanged between another user of another intelligent mobile telephone and the IVR system 1052. Historical interaction data may be derived based on the initial voice communications session. For example, the historical interaction data may include voice characteristics of the caller (e.g., gender, pitch, speed, volume, tone, preferred spoken language, age group, accent, and any other characteristics that may be processed using the received audio input from the user). As another example, the historical interaction data may include speech resources accessed by the IVR system 1052 during the initial voice communications session. As another example, the historical interaction data may include speech resources accessed by the IVR system 1052 during previous voice communications sessions invoked by other users accessing the same voice application.

The IVR system 1052 stores the historical interaction data at the data store 1060 (1103). Each time a user accesses the voice application, historical interaction data associated with the particular voice communications session may be stored at the data store 1060. The data store 1060 may include aggregated historical interaction data for a particular voice application, or historical interaction data for a particular user.

A user of the intelligent mobile telephone 1010 then initiates a voice communications session with the IVR system 1052 (1105). In some implementations, a caller identity (e.g., a name of the caller, an e-mail address of the caller, or an account number) is determined at the beginning of the voice communications session by, for example, prompting the user to input using a keypad the identity or prompting the caller to speak the identity. As another example, a caller identity may be identified automatically by the IVR system 1052 using metadata (e.g., phone number) associated with the intelligent mobile telephone 1010. Using the caller identity, corresponding historical information for the particular user may be accessed from the data store 1060 at the beginning of the session.

The IVR system 1052 receives voice data and, optionally, dynamic interaction data from the user (1107). The IVR system 1052 determines whether a speech resource is required to process the received voice data (1109). If the IVR system 1052 determines that a speech resource is required to process the received voice data, the IVR system 1052 may send a speech resource allocation request to the ODSA engine 1070. If the IVR system 1052 determines that a speech resource is not required to process the received voice data, the IVR system 1052 may process the voice data, and determine whether the voice communications session has ended (1127).

If the IVR system 1052 determines that a speech resource is required to process the received voice data, the IVR system 1052 may send a speech resource allocation request to the ODSA engine 1070. The ODSA engine 1070 receives the speech resource allocation request from the IVR system 1052 (1111). Upon receiving the speech resource allocation request, the ODSA engine 1070 identifies the state of the voice communications session. In some implementations, the ODSA engine 1070 may identify the state of the voice communications session by receiving such information from the IVR system 1052. In some other implementations, the ODSA engine 1070 may identify the state of the voice communications session by communicating with the data store 1060.

After identifying the state of the voice communications session, the ODSA engine 1070 accesses the configuration information associated with the state (1113). The ODSA engine 1070 also accesses the historical interaction data (1115). In some implementations, the ODSA engine 1070 accesses the historical interaction data from the data store 1060. For example, for a particular state of the voice communications session, the ODSA engine 1070 may access the aggregated historical interaction data associated with multiple users that have accessed the voice application from the data store 1060, and identify the most common speech resource for the particular state that was determined by the ODSA engine 1070 and accessed by the IVR system 1052 for the multiple users (e.g., if most callers using the voice application are females, the ODSA engine 1070 may select an ASR engine optimized to process female voices). As another example, for a particular state of the voice communications session, the ODSA engine 1070 may access the historical interaction data associated with the user of the intelligent mobile telephone 1010, and identify the speech resource for the particular state that was determined by the ODSA engine 1070 and accessed by the IVR system 1052 for the user during the previous communications session (e.g., if a caller calling from a recognized phone number was a male in the previous communications sessions, the ODSA engine 1070 may select an ASR engine optimized to process male voices).

The ODSA engine 1070 then, optionally, accesses the dynamic interaction data associated with the voice communications session (1117). In some implementations, the ODSA engine 1070 may access the dynamic interaction data by receiving such information from the IVR system 1052. In some other implementations, the ODSA engine 1070 may access the dynamic interaction data by communicating with the data store 1060. The ODSA engine 1070 may then, optionally, determine a set of dynamic speech data processing requirements based on the dynamic interaction data.

Based on the static speech data processing requirements, optionally the dynamic speech data processing requirements, and the historical interaction data, the ODSA engine 1070 determines a speech resource for processing the voice data (1119). In some implementations, the ODSA engine 1070 may access engine attributes associated with speech resources, and determines a speech resource that satisfies the static speech data processing requirements and, optionally, the dynamic speech data processing requirements. In some implementations, the ODSA engine 1070 may determine a speech resource based on the historical interaction data. For example, a caller may be known to prefer to speak in Spanish, so the ODSA engine 1070 may select an ASR engine that supports Spanish. As another example, the caller may be known to have a particular accent (e.g., a heavy Australian accent), so the ODSA engine 1070 may select an ASR engine best able to handle a particular language (e.g., English) spoken with that accent. This ASR assignment occurs dynamically, in response to the call, and is tailored to the particular information known about that user.

In some implementations, the historical interaction data about the user may be combined with the static speech data processing requirements to determine the optimal speech resource to handle the call. For example, if the voice interaction is completing a survey and the caller is known to speak in Spanish, a simpler and lower cost ASR engine (e.g., an ASR engine that supports basic ASR) may be selected that supports Spanish.

In some implementations, the ODSA engine 1070 may determine multiple speech resources that satisfy the static speech data processing requirements and the dynamic speech data processing requirements, and may then select the speech resource with the lowest cost for the content provider. In some implementations, one or more static speech data processing requirements, dynamic speech data processing requirements, and historical interaction data may be weighted, and the ODSA engine 1070 may determine the optimal speech resource that based on the weighted static speech data processing requirements, dynamic speech data processing requirements, and the historical interaction data.

After determining the speech resource, the ODSA engine 1070 allocates the speech resource to the IVR system 1052 (1121). The ODSA engine 1070 then communicates the speech resource allocation information with the IVR system 1052. After receiving the speech resource allocation information from the ODSA engine 1070, the IVR system 1052 accesses the allocated speech resource (1123). The IVR system 1052 then determines whether the speech resource satisfies user demand (1125), as previously described in FIG. 11B.

The process 1100 iteratively repeats until the IVR system 1052 determines that the voice communications session has ended (1127). The IVR system 1052 then stores the information associated with the voice communications session as historical interaction data at the data store 1060 (1103).

Figure 12B:
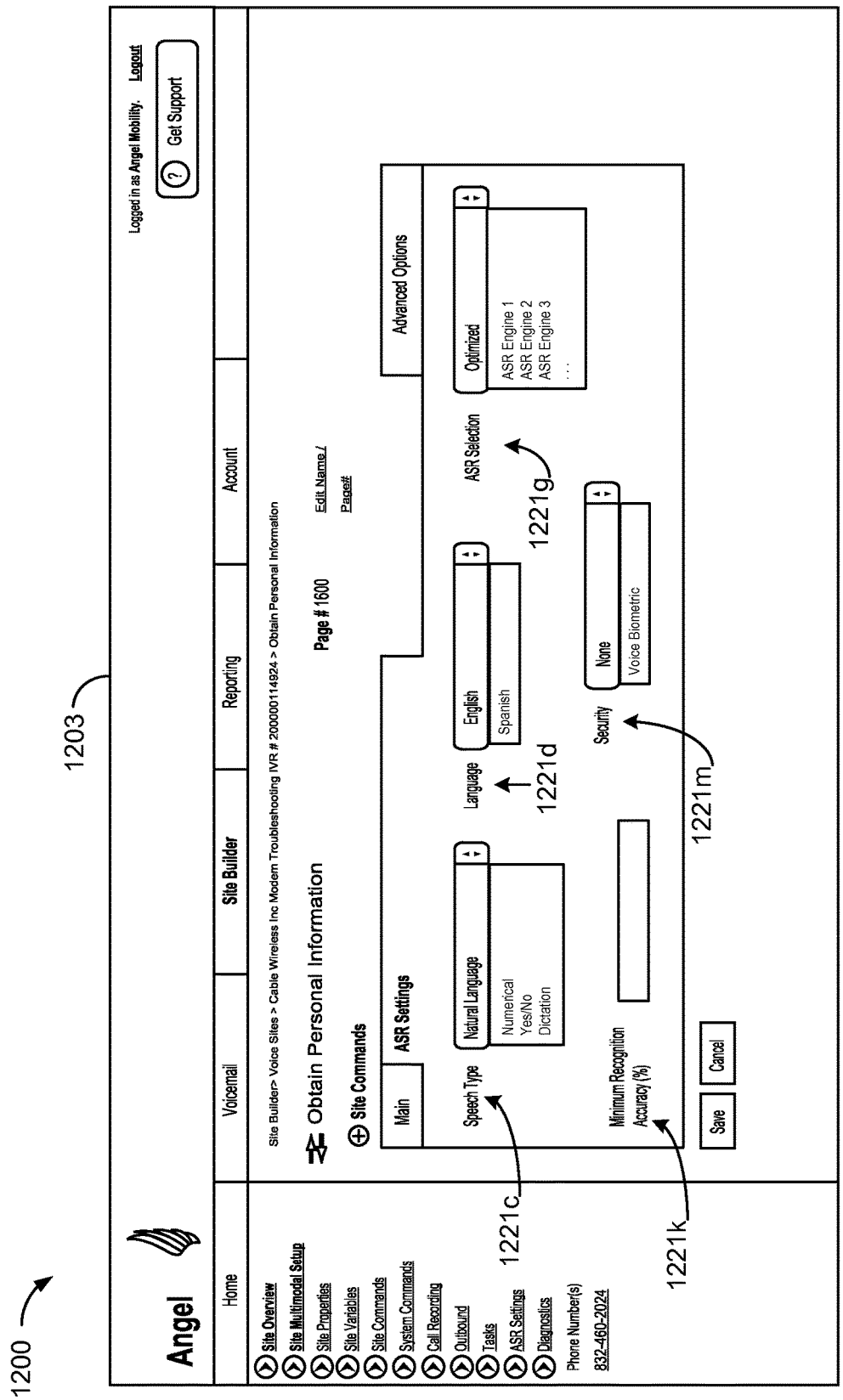

FIGS. 12A-12B illustrate an example GUI 1200 for an application development tool that is used by a content provider to configure speech resource parameters for processing voice information from a user. GUI 1200 corresponds to a version of GUI 500, which was previously described with respect to FIGS. 5A-5N, that has been enhanced to include additional user interface features that are specifically directed to dynamic speech resource allocation.

FIG. 12A illustrates a Site Overview interface 1210 similar to interface 510 illustrated in FIG. 5A but modified to support dynamic speech resource allocation. For example, unlike interface 510, interface 1210 includes an additional page 1203 (corresponding to the page number 1600) used to collect personal information from the caller. In one implementation example, the voice page 1203 prompts the user to speak personal information (e.g., the user's name and/or account number) and interprets the spoken personal information. The personal information may then be used to authenticate the user and/or access a particular account associated with the user.

FIG. 12B illustrates an example ASR settings tab of the voice page 1203. The ASR settings tab of the voice page 1203 illustrates example ASR settings that may be modified by a content provider to define its ASR needs for the particular voice interaction that corresponds to the voice page 1203 (i.e., the voice interaction that collects and interprets spoken personal information from the caller). The call handling system 1050 may then use the ASR settings information alone or in combination with other information about the grammars specified by the voice page 1203 (e.g., name grammar and account number grammar) to identify an ASR engine that is best able to handle the voice interaction corresponding to the voice page 1203. In other words, a content provider may interact with the ASR settings tab of the voice page 1203 to provide the voice site builder 1080 with some or all of the configuration data that will be stored in the configuration database 1082. This configuration data reflects the static speech data processing requirements for the voice interaction that corresponds to the voice page 1203 and that can be used by the optimized dynamic speech allocation engine 1070 to identify the best ASR engine for the voice interaction, as described previously.

In some implementations, an ASR setting may include a speech type attribute 1221c. Examples of speech types supported by this particular implementation of the voice site builder 1080 include, but are not limited to, natural language, numerical, Yes/No, and dictation. The user is able to select from among these different types using, for example, a drop-down menu as shown in FIG. 12B. In some implementations, a voice page having an ASR setting of a natural language type may be configured to allow a user to proactively provide voice data in a voice application without the IVR system 1052 prompting the user to do so. In some implementations, a voice page having an ASR setting of a numerical type may be configured to allow a user to only provide numerical values during the particular stage of the voice interaction with the IVR system 1052. In some implementations, a voice page having an ASR setting of a Yes/No type may be configured to allow a user to only provide a "Yes" or "No" answer during the particular stage of the voice interaction with the IVR system 1052. In some implementations, a voice page having an ASR setting of a dictation speech type may be configured to render a user's speech into text without engaging language exchange between the user and a voice application.

In some implementations, an ASR setting may include a language attribute 1221*d*. In the implementation example shown in FIG. 12B, a user is able to select from among two different languages, i.e., English and Spanish, by interacting with a drop-down menu.

In some implementations, an ASR setting may include an ASR selection attribute 1221*g*. The user (i.e., content provider) may select to allow the service provider to select the ASR engine that the service provider deems is best able to satisfy the data processing requirements for the voice page 1203 by selecting the "optimized" option from, for example, a drop-down menu. Alternatively, the user may manually select a particular ASR engine from among a set of available ASR engines by, for example, instead selecting the corresponding ASR engine identifier from the drop-down menu. In some implementations, the ASR Settings tab may not allow the user to manually select a particular ASR engine to thereby preserve the ability of the service provider to update, change and/or replace the existing set of ASR engines without negatively impacting any particular voice site designed using the voice site builder 1080.

In some implementations, an ASR setting may include a minimum recognition accuracy attribute 1221*k*. In general, an ASR engine provides a recognition accuracy associated with the processed voice data. For example, the ASR engine may assign a score to the processed voice data. In some implementations, the ASR engine may determine that there are multiple possible interpretations for the received voice data, and the ASR engine may assign a score to each of the possible interpretation. The minimum recognition accuracy attribute 1221*k* may provide a threshold for filtering out possible interpretations having scores lower than the threshold. For example, a particular ASR engine may process a voice input, and determines that there is a possibility of 90% that the user has said the word "Boston," a possibility of 70% that the user has said the word "Austin," and a possibility of 50% that the user has said the word "Houston." If the minimum recognition accuracy attribute 1221*k* has been set to 80% by the content provider, the ASR engine may only return the word "Boston" to the IVR system 1052.

In some implementations, an ASR setting may include a security attribute 1221*m*. For example, a content provider may configure the voice page 1203 to require the voice biometric feature, and only ASR engines that are configured to support biometrics features would be selected for the voice page 1203.

Figure 13:
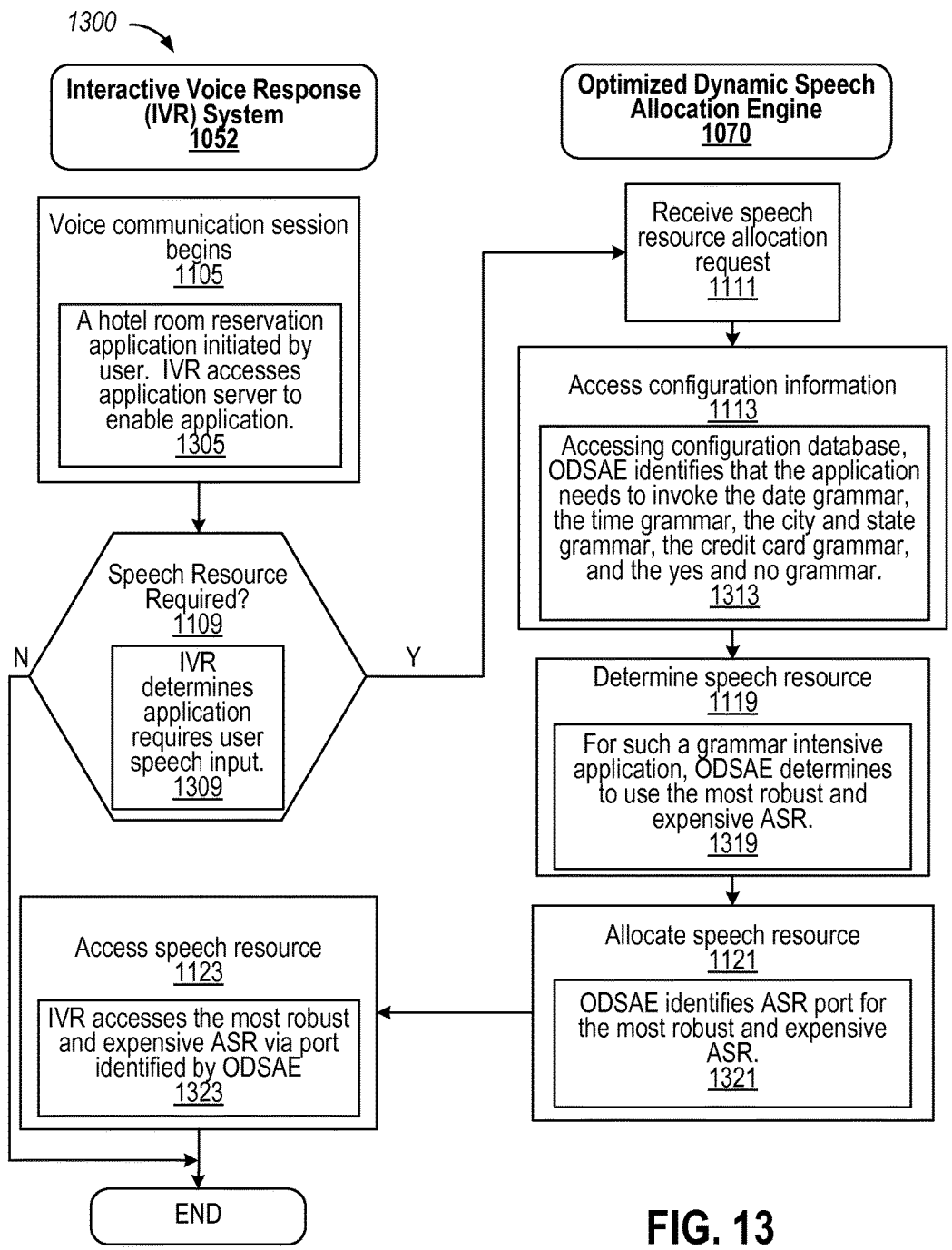
FIG. 13 is a flow chart illustrating an example process that determines and allocates speech resources based on configuration parameters associated with a voice site.

FIG. 13 is a flow chart illustrating an example process 1300 that determines and allocates speech resources based on static speech data processing requirements. The example process 1300 may be described in terms of the example process 1100. A user of the intelligent mobile telephone 1010 initiates a voice communications session with the IVR system 1052 (1105). Here, the user has initiated a hotel reservation application using her intelligent mobile telephone 1010 (1305). In some implementations, the user may initiate the hotel reservation application by calling a telephone number. In some implementations, the user may initiate the hotel reservation application by enabling the hotel reservation application on the screen of her intelligent mobile telephone 1010. The intelligent mobile telephone 1010 is connected to the IVR system 1052 via the telephone network 1020 and/or the data network 1030. The intelligent mobile telephone 1010 is also connected to the application server 1040 via the data network 1030. The IVR system 1052 communicates with the application server 1040 and the intelligent mobile telephone 1010 to begin the voice interaction with the user.

The IVR system 1052 then determines whether a speech resource is required to process the received voice data (1109). Here, the IVR system 1052 determines that a speech resource is required to process the received voice data, and the IVR system 1052 sends a speech resource allocation request to the ODSA engine 1070 (1309).

The ODSA engine 1070 receives the speech resource allocation request from the IVR system 1052 (1111). Upon receiving the speech resource allocation request, the ODSA engine 1070 identifies the state of the voice communications session. In some implementations, the ODSA engine 1070 may identify the state of the voice communications session by receiving such information from the IVR system 1052. In some other implementations, the ODSA engine 1070 may identify the state of the voice communications session by communicating with the data store 1060.

After identifying the state of the voice communications session, the ODSA engine 1070 accesses the configuration information associated with the state (1113). Here, by accessing the configuration database 1082, the ODSAE engine 1070 identifies that the hotel reservation application requires invoking the date grammar, the time grammar, the city and state grammar, the credit card grammar, and the yes and no grammar (1313).

Based on the static speech data processing requirements, the ODSA engine 1070 determines a speech resource for processing the voice data (1119). The ODSA engine 1070 may access engine attributes associated with all ASR engines 1072, and determines a speech resource that satisfies the static speech data processing requirements. Here, the ODSA engine 1070 determines that for such a grammar intensive application, the IVR system 1052 needs to use the most robust and expensive ASR engine (1319).

After determining the speech resource, the ODSA engine 1070 allocates the speech resource to the IVR system 1052 (1121). Here, the ODSA engine 1070 identifies the ASR port corresponding to the most robust and expensive ASR in the call handling system 1050 (1321). The ODSA engine 1070 then communicates the speech resource allocation information with the IVR system 1502.

After receiving the speech resource allocation information from the ODSA engine 1070, the IVR system 1052 accesses the allocated speech resource (1123). Here, the IVR system 1052 connects to the most robust and expensive ASR engine via the port identified by ODSA engine 1070, and processes the voice data received from the user (1323). In this example, the IVR system 1052 may continue to use the most robust and expensive ASR engine until the end of the voice interaction.

Figure 14:
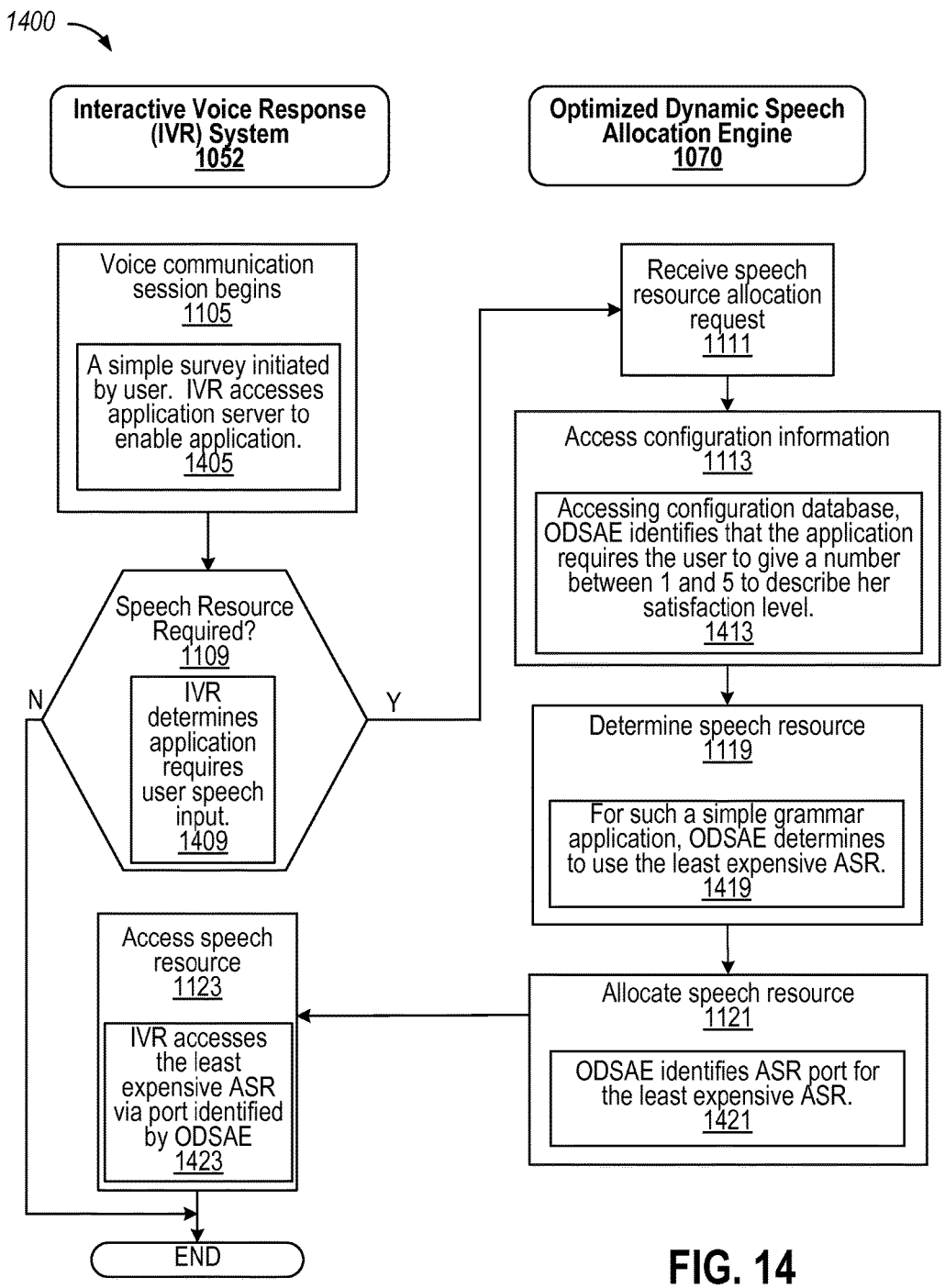
FIG. 14 is a flow chart illustrating an example process that determines and allocates speech resources based on configuration parameters associated with another voice site.

FIG. 14 is a flow chart illustrating an example process 1400 that determines and allocates speech resources based on configuration parameters associated with another voice site. The example process 1400 may be described in terms of the example process 1100. A user of the intelligent mobile telephone 1010 initiates a voice communications session with the IVR system 1052 (1105). Here, the user has initiated a simple survey application using her intelligent mobile telephone 1010 (1405).

The IVR system 1052 then determines whether a speech resource is required to process the received voice data (1109). Here, the IVR system 1052 determines that a speech resource is required to process the received voice data, and the IVR system 1052 sends a speech resource allocation request to the ODSA engine 1070 (1409).

The ODSA engine 1070 receives the speech resource allocation request from the IVR system 1052 (1111). Upon receiving the speech resource allocation request, the ODSA engine 1070 identifies the state of the voice communications session.

After identifying the state of the voice communications session, the ODSA engine 1070 accesses the configuration information associated with the state (1113). Here, by accessing the configuration database 1082, the ODSAE engine 1070 identifies that the survey application requires the user to give a number between 1 and 5 to describe her satisfaction level (1413).

Based on the static speech data processing requirements, the ODSA engine 1070 determines a speech resource for processing the voice data (1119). Here, the ODSA engine 1070 determines that for such a simple grammar application, the IVR system 1052 may use the least expensive ASR engine (1419).

After determining the speech resource, the ODSA engine 1070 allocates the speech resource to the IVR system 1052 (1121). Here, the ODSA engine 1070 identifies the ASR port corresponding to the least expensive ASR in the call handling system 1050 (1421). The ODSA engine 1070 then communicates the speech resource allocation information with the IVR system 1052.

After receiving the speech resource allocation information from the ODSA engine 1070, the IVR system 1052 accesses the allocated speech resource (1123). Here, the IVR system 1052 connects to the least expensive ASR engine via the port identified by ODSA engine 1070, and processes the voice data received from the user (1423). In this example, the IVR system 1052 may continue to use the least expensive ASR engine until the end of the voice interaction.

Figure 15:
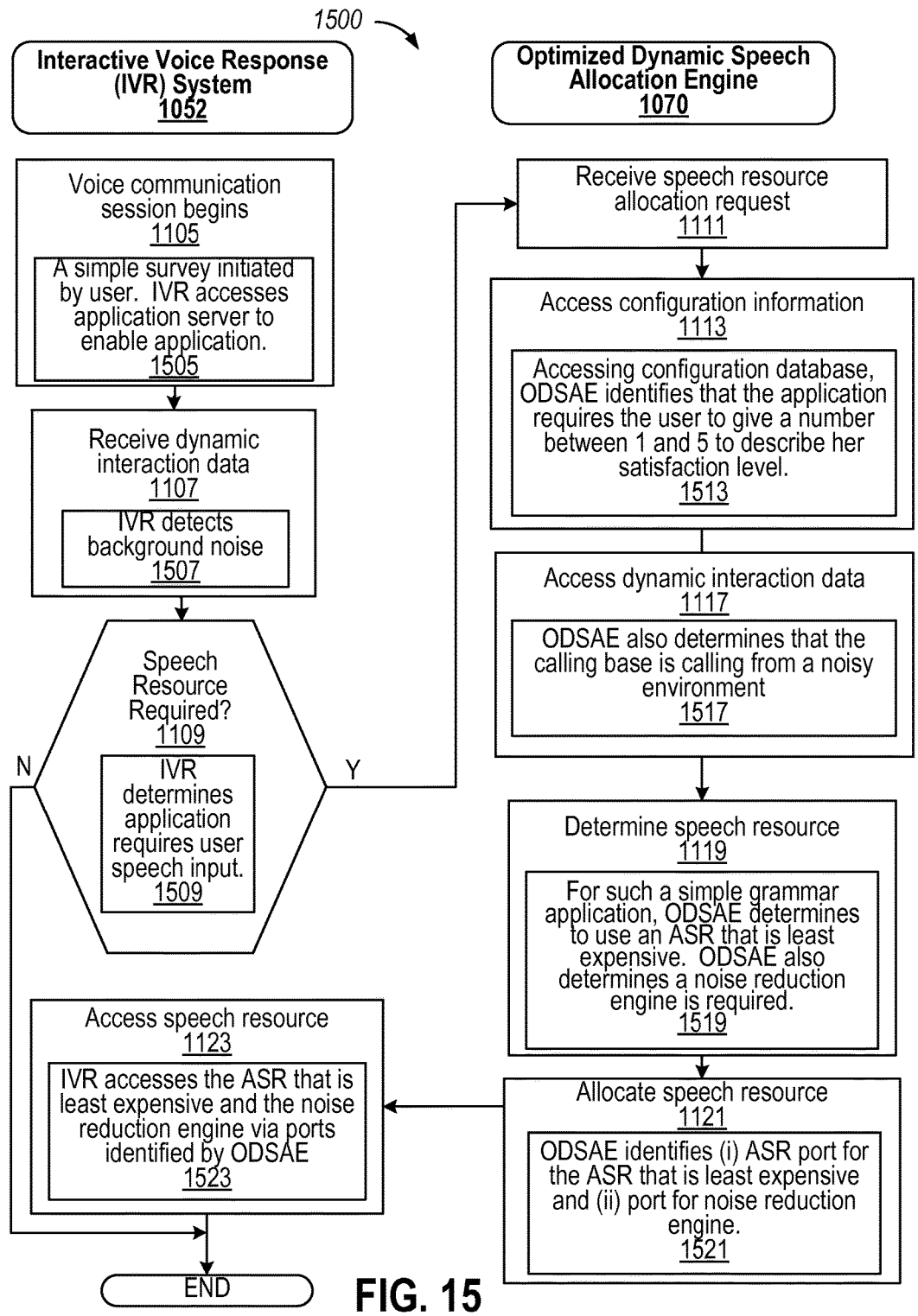
FIG. 15 is a flow chart illustrating an example process that determines and allocates speech resources based on configuration parameters associated with a voice site and dynamic characteristics of the call.

FIG. 15 is a flow chart illustrating an example process 1500 that determines and allocates speech resources based on configuration parameters associated with a voice site and dynamic characteristics of the call. The example process 1500 may be described in terms of the example process 1100. A user of the intelligent mobile telephone 1010 initiates a voice communications session with the IVR system 1052 (1105). Here, the user has initiated a simple survey application using her intelligent mobile telephone 1010 (1505).

The IVR system 1052 receives voice data and dynamic interaction data from the user (1107). Here, the IVR system 1052 detects that there is a high level of background noise in the user's calling environment (1507). The IVR system 1052 then determines whether a speech resource is required to process the received voice data (1109). Here, the IVR system 1052 determines that a speech resource is required to process the received voice data, and the IVR system 1052 sends a speech resource allocation request to the ODSA engine 1070 (1509).

The ODSA engine 1070 receives the speech resource allocation request from the IVR system 1052 (1111). Upon receiving the speech resource allocation request, the ODSA engine 1070 identifies the state of the voice communications session. After identifying the state of the voice communications session, the ODSA engine 1070 accesses the configuration information associated with the state (1113). Here, by accessing the configuration database 1082, the ODSAE engine 1070 identifies that the survey application requires the user to give a number between 1 and 5 to describe her satisfaction level (1513).

The ODSA engine 1070 then accesses the dynamic interaction data associated with the voice communications session (1117). Here, the ODSA engine 1070 determines that the calling base is a noisy environment (1517). The ODSA engine 1070 then determines a set of dynamic speech data processing requirements based on the dynamic interaction data.

Based on the static speech data processing requirements and the dynamic speech data processing requirements, the ODSA engine 1070 determines a speech resource for processing the voice data (1119). Here, the ODSA engine 1070 determines that for such a simple grammar application, the IVR system 1052 may use the least expensive ASR engine. However, due to the high background noise level, the ODSA engine 1070 may either choose to replace the least expensive ASR engine with a robust, but more expensive, ASR engine, or alternatively, the ODSA engine 1070 may choose to add the noise reduction engine 1076 to reduce the background noise. Here, the ODSA engine 1070 determines that the cost associated with accessing both the least expensive ASR engine and the noise reduction engine 1076 is lower than the cost associated with accessing the robust, but expensive, ASR engine. Therefore, the ODSA engine 1070 selects the least expensive ASR engine and the noise reduction engine 1076 as speech resources for the IVR system 1052 (1519).

After determining the speech resources, the ODSA engine 1070 allocates the speech resources to the IVR system 1052 (1121). Here, the ODSA engine 1070 identifies (i) the ASR port for the ASR engine that is least expensive and (ii) a port for noise reduction engine 1076 (1521). The ODSA engine 1070 then communicates the speech resource allocation information with the IVR system 1052.

After receiving the speech resource allocation information from the ODSA engine 1070, the IVR system 1052 accesses the allocated speech resource (1123). Here, the IVR system 1052 connects to the least expensive ASR engine as well as the noise reduction engine 1076 via the ports identified by ODSA engine 1070, and processes the voice data received from the user (1523). In this example, the IVR system 1052 may continue to use the least expensive ASR engine and the noise reduction engine 1076 until the end of the voice interaction.

Figure 16A:
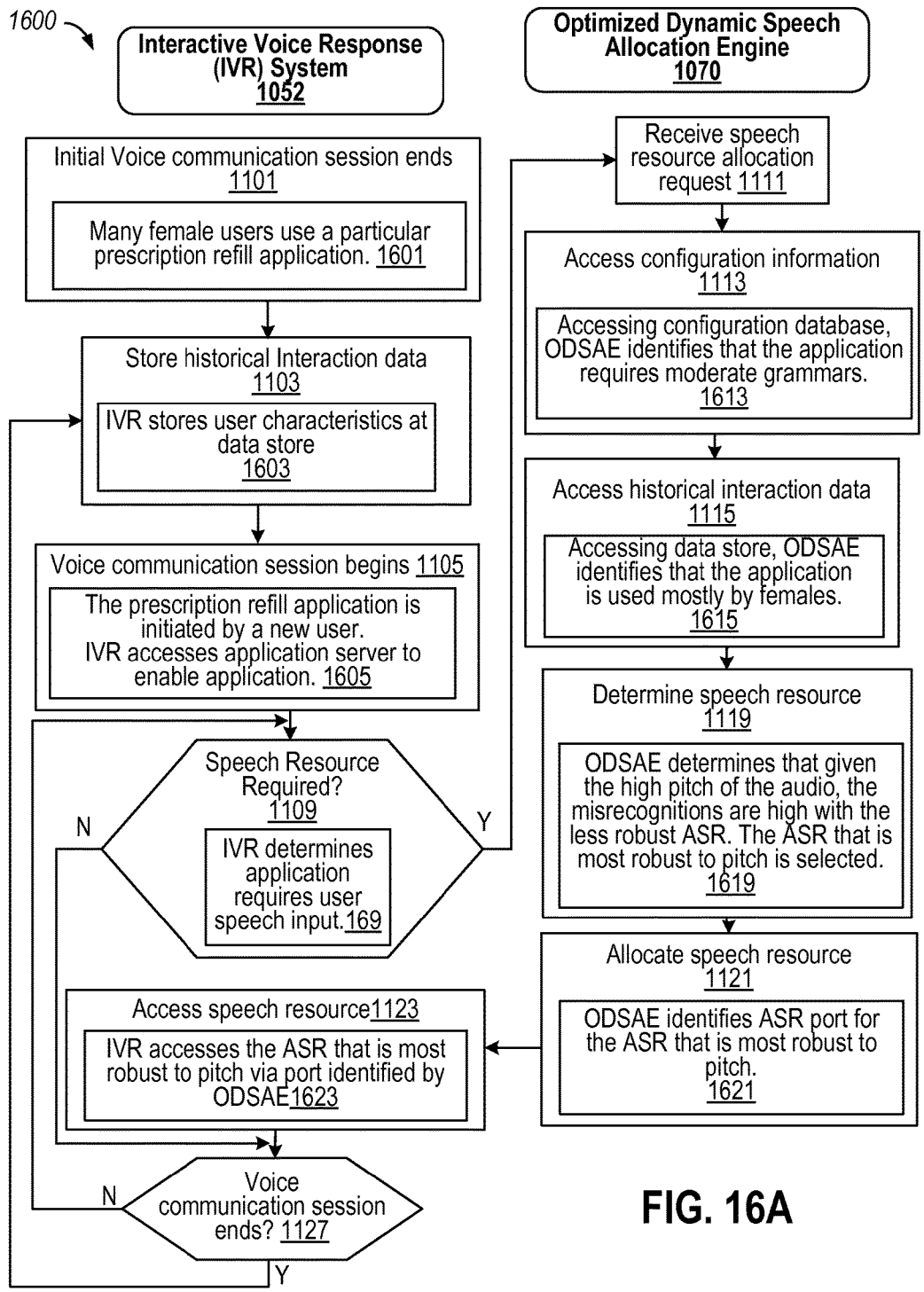
FIGS. 16A-16B are flow charts illustrating example processes that determine and allocate speech resources based on configuration parameters associated with a voice site, historical interaction data associated with the voice site, and dynamic characteristics of the call.

FIG. 16A is a flow chart illustrating an example process that determines and allocates speech resources based on configuration parameters associated with a voice application and historical interaction data associated with the voice application. The example process 1600 may be described in terms of the example process 1100. An initial voice communications session has ended (1101). Here, the voice application is a prescription refill application, where historically most callers are female users, as determined by the IVR system 1052 (1601).

The IVR system 1052 stores the historical interaction data at the data store 1060 (1103). Each time a user accesses the voice application, historical interaction data associated with the particular voice communications session may be stored at the data store 1060. The data store 1060 may include aggregated historical interaction data for a particular voice application and/or historical interaction data for a particular user. Here, the IVR system 1052 stores user characteristics, such as gender of the caller, at the data store 1060 (1601).

A user of the intelligent mobile telephone 1010 then initiates a voice communications session with the IVR system 1052 (1105). Here, the user has initiated the prescription refill application using her intelligent mobile telephone 1010 (1605).

The IVR system 1052 then determines whether a speech resource is required to process the received voice data (1109). Here, the IVR system 1052 determines that a speech resource is required to process the received voice data, and the IVR system 1052 sends a speech resource allocation request to the ODSA engine 1070 (1609).

The ODSA engine 1070 receives the speech resource allocation request from the IVR system 1052 (1111). Upon receiving the speech resource allocation request, the ODSA engine 1070 identifies the state of the voice communications session. After identifying the state of the voice communications session, the ODSA engine 1070 accesses the configuration information associated with the state (1113). Here, by accessing the configuration database 1082, the ODSA engine 1070 identifies that the survey application requires moderate grammar interactions with the user (1613).

After accessing the configuration information, the ODSA engine 1070 accesses the historical interaction information associated with the state (1115). Here, by accessing the data store 1060, the ODSA engine 1070 identifies that the prescription refill application is mostly used by females (1615).

Based on the static speech data processing requirements and the historical interaction information, the ODSA engine 1070 determines a speech resource for processing the voice data (1119). The ODSA engine 1070 may access engine attributes associated with all ASR engines 1072, and determines a speech resource that satisfies the static speech data processing requirements and the historical interaction information. Here, the ODSA engine 1070 determines that, given the high pitch of the voice data associated with most female callers, the misrecognitions are high with the less robust ASR engine. The ASR engine that is the most robust to pitch (i.e., able to most accurately interpret voice data corresponding to a voice having a high pitch) is selected (1619).

After determining the speech resource, the ODSA engine 1070 allocates the speech resource to the IVR system 1052 (1121). Here, the ODSA engine 1070 identifies the ASR port corresponding to the ASR engine that is the most robust with respect to pitch in the call handling system 1050 (1621). The ODSA engine 1070 then communicates the speech resource allocation information with the IVR system 1052.

After receiving the speech resource allocation information from the ODSA engine 1070, the IVR system 1052 accesses the allocated speech resource (1123). Here, the IVR system 1052 connects to the ASR engine that is the most robust to pitch via the port identified by ODSA engine 1070, and processes the voice data received from the user (1623). In this example, the IVR system 1052 then determines whether the voice communications session has ended (1127). If the voice communications session has ended, the IVR system 1052 stores the voice interaction data with the current user at the data store 1060 (1103). If the voice communications session has not ended, the IVR system 1052 continues the voice interaction with the current user, and the ODSA engine 1070 allocates the optimal ASR engine depending on the state of the voice communications session.

Figure 16B:
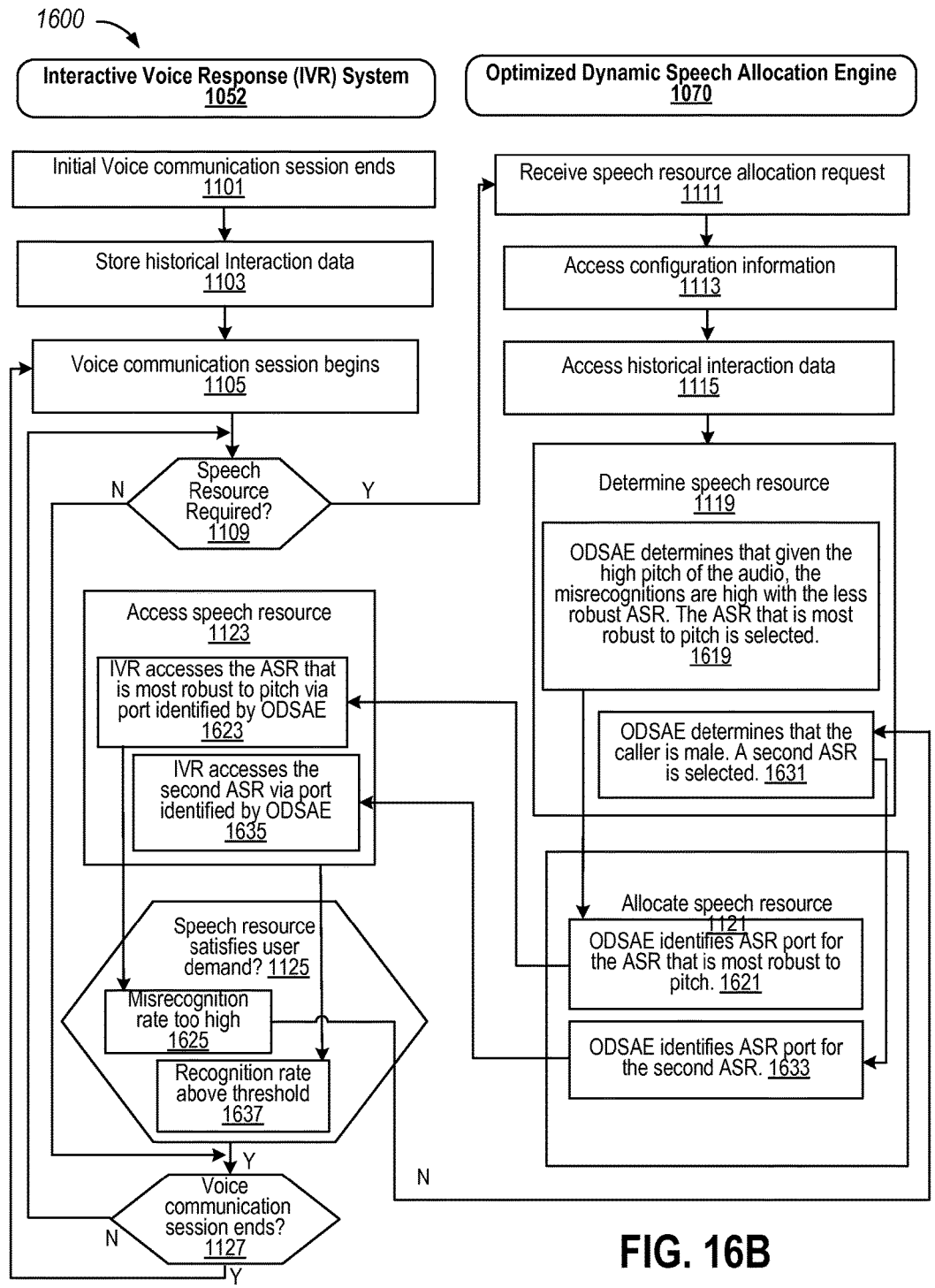

FIG. 16B is a flow chart illustrating an example process that determines and allocates speech resources based on configuration parameters associated with a voice site, historical interaction data associated with the voice site, and dynamic characteristics of the call. As previously described in FIG. 16A, based on the static speech data processing requirements and the historical interaction information, the ODSA engine 1070 determines a speech resource for processing the voice data (1119). The ODSA engine 1070 may access engine attributes associated with all ASR engines 1072, and determines a speech resource that satisfies the static speech data processing requirements and the historical interaction information. Here, the ODSA engine 1070 first determines that, given the high pitch of the voice data associated with most female callers, the misrecognitions are high with the less robust ASR engine. The ASR engine that is the most robust with respect to high-pitched voices is selected (i.e., the ASR engine that has the best accuracy in interpreting voice data corresponding to a high-pitched voice) (1619).

After determining the speech resource, the ODSA engine 1070 allocates the speech resource to the IVR system 1052 (1121). Here, the ODSA engine 1070 identifies the ASR port corresponding to the ASR engine that is the most robust with respect to high-pitched voices in the call handling system 1050 (1621). The ODSA engine 1070 then communicates the speech resource allocation information to the IVR system 1052.

After receiving the speech resource allocation information from the ODSA engine 1070, the IVR system 1052 accesses the allocated speech resource (1123). Here, the IVR system 1052 connects to the ASR engine that is the most robust with respect to high-pitched voices via the port identified by ODSA engine 1070, and processes the voice data received from the user (1623).

The IVR system 1052 then determines whether the speech resource satisfies user demand (1125). Here, the IVR system 1052 determines that the misrecognition rate associated with the ASR engine that is the most robust with respect to high-pitched voices is too high for this particular user because, for example, the number of times that the ASR engine has failed to accurately interpret the user's speech in the communications session has passed a threshold (e.g., the ASR engine has misinterpreted the user's identification of a prescribed drug twice). In response to determining that the misrecognition rate is too high, the IVR system 1052 sends a second speech resource allocation request to the ODSA engine 1070.

The ODSA engine 1070 determines a second speech resource for the IVR system 1052 (1119). Here, the ODSA engine 1070 determines that the caller is male, and therefore the misrecognition rate associated with the ASR engine that is the most robust to pitch is high. A second ASR engine that is robust to male voice is selected.

After determining the second ASR engine, the ODSA engine 1070 identifies the ASR port corresponding to the second ASR engine (1633). The ODSA engine 1070 then communicates the speech resource allocation information with the IVR system 1052.

After receiving the speech resource allocation information from the ODSA engine 1070, the IVR system 1052 connects to the second ASR engine via the port identified by ODSA engine 1070, and processes the voice data received from the male user (1635). The IVR system 1052 then again determines whether the speech resource satisfies user demand (1125). Here, the recognition rate using the second ASR engine is above a threshold defined by the content provider of the prescription refill application, and the IVR system 1052 moves on to determine whether the voice communications session has ended (1127). If the voice communications session has ended, the IVR system 1052 stores the voice interaction data with the current user at the data store 1060 (1103). If the voice communications session has not ended, the IVR system 1052 continues the voice interaction with the current user, and the ODSA engine 1070 allocates the optimal ASR engine depending on the state of the voice communications session.

While the above-described implementations focus on the dynamic allocation of speech resources, the same techniques may be used to allocate other types of data processing resources that are not specifically focused on voice or speech. For example, the same techniques could be used to allocate video processing resources such as, for example, facial recognition engines or license-plate reading engines. The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method comprising:
   receiving, by a call handling system, a request to allocate a speech resource for processing voice data of a voice communications session between an interactive voice response (IVR) system and a telephonic device;
   accessing, by the call handling system, configuration data associated with a current state of the voice communications session;
   determining, by the call handling system, one or more data processing requirements of the current state of the voice communications session;
   selecting, by the call handling system, a selected speech resource from among multiple speech resources, each of the speech resources having an associated cost, at least two of the associated costs being different, the selecting being based on the configuration data, the one or more data processing requirements of the current state of the voice communications session, and the associated costs of the speech resources, the multiple speech resources comprising at least one automatic speech recognition (ASR) engine; and
   allocating the selected speech resource to the voice communications session.

2. The method of claim 1, comprising:
   accessing, by the call handling system, dynamic interaction data associated with a user of the telephonic device.

3. The method of claim 2, wherein the dynamic interaction data includes data representing one or more voice characteristics associated with the user.

4. The method of claim 2, wherein the dynamic interaction data includes data representing characteristics associated with the user's calling environment during the voice communications session.

5. The method of claim 2, wherein the dynamic interaction data includes a location of the user during the current state of the voice communications session.

6. The method of claim 1, wherein selecting a speech resource comprises selecting at least one automatic speech recognition (ASR) engine based on one or more ASR engine attributes, and wherein the one or more ASR engine attributes include a speech type, a supported language, a channel type, a cost per transaction, a recognition accuracy, a security feature, or an interaction type.

7. The method of claim 1,
comprising accessing, by the call handling system, interaction data associated with a previous voice communications session; and
wherein selecting, by the call handling system, a speech resource from among multiple speech resources further comprises selecting the speech resource based on the configuration data and the interaction data.

8. The method of claim 1, comprising:
determining that the selected speech resource does not satisfy a demand of a user of the telephonic device; and
in response to determining that the selected speech resource does not satisfy the demand of the user, selecting, by the call handling system, a second, different, speech resource from among the multiple speech resources; and
allocating the second speech resource to the voice communications session.

9. The computer-implemented method of claim 1, wherein the one or more data processing requirements of the current state of the voice communications session comprises an ambient noise level of the voice communications session.

10. A system comprising:
one or more computers and one or more storage devices storing instructions that when executed by the one or more computers cause the one or more computers to perform operations comprising:
receiving a request to allocate a speech resource for processing voice data of a voice communications session between an interactive voice response (IVR) system and a telephonic device;
accessing configuration data associated with a current state of the voice communications session;
determining one or more data processing requirements of the current state of the voice communications session;
selecting a speech resource from among multiple speech resources, each of the speech resources having an associated cost, at least two of the associated costs being different, the selecting being based on the configuration data, the one or more data processing requirements of the current state of the voice communications session, and the associated costs of the speech resources, the multiple speech resources comprising at least one automatic speech recognition (ASR) engine; and
allocating the selected speech resource to the voice communications session.

11. The system of claim 10, comprising:
accessing dynamic interaction data associated with a user of the telephonic device.

12. The system of claim 11, wherein the dynamic interaction data includes (i) data representing one or more voice characteristics associated with the user, (ii) data representing characteristics associated with the user's calling environment during the voice communications session, or (iii) data representing a location of the user during the current state of the voice communications session.

13. The system of claim 10, wherein selecting a speech resource comprises selecting one of the at least one automatic speech recognition (ASR) engine based on one or more ASR engine attributes, and wherein the one or more ASR engine attributes include a speech type, a supported language, a channel type, a cost per transaction, a recognition accuracy, a security feature, or an interaction type.

14. The system of claim 10,
wherein the operations comprise accessing interaction data associated with a previous voice communications session; and
wherein selecting a speech resource from among multiple speech resources further comprises selecting the speech resource based on the configuration data and the interaction data.

15. The system of claim 10, wherein the operations comprise:
determining that the selected speech resource does not satisfy a demand of a user of the telephonic device; and
in response to determining that the selected speech resource does not satisfy the demand of the user, selecting, a second, different, speech resource from among the multiple speech resources; and
allocating the second speech resource to the voice communications session.

16. A non-transitory computer-readable medium storing software having stored thereon instructions, which, when executed by one or more computers, cause the one or more computers to perform operations of:
receiving a request to allocate a speech resource for processing voice data of a voice communications session between an interactive voice response (IVR) system and a telephonic device;
accessing configuration data associated with a current state of the voice communications session;
determining one or more data processing requirements of the current state of the voice communications session;
selecting a speech resource from among multiple speech resources, each of the speech resources having an associated cost, at least two of the associated costs being different, the selecting being based on the configuration data, the one or more data processing requirements of the current state of the voice communications session, and the associated costs of the speech resources, the multiple speech resources comprising at least one automatic speech recognition (ASR) engine; and
allocating the selected speech resource to the voice communications session.

17. The non-transitory computer-readable medium of claim 16, comprising:
accessing dynamic interaction data associated with a user of the telephonic device.

18. The non-transitory computer-readable medium of claim 17, wherein the dynamic interaction data includes (i) data representing one or more voice characteristics associated with the user, (ii) data representing characteristics associated with the user's calling environment during the voice communications session, or (iii) data representing a location of the user during the current state of the voice communications session.

19. The non-transitory computer-readable medium of claim 16, wherein selecting a speech resource comprises selecting one of the at least one automatic speech recognition (ASR) engine based on one or more ASR engine attributes, and wherein the one or more ASR engine attributes include a speech type, a supported language, a channel type, a cost per transaction, a recognition accuracy, a security feature, or an interaction type.

20. The non-transitory computer-readable medium of claim 16,
   wherein the operations comprise accessing interaction data associated with a previous voice communications session; and
   wherein selecting a speech resource from among multiple speech resources further comprises selecting the speech resource based on the configuration data and the interaction data.

21. The non-transitory computer-readable medium of claim 16, wherein the operations comprise:
   determining that the selected speech resource does not satisfy a demand of a user of the telephonic device; and
   in response to determining that the selected speech resource does not satisfy the demand of the user, selecting, a second, different, speech resource from among the multiple speech resources; and
   allocating the second speech resource to the voice communications session.

* * * * *